US012743187B2

(12) United States Patent
Yi et al.

(10) Patent No.: US 12,743,187 B2
(45) Date of Patent: Sep. 22, 2026

(54) DISPLAY METHOD AND RELATED APPARATUS

(71) Applicant: Huawei Technologies Co., Ltd., Shenzhen (CN)

(72) Inventors: Jie Yi, Shenzhen (CN); Hejin Gu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 18/741,136

(22) Filed: Jun. 12, 2024

(65) Prior Publication Data

US 2024/0402876 A1 Dec. 5, 2024

Related U.S. Application Data

(63) Continuation of application No. 17/582,231, filed on Jan. 24, 2022, now Pat. No. 12,039,144, which is a (Continued)

(30) Foreign Application Priority Data

Jul. 23, 2019 (CN) ........................ 201910665620.X

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0484* (2013.01); *G06F 9/452* (2018.02); *G06F 3/0482* (2013.01)

(58) Field of Classification Search
CPC .... G06F 3/04817; G06F 3/0484; G06F 9/452; G06F 3/0482; G06F 3/0481;
(Continued)

(56) References Cited

U.S. PATENT DOCUMENTS 5,305,435 A * 4/1994 Bronson ............... G06F 3/0481 715/788
5,657,049 A 8/1997 Ludolph et al.
(Continued)

FOREIGN PATENT DOCUMENTS

CN 102799402 A 11/2012
CN 103607607 A 2/2014
(Continued)

OTHER PUBLICATIONS

Phiaton, "NFC Bluetooth Pairing: What Is It and What Are the Benefits?," May 26, 2017, 3 pages.
Blue Bite, "The Complete Guide to NFC," Aug. 28, 2018, 10 pages.

*Primary Examiner* — Ryan Barrett
(74) *Attorney, Agent, or Firm* — Conley Rose, P.C.

(57) ABSTRACT

A display method includes an electronic device that obtains preset information, where the preset information includes information about an application installed on the electronic device, and the information includes at least one of a name, an icon, and a package name of the application. The electronic device generates a first window based on the preset information, where the first window includes one of a plurality of desktops of the electronic device. The electronic device sends the first window to the large-screen device to enable the large-screen device to display a first user interface, where the first user interface includes the first window.

20 Claims, 37 Drawing Sheets

Related U.S. Application Data continuation of application No. PCT/CN2020/103361, filed on Jul. 21, 2020.

(51) Int. Cl.
*G06F 3/0484* (2022.01)
*G06F 9/451* (2018.01)

(58) Field of Classification Search
CPC .. G06F 3/04883; G06F 3/1454; G06F 3/0488; H04M 2250/02; H04M 1/72412; H04N 21/4122; H04N 21/4622; G09G 5/14; G09G 2354/00
See application file for complete search history.

(56) References Cited

U.S. PATENT DOCUMENTS 5,664,128 A * 9/1997 Bauer .................. G06F 3/0483 715/708
5,745,718 A 4/1998 Cline et al.
5,874,958 A * 2/1999 Ludolph ................ G06F 9/451 715/862
2003/0160815 A1* 8/2003 Muschetto ........... G06F 3/0481 715/733
2004/0261037 A1* 12/2004 Ording ................. G06F 3/0481 715/788
2005/0168399 A1* 8/2005 Palmquist ............ G06F 1/1601 345/1.1
2006/0161847 A1* 7/2006 Holecek ............... G06F 3/0481 715/838
2007/0271522 A1* 11/2007 Son .................... G06F 3/04847 715/762
2008/0109753 A1* 5/2008 Karstens ............... G06F 9/542 715/802
2008/0248834 A1* 10/2008 Chatterjee ......... H04M 1/72409 455/557
2010/0053164 A1* 3/2010 Imai ....................... G06F 3/147 345/1.3
2010/0122195 A1* 5/2010 Hwang ................. H04N 7/147 345/173
2010/0223563 A1* 9/2010 Green .................. G06F 3/0481 709/221
2010/0271288 A1* 10/2010 Srinivasan ........... G06F 3/1454 345/2.2
2010/0293504 A1* 11/2010 Hachiya ............... G06F 3/1423 715/806
2010/0295789 A1* 11/2010 Shin ..................... G06F 1/1626 715/765
2011/0028186 A1* 2/2011 Lee ..................... G06F 3/04883 345/473
2011/0047489 A1* 2/2011 Orr ...................... G06F 3/0482 715/764
2011/0061010 A1* 3/2011 Wasko ................... G06F 3/065 715/835
2011/0157014 A1* 6/2011 Hachiya ............... G06F 3/0488 345/157
2012/0023157 A1* 1/2012 Roth .................... H04L 67/306 709/203
2012/0084722 A1* 4/2012 Cassar ............... G06F 3/04883 715/800
2012/0088548 A1* 4/2012 Yun ....................... G08C 23/04 455/557
2012/0174020 A1 7/2012 Bell et al.
2012/0246596 A1* 9/2012 Ording ................... G06F 9/451 715/799
2012/0278750 A1* 11/2012 Abraham ............... G06F 9/455 715/779
2012/0287022 A1* 11/2012 Queen ................... G09G 5/006 345/2.1
2013/0097556 A1* 4/2013 Louch .................... G06F 9/451 715/790
2013/0132885 A1* 5/2013 Maynard ............ G06F 3/04842 715/777
2013/0145295 A1* 6/2013 Bocking .............. G06F 3/0481 715/764
2013/0205194 A1* 8/2013 Decker .................. G06F 3/017 715/234
2013/0205244 A1* 8/2013 Decker .............. G06F 3/04845 715/777
2013/0249922 A1 9/2013 Hachiya
2013/0335716 A1* 12/2013 Shields .............. G02F 1/16757 353/121
2014/0035816 A1* 2/2014 Liao ................... G06F 3/03547 345/173
2014/0075377 A1 3/2014 Kang et al.
2014/0164958 A1* 6/2014 Mitchell .............. H04L 65/403 715/753
2014/0189527 A1* 7/2014 Kruglick ............ G06F 3/04817 715/746
2014/0203999 A1* 7/2014 Shim .................. G06F 3/04817 345/2.2
2014/0265897 A1* 9/2014 Taipale .................. H02J 13/14 363/126
2015/0031417 A1* 1/2015 Lee ........................ H04W 4/12 455/566
2015/0256574 A1* 9/2015 Sanchez ............... H04L 65/403 715/753
2015/0331602 A1 11/2015 Son et al.
2016/0048314 A1* 2/2016 Han ....................... G06F 16/90 715/717
2016/0234276 A1* 8/2016 Ouyang ................. H04N 7/147
2017/0235435 A1* 8/2017 Sohn .................... G06F 3/0481 715/738
2017/0357401 A1* 12/2017 Fleizach .............. G06F 3/1454
2018/0246634 A1 8/2018 Suh et al.
2021/0182013 A1* 6/2021 Guo ................ H04N 21/25808
2022/0083204 A1* 3/2022 Wu ....................... G06F 3/0483
2022/0382572 A1* 12/2022 Lv ...................... G06F 9/45545
2026/0093372 A1* 4/2026 Louch ................... G06F 3/0481

FOREIGN PATENT DOCUMENTS

CN 103607646 A 2/2014
CN 103607779 A 2/2014
CN 104038835 A 9/2014
CN 104301400 A 1/2015
CN 107168661 A 9/2017
CN 108475184 A 8/2018
CN 105812838 B 12/2018
CN 108989879 A 12/2018
CN 109982322 A 7/2019
CN 110471639 A 11/2019
WO 2016197732 A2 12/2016
WO 2017128913 A1 8/2017

* cited by examiner

DISPLAY METHOD AND RELATED APPARATUS

CROSS-REFERENCE TO RELATED APPLICATIONS

This application is a continuation of U.S. patent application Ser. No. 17/582,231, filed on Jan. 24, 2022, which is a continuation of International Application No. PCT/CN2020/103361 filed on Jul. 21, 2020, which claims priority to Chinese Patent Application No. 201910665620.X filed on Jul. 23, 2019. All of the aforementioned patent applications are hereby incorporated by reference in their entireties.

TECHNICAL FIELD

This disclosure relates to the field of terminals and communications technologies, and in particular, to a display method and a related apparatus.

BACKGROUND

Screen projection is sharing content displayed on an electronic device for which screen projection is to be performed (usually a mobile terminal device, such as a mobile phone or a tablet computer) with another large-screen device (usually a device, such as a television or an intelligent interaction tablet computer) with a display. In the screen projection field, for example, screen projection onto an intelligent interaction tablet computer is performed. Content can be projected onto the intelligent interaction tablet computer via a specific wireless hotspot, as long as an electronic device for which screen projection is to be performed can communicate with the intelligent interaction tablet computer and a corresponding screen projection application is installed on the electronic device for which screen projection is to be performed.

However, in the conventional technology, when the electronic device includes two or more desktops, after screen projection is performed, all desktops of the electronic device are displayed on the large-screen device. As a result, a large area is occupied on the display of the large-screen device, and user's screen projection experience is affected.

SUMMARY

Embodiments of this disclosure disclose a display method and a related apparatus, to reduce an area that is occupied on a display of a large-screen device by a projected window of an electronic device, and improve user experience.

According to a first aspect, an embodiment of this disclosure discloses a display method. The display method is applied to an information interaction system. The information interaction system includes an electronic device and a large-screen device. The method includes that the electronic device obtains preset information, where the preset information includes information about an application installed on the electronic device, and the information about the application includes at least one of a name, an icon, and a package name of the application. The electronic device generates a first window based on the preset information, where the first window includes any one of a plurality of desktops of the electronic device. The electronic device sends the first window to the large-screen device, so that the large-screen device displays a first user interface, where the first user interface includes the first window.

In this embodiment of this disclosure, the electronic device projects only the window including any desktop in the plurality of desktops of the electronic device onto the large-screen device. Compared with the conventional technology in which a window including a plurality of desktops of the electronic device is projected onto the large-screen device, this embodiment of this disclosure can reduce an area that is occupied on a display of the large-screen device by the projected window of the electronic device, and does not affect use of the large-screen device by a user when the user operates the electronic device on the large-screen device, and improves user experience.

In a possible implementation, the first window further includes a first control. The first control is configured to adjust a quantity of desktops of the electronic device included in the first window. After the electronic device sends the first window to the large-screen device, the method further includes that the electronic device receives a first instruction sent by the large-screen device, where the first instruction is an instruction generated by the large-screen device in response to a first operation on the first control, and the first instruction is used to obtain two desktops of the electronic device. The electronic device generates a second window according to the first instruction, where the second window includes any two of the plurality of desktops of the electronic device. The electronic device sends the second window to the large-screen device, so that the large-screen device displays a second user interface, where the second user interface includes the second window.

In this embodiment of this disclosure, the window projected by the electronic device onto the large-screen device includes the control configured to adjust the quantity of desktops of the electronic device included in the window, and the plurality of desktops of the electronic device may be projected and displayed on the large-screen device by using the control. This embodiment of this disclosure can vary forms of the window projected by the electronic device onto the large-screen device, and improves display flexibility of the large-screen device. In addition, a habit in which the user operates on the electronic device can be inherited because the plurality of desktops of the electronic device are displayed on the large-screen device. This improves operation efficiency of the user on the large-screen device, and improves user experience.

In a possible implementation, the electronic device includes three or more desktops. The second window further includes the first control. After the electronic device sends the second window to the large-screen device, the method further includes that the electronic device receives a second instruction sent by the large-screen device, where the second instruction is an instruction generated by the large-screen device in response to a second operation on the first control in the second window, and the second instruction is used to obtain three desktops of the electronic device. The electronic device generates a third window according to the second instruction, where the third window includes any three of the plurality of desktops of the electronic device. The electronic device sends the third window to the large-screen device, so that the large-screen device displays a third user interface, where the third user interface includes the third window.

In this embodiment of this disclosure, the electronic device may generate, in response to different instructions from the large-screen device, windows including different quantities of desktops, and project the windows onto the large-screen device. This further varies forms of the window projected by the electronic device onto the large-screen device, and improves display flexibility of the large-screen device.

In a possible implementation, the first window further includes a second control. The second control is configured to display, in the large-screen device, an interface of an application running in the electronic device. After the electronic device sends the first window to the large-screen device, the method further includes that the electronic device receives a third instruction sent by the large-screen device, where the third instruction is an instruction generated by the large-screen device in response to a third operation on the second control. The electronic device generates a fourth window according to the third instruction, where the fourth window includes the interface of the application running in the electronic device. The electronic device sends the fourth window to the large-screen device, so that the large-screen device displays a fourth user interface, where the fourth user interface includes the fourth window.

In this embodiment of this disclosure, the window projected by the electronic device onto the large-screen device includes the control configured to display the application running in the electronic device on the large-screen device. A habit in which the user operates on the electronic device can be inherited in this embodiment of this disclosure. This improves operation efficiency of the user on the large-screen device, and improves user experience.

In a possible implementation, the first window further includes a third control, and the third control is configured to search the first window for the application on the electronic device.

In this embodiment of this disclosure, the window projected by the electronic device onto the large-screen device includes the control configured to search the window for the application on the electronic device. This embodiment of this disclosure can improve efficiency of searching for the application, improves operation efficiency of the user on the large-screen device, and improves user experience.

According to a second aspect, an embodiment of this disclosure discloses a display method. The display method is applied to an information interaction system. The information interaction system includes an electronic device and a large-screen device. The method includes that the large-screen device receives a first window sent by the electronic device, where the first window is a window generated by the electronic device based on preset information, the preset information includes information about an application installed on the electronic device, and the information about the application includes at least one of a name, an icon, and a package name of the application. The large-screen device displays a first user interface based on the first window, where the first user interface includes the first window, and the first window includes any one of a plurality of desktops of the electronic device.

In this embodiment of this disclosure, the window projected by the electronic device and displayed by the large-screen device includes only one of the plurality of desktops of the electronic device. Compared with the conventional technology in which all desktops of the electronic device are displayed on the large-screen device, this embodiment of this disclosure can reduce an area that is occupied on a display of the large-screen device by the projected window of the electronic device, and does not affect use of the large-screen device by a user when the user operates the electronic device on the large-screen device, and improves user experience.

In a possible implementation, the first window further includes a first control. The first control is configured to adjust a quantity of desktops of the electronic device included in the first window. After the large-screen device displays a first user interface based on the first window, the method further includes that the large-screen device receives a first operation on the first control. The large-screen device displays a second user interface in response to the first operation, where the second user interface includes a second window, and the second window includes any two of the plurality of desktops of the electronic device.

In this embodiment of this disclosure, the window projected by the electronic device onto the large-screen device includes the control configured to adjust the quantity of desktops of the electronic device included in the window, and the plurality of desktops of the electronic device may be projected and displayed on the large-screen device by using the control. This embodiment of this disclosure can vary forms of the window projected by the electronic device onto the large-screen device, and improves display flexibility of the large-screen device. In addition, a habit in which the user operates on the electronic device can be inherited because the plurality of desktops of the electronic device are displayed on the large-screen device. This improves operation efficiency of the user on the large-screen device, and improves user experience.

In a possible implementation, the electronic device includes three or more desktops. The second window further includes the first control. After the large-screen device displays a second user interface, the method further includes that the large-screen device receives a second operation on the first control in the second window. The large-screen device displays a third user interface in response to the second operation, where the third user interface includes a third window, and the third window includes any three of the plurality of desktops of the electronic device.

In this embodiment of this disclosure, the large-screen device may correspondingly display different quantities of desktops in response to different operations on the first control. This further varies forms of the window on the large-screen device, and improves display flexibility of the large-screen device.

In a possible implementation, the first window further includes a second control. The second control is configured to display, in the large-screen device, an interface of an application running in the electronic device. After the large-screen device displays a first user interface based on the first window, the method further includes that the large-screen device receives a third operation on the second control. The large-screen device displays a fourth user interface in response to the third operation, where the fourth user interface includes the interface of the application running in the electronic device.

In this embodiment of this disclosure, the window projected by the electronic device onto the large-screen device includes the control configured to display the application running in the electronic device on the large-screen device. A habit in which the user operates on the electronic device can be inherited in this embodiment of this disclosure. This improves operation efficiency of the user on the large-screen device, and improves user experience.

In a possible implementation, after the large-screen device displays a fourth user interface, the method further includes that the large-screen device receives a fourth operation on a first application interface in the fourth user interface. The large-screen device displays a fifth user interface in response to the fourth operation, where the fifth user interface includes the first application interface that is activated, and the first application interface is an interface of any application in interfaces of applications running in the electronic device.

In a possible implementation, the fifth user interface includes the second control. After the large-screen device displays a fifth user interface, the method further includes that the large-screen device receives a fifth operation on the second control in the fifth user interface. The large-screen device displays the fourth user interface in response to the fifth operation.

In a possible implementation, the first window further includes a third control, and the third control is configured to search the first window for the application on the electronic device.

In this embodiment of this disclosure, the window projected by the electronic device onto the large-screen device includes the control configured to search the window for the application on the electronic device. This embodiment of this disclosure can improve efficiency of searching for the application by the large-screen device, improves operation efficiency of the user on the large-screen device, and improves user experience.

According to a third aspect, an embodiment of this disclosure discloses a display method. The display method is applied to an information interaction system. The information interaction system includes an electronic device and a large-screen device. The method includes that the electronic device obtains preset information, where the preset information includes information about an application installed on the electronic device, and the information about the application includes at least one of a name, an icon, and a package name of the application. The electronic device generates a first window based on the preset information, where the first window includes any one of a plurality of desktops of the electronic device. The electronic device sends the first window to the large-screen device. The large-screen device receives the first window sent by the electronic device. The large-screen device displays a first user interface including the first window.

In a possible implementation, the first window further includes a first control. The first control is configured to adjust a quantity of desktops of the electronic device included in the first window. After the large-screen device displays a first user interface including the first window, the method further includes that the large-screen device receives a first operation on the first control. The large-screen device generates a first instruction in response to the first operation, where the first instruction is used to obtain two desktops of the electronic device. The large-screen device sends the first instruction to the electronic device. The electronic device generates a second window according to the first instruction, where the second window includes any two of the plurality of desktops of the electronic device. The electronic device sends the second window to the large-screen device. The large-screen device displays a second user interface including the second window.

In a possible implementation, the electronic device includes three or more desktops. The second window further includes the first control. After the large-screen device displays a second user interface including the second window, the method further includes that the large-screen device receives a second operation on the first control in the second window. The large-screen device generates a second instruction in response to the second operation, where the second instruction is used to obtain three desktops of the electronic device. The large-screen device sends the second instruction to the electronic device. The electronic device generates a third window according to the second instruction, where the third window includes any three of the plurality of desktops of the electronic device. The electronic device sends the third window to the large-screen device. The large-screen device displays a third user interface including the third window.

In a possible implementation, the first window further includes a second control. The second control is configured to display, in the large-screen device, an interface of an application running in the electronic device. After the large-screen device displays a first user interface including the first window, the method further includes that the large-screen device receives a third operation on the second control. The large-screen device generates a third instruction in response to the third operation, where the third instruction is used to obtain the interface of the application running in the electronic device. The large-screen device sends the third instruction to the electronic device. The electronic device generates a fourth window according to the third instruction, where the fourth window includes the interface of the application running in the electronic device. The electronic device sends the fourth window to the large-screen device. The large-screen device displays a fourth user interface including the fourth window.

In a possible implementation, the first window further includes a third control, and the third control is configured to search the first window for the application on the electronic device.

According to a fourth aspect, an embodiment of this disclosure provides an electronic device. The electronic device includes one or more processors, a memory, and a communications module. The memory and the communications module are coupled to the one or more processors. The memory stores a computer program. When the one or more processors execute the computer program, the electronic device performs the following operations of obtaining preset information, where the preset information includes information about an application installed on the electronic device, and the information about the application includes at least one of a name, an icon, and a package name of the application, generating a first window based on the preset information, where the first window includes any one of a plurality of desktops of the electronic device, and sending the first window to a large-screen device, so that the large-screen device displays a first user interface, where the first user interface includes the first window.

In a possible implementation, the first window further includes a first control. The first control is configured to adjust a quantity of desktops of the electronic device included in the first window. After the electronic device sends the first window to the large-screen device, the method further includes that the electronic device receives a first instruction sent by the large-screen device, where the first instruction is an instruction generated by the large-screen device in response to a first operation on the first control, and the first instruction is used to obtain two desktops of the electronic device. The electronic device generates a second window according to the first instruction, where the second window includes any two of the plurality of desktops of the electronic device. The electronic device sends the second window to the large-screen device, so that the large-screen device displays a second user interface, where the second user interface includes the second window.

In a possible implementation, the electronic device includes three or more desktops. The second window further includes the first control. After the electronic device sends the second window to the large-screen device, the method further includes that the electronic device receives a second instruction sent by the large-screen device, where the second instruction is an instruction generated by the large-screen device in response to a second operation on the first control in the second window, and the second instruction is used to obtain three desktops of the electronic device. The electronic device generates a third window according to the second instruction, where the third window includes any three of the plurality of desktops of the electronic device. The electronic device sends the third window to the large-screen device, so that the large-screen device displays a third user interface, where the third user interface includes the third window.

In a possible implementation, the first window further includes a second control. The second control is configured to display, in the large-screen device, an interface of an application running in the electronic device. After the electronic device sends the first window to the large-screen device, the method further includes that the electronic device receives a third instruction sent by the large-screen device, where the third instruction is an instruction generated by the large-screen device in response to a third operation on the second control. The electronic device generates a fourth window according to the third instruction, where the fourth window includes the interface of the application running in the electronic device. The electronic device sends the fourth window to the large-screen device, so that the large-screen device displays a fourth user interface, where the fourth user interface includes the fourth window.

In a possible implementation, the first window further includes a third control, and the third control is configured to search the first window for the application on the electronic device.

According to a fifth aspect, an embodiment of this disclosure provides a large-screen device. The large-screen device includes one or more processors, a memory, and a communications module. The memory and the communications module are coupled to the one or more processors. The memory stores a computer program. When the one or more processors execute the computer program, the large-screen device performs the following operations of receiving a first window sent by an electronic device, where the first window is a window generated by the electronic device based on preset information, the preset information includes information about an application installed on the electronic device, and the information about the application includes at least one of a name, an icon, and a package name of the application, and displaying a first user interface based on the first window, where the first user interface includes the first window, and the first window includes any one of a plurality of desktops of the electronic device.

In a possible implementation, the first window further includes a first control. The first control is configured to adjust a quantity of desktops of the electronic device included in the first window. After the large-screen device displays a first user interface based on the first window, the method further includes that the large-screen device receives a first operation on the first control. The large-screen device displays a second user interface in response to the first operation, where the second user interface includes a second window, and the second window includes any two of the plurality of desktops of the electronic device.

In a possible implementation, the electronic device includes three or more desktops. The second window further includes the first control. After the large-screen device displays a second user interface, the method further includes that the large-screen device receives a second operation on the first control in the second window. The large-screen device displays a third user interface in response to the second operation, where the third user interface includes a third window, and the third window includes any three of the plurality of desktops of the electronic device.

In a possible implementation, the first window further includes a second control. The second control is configured to display, in the large-screen device, an interface of an application running in the electronic device. After the large-screen device displays a first user interface based on the first window, the method further includes that the large-screen device receives a third operation on the second control. The large-screen device displays a fourth user interface in response to the third operation, where the fourth user interface includes the interface of the application running in the electronic device.

In a possible implementation, after the large-screen device displays a fourth user interface, the method further includes that the large-screen device receives a fourth operation on a first application interface in the fourth user interface. The large-screen device displays a fifth user interface in response to the fourth operation, where the fifth user interface includes the first application interface that is activated, and the first application interface is an interface of any application in interfaces of applications running in the electronic device.

In a possible implementation, the fifth user interface includes the second control. After the large-screen device displays a fifth user interface, the method further includes that the large-screen device receives a fifth operation on the second control in the fifth user interface. The large-screen device displays the fourth user interface in response to the fifth operation.

In a possible implementation, the first window further includes a third control, and the third control is configured to search the first window for the application on the electronic device.

According to a sixth aspect, an embodiment of this disclosure provides an information interaction system. The information interaction system includes an electronic device and a large-screen device. The electronic device is the electronic device according to the fourth aspect, and the large-screen device is the large-screen device according to the fifth aspect.

According to a seventh aspect, an embodiment of this disclosure provides a computer-readable storage medium. The computer-readable storage medium stores a computer program, and the computer program is executed by a processor to implement the method according to any one of the first aspect and the possible implementations of the first aspect.

According to an eighth aspect, an embodiment of this disclosure provides a computer-readable storage medium. The computer-readable storage medium stores a computer program, and the computer program is executed by a processor to implement the method according to any one of the second aspect and the possible implementations of the second aspect.

It may be understood that the electronic device according to the fourth aspect and the computer storage medium according to the seventh aspect are both configured to perform the display method according to the first aspect. Therefore, for beneficial effects that can be achieved by the electronic device and the computer storage medium, refer to beneficial effects in the corresponding method. Details are not described herein again. The large-screen device according to the fifth aspect and the computer storage medium according to the eighth aspect are both configured to perform the display method according to the second aspect. Therefore, for beneficial effects that can be achieved by the electronic device and the computer storage medium, refer to beneficial effects in the corresponding method. Details are not described herein again.

DESCRIPTION OF EMBODIMENTS

The following clearly and completely describes the technical solutions in embodiments of this disclosure with reference to the accompanying drawings in the embodiments of this disclosure.

Figure 1:
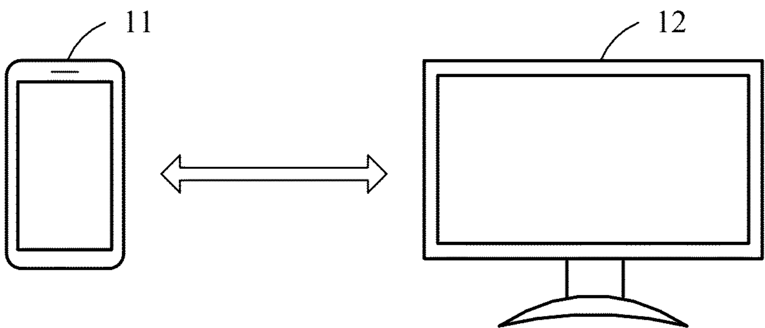
FIG. 1 is a schematic diagram of an architecture of an information interaction system according to an embodiment of this disclosure.

To better understand a display method, a device, and a system provided in the embodiments of this disclosure, the following first describes an architecture of an information interaction system to which the display method provided in the embodiments of this disclosure is applicable. FIG. 1 is a schematic diagram of an architecture of a display system according to an embodiment of this disclosure. As shown in FIG. 1, the architecture of the system may include one or more electronic devices 11 (one electronic device is merely shown as an example in FIG. 1) and one or more large-screen devices 12 (one large-screen device is merely shown as an example in FIG. 1).

One or more applications may be installed and ran on the electronic device 11. The one or more applications may be, for example, WECHAT, MEITUAN, and mail, or may be an application (the application is referred to as a “Multi-screen proxy” in subsequent embodiments of this disclosure) used to project content displayed on the electronic device 11 onto the large-screen device. The electronic device 11 may include but is not limited to any hand-held electronic product based on an intelligent operating system, for example, a smartphone, a tablet computer, a hand-held computer, or a wearable electronic device, and may perform human-machine interaction with a user by using an input device such as a keyboard, a virtual keyboard, a touchpad, a touchscreen, or a voice-controlled device. The intelligent operating system includes but is not limited to any operating system that enriches functions of a device by providing various applications for the device, such as ANDROID, IOS, WINDOWS, and MAC.

The large-screen device 12 may include but is not limited to a tablet computer, a personal computer, a desktop computer, a television, an in-vehicle display, or the like. The large-screen device 12 may establish a connection to the electronic device 11 in a manner such as through a data line, BLUETOOTH, or a WI-FI network, to perform data interaction. The large-screen device 12 provides a display service for the electronic device 11. Corresponding programs need to run on the large-screen device 12 to provide the display service, for example, an application (which may be referred to as a “Multi-screen proxy” below) for receiving and storing information sent by the electronic device 11, and an application (which may be referred to as “Window interface display” below) displayed on a display of the large-screen device 12 based on the information sent by the electronic device 11.

The following first describes an example of an electronic device provided in the following embodiments of this disclosure.

Figure 2:
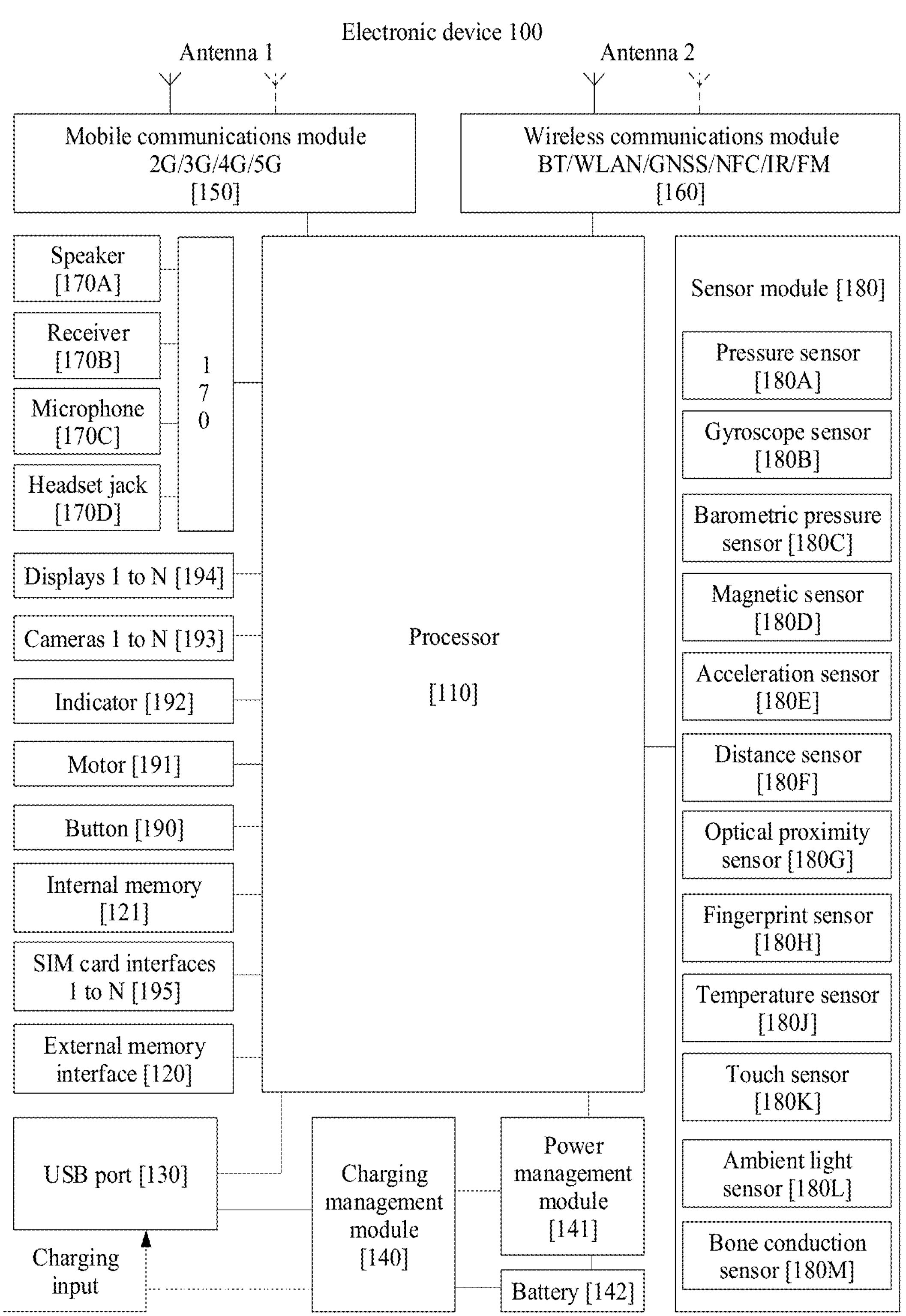
FIG. 2 is a schematic diagram of a hardware structure of an electronic device according to an embodiment of this disclosure.

FIG. 2 is a schematic diagram of a structure of an electronic device 100. The electronic device 100 may be the electronic device 11 shown in FIG. 1.

The electronic device 100 may include a processor 110, an external memory interface 120, an internal memory 121, a Universal Serial Bus (USB) port 130, a charging management module 150, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the electronic device 100. In some other embodiments of this disclosure, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache. The memory may store an instruction or data that has been used or is cyclically used by the processor 110. If the processor 110 needs to use the instruction or the data again, the processor may directly invoke the instruction or the data from the memory. This avoids repeated access and reduces a waiting time of the processor 110, thereby improving system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a Mobile Industry Processor Interface (MIPI), a general-purpose input/output (GPIO) interface, a SIM interface, a USB port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a BLUETOOTH headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a BLUETOOTH headset. Both the I2S interface and the PCM interface may be used to perform audio communication.

The UART interface is a universal serial data bus, and is used to perform asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a BLUETOOTH module in the wireless communications module 160 through the UART interface, to implement a BLUETOOTH function. In some embodiments, the audio module 170 may transmit an audio signal to the wireless communications module 160 through the UART interface, to implement a function of playing music by using the BLUETOOTH headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a shooting function of the electronic device 100. The processor 110 communicates with the display 194 through the DSI, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The USB port 130 is a port that conforms to a USB standard specification, and may be further a mini USB port, a micro USB port, a USB type-C port, or the like. The USB port 130 may be used to connect to a charger for charging the electronic device 100, may be used to transmit data between the electronic device 100 and a peripheral device, or may be used to connect to a headset for playing audio through the headset. Alternatively, the port may be used to connect to another electronic device, for example, an augmented reality (AR) device.

It may be understood that an interface connection relationship between modules illustrated in this embodiment of this disclosure is merely an example for description, and does not constitute a limitation on the structure of the electronic device 100. In some other embodiments of this disclosure, the electronic device 100 may alternatively use an interface connection manner different from an interface connection manner in this embodiment, or a combination of a plurality of interface connection manners.

The charging management module 150 is configured to receive a charging input from the charger. The charger may be a wireless charger or a wired charger. In some embodiments of wired charging, the charging management module 150 may receive a charging input from a wired charger through the USB port 130. In some embodiments of wireless charging, the charging management module 150 may receive a wireless charging input through a wireless charging coil of the electronic device 100. The charging management module 150 may further supply power to the electronic device by using the power management module 141 while charging the battery 142.

The power management module 141 is configured to connect the battery 142 and the charging management module 150 to the processor 110. The power management module 141 receives an input of the battery 142 and/or an input of the charging management module 150, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 150 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes second generation (2G)/third generation (3G)/fourth generation (4G)/fifth generation (5G) or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then a processed low-frequency baseband signal is transferred to the application processor. The application processor outputs a sound signal by using an audio device (which is not limited to the speaker 170A, the receiver 170B, or the like), or displays an image or a video on the display 194. In some embodiments, the modem processor may be an independent device. In some other embodiments, the modem processor may be independent of the processor 110, and is disposed in a same device with the mobile communication module 150 or another function module.

The wireless communications module 160 may provide a wireless communication solution that includes a wireless local area network (WLAN) (for example, a WI-FI network), BLUETOOTH (BT), a global navigation satellite system (GNSS), frequency modulation (FM), near-field communication (NFC), an infrared (IR) technology, and the like and that is applied to the electronic device 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a Quasi-Zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a Mini-LED, a Micro-LED, a Micro-OLED, quantum dot LED (QLED), or the like. In some embodiments, the electronic device 100 may include one or N displays 194, where N is a positive integer greater than 1.

The electronic device 100 can implement a shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as a red, green, and blue (RGB) format or a luma, blue projection, and red projection (YUV) format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. In this way, the electronic device 100 can play or record videos in a plurality of encoding formats, for example, Moving Picture Experts Group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro Secure Digital (SD) card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device 100 is used, and the like. In addition, the internal memory 121 may include a high-speed random-access memory (RAM), and may further include a nonvolatile memory, for example, at least one magnetic disk storage device, a flash memory, and a Universal Flash Storage (UFS). The processor 110 runs the instructions stored in the internal memory 121 and/or the instructions stored in the memory disposed in the processor, to perform various function applications of the electronic device 100 and data processing.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 millimeters (mm) Open Mobile Terminal Platform (OMTP) standard interface or cellular telecommunications industry association of the United States of America (USA) (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing a Short Message Service (SMS) message is executed. When a touch operation whose touch operation intensity is greater than or equal to the first pressure threshold is performed on an application icon "Messages", an instruction for creating an SMS message is executed.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during photographing. For example, when a shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor may be further configured to recognize a posture of the electronic device, and is used in screen switching between a landscape mode and a portrait mode, a pedometer, or another application.

The distance sensor 180F is configured to measure a distance. The electronic device 100 may measure the distance in an infrared or a laser manner. In some embodiments, in a photographing scenario, the electronic device 100 may measure a distance by using the distance sensor 180F to implement quick focusing.

The optical proximity sensor 180G may include, for example, an LED and an optical detector such as a photodiode. The LED may be an infrared LED. The electronic device 100 emits infrared light by using the LED. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different regions of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is applicable to different types of SIM cards. The SIM card interface 195 is also applicable to an external storage card. The electronic device 100 interacts with a network through the SIM card, to implement functions such as calling and data communication. In some embodiments, the electronic device 100 uses an embedded-SIM (eSIM), namely, an embedded SIM card. The eSIM card may be embedded into the electronic device 100, and cannot be separated from the electronic device 100.

Figure 3:
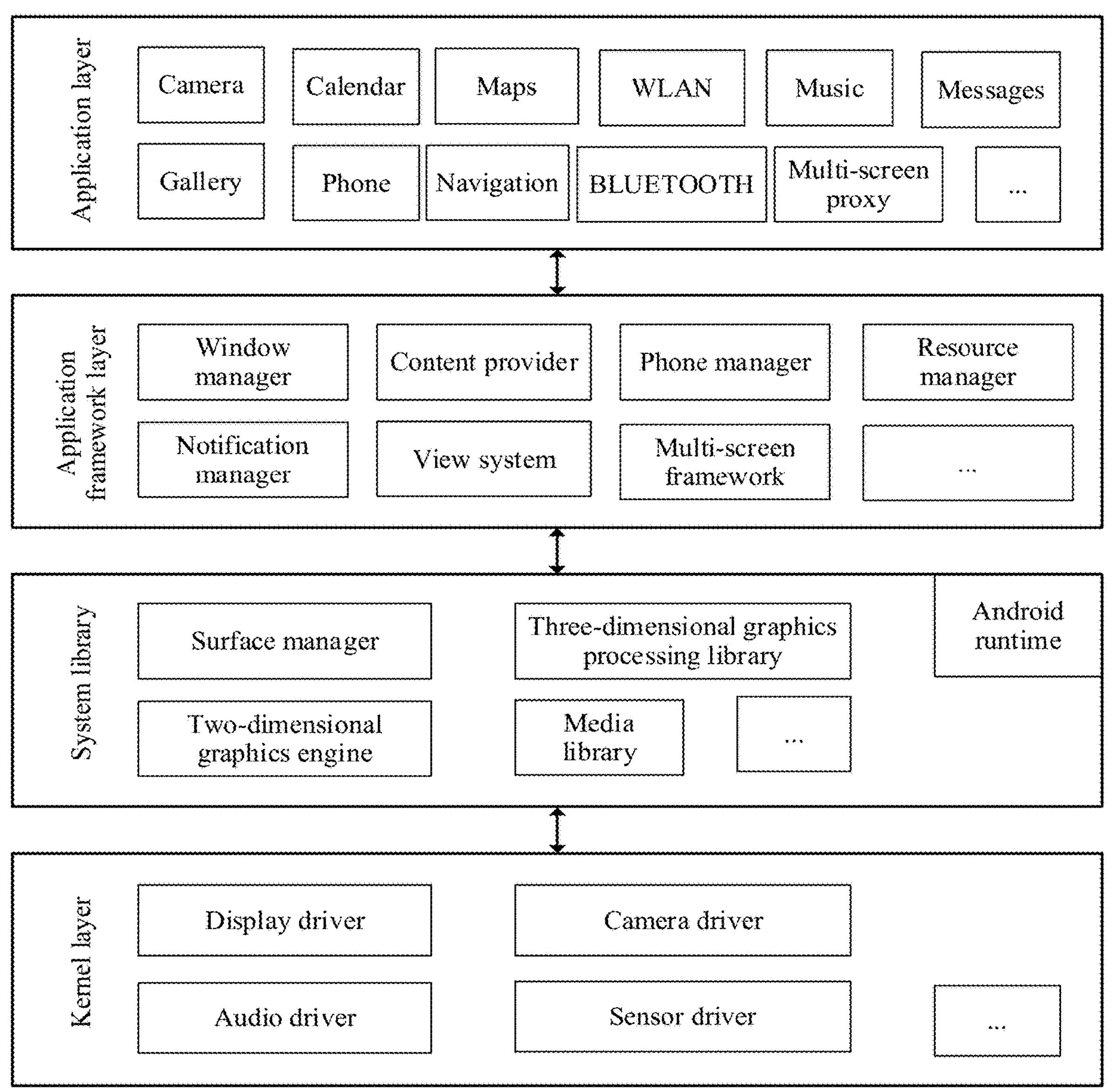
FIG. 3 is a schematic diagram of a software structure of an electronic device according to an embodiment of this disclosure.

Based on the schematic diagram of the hardware structure of the electronic device 100 according to the embodiment of this disclosure shown in FIG. 2, the following describes a block diagram of a software structure of an electronic device 100 according to an embodiment of this disclosure, as shown in FIG. 3.

A software system of the electronic device 100 may use a layered architecture, an event-driven architecture, a microkernel architecture, a micro service architecture, or a cloud architecture. In this embodiment of this disclosure, an ANDROID system with a layered architecture is used as an example to describe the software structure of the electronic device 100.

In a layered architecture, software is divided into several layers, and each layer has a clear role and task. The layers communicate with each other through a software interface. In some embodiments, an ANDROID system is divided into four layers: an application layer, an application framework layer, an ANDROID runtime and system library, and a kernel layer from top to bottom.

The application layer may include a series of application packages.

As shown in FIG. 3, the application packages may include applications such as camera, gallery, calendar, phones, maps, navigation, WLAN, BLUETOOTH, music, messages, and multi-screen proxy.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, a multi-screen framework, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and an image display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The multi-screen framework is configured to notify a "Multi-screen proxy" at the application layer of each event notification indicating that the electronic device 100 establishes a connection to a large-screen device, and may be further configured to assist the "Multi-screen proxy" in obtaining data information in response to an instruction from the "Multi-screen proxy" at the application layer.

The ANDROID runtime includes a kernel library and a virtual machine. The ANDROID runtime is responsible for scheduling and management of the ANDROID system.

The kernel library includes two parts: a function that needs to be invoked in JAVA language and a kernel library of ANDROID.

The application layer and the application framework layer run on the virtual machine. The virtual machine executes JAVA files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional (3D) graphics processing library (for example, OpenGL for Embedded Systems (ES)), and a second-dimensional (2D) graphics engine (for example, SGL).

The surface manager is configured to manage a display subsystem and provide fusion of 2D and 3D layers for a plurality of applications.

The media library supports playback and recording of audio and video in a plurality of commonly used formats, static image files, and the like. The media library may support a plurality of audio and video coding formats, for example, MPEG-4, H.264, MP3, Advanced Audio Coding (AAC), Adaptive Multi-Rate (AMR), Joint Photographic Experts Group (JPG), and Portable Network Graphics (PNG).

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to a scenario in which the electronic device 100 transmits information to a large-screen device, the following uses an example to describe a working procedure of software and hardware of the electronic device 100. It should be noted that a desktop of the electronic device 100 may be one or more user interfaces that are displayed in a region of a home screen after the electronic device is started and a system of the electronic device is successfully logged in. The user interfaces may include icons and names of applications installed on the electronic device.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event.

For example, the touch operation is a touch-tap operation, and a control corresponding to the tap operation is a control corresponding to the "Multi-screen proxy" application. The "Multi-screen proxy" application invokes a multi-screen framework interface at the application framework layer to enable the "Multi-screen proxy" application, further invokes the resource manager at the application framework layer to obtain information about the applications at the application layer, and then invokes a WLAN application at the application layer to transfer the obtained information about the applications to the large-screen device via a network channel.

Based on the system framework in FIG. 1, the hardware framework of the electronic device in FIG. 2, and the software framework of the electronic device in FIG. 3, the embodiments of this disclosure provide a display method, a device, and a system. An application with a "Multi-screen proxy" service is installed on the electronic device in the embodiments of this disclosure. Information on the electronic device needs to be transmitted to a large-screen device when a "Multi-screen proxy" function of the electronic device is enabled in the embodiments of this disclosure.

The "Multi-screen proxy" may be a service or a function provided by the electronic device, and may be used to implement functions such as establishing a connection between the electronic device and the large-screen device, transmitting data between the electronic device and the large-screen device, and transmitting an instruction between the large-screen device and the electronic device. For example, the "Multi-screen proxy" may be an Android Package (APK), and may be installed on the electronic device in a form of a control or an app.

In a specific implementation, the three functions of establishing a connection between the electronic device and the large-screen device, transmitting data between the electronic device and the large-screen device, and transmitting an instruction between the large-screen device and the electronic device may not be integrated into one APK file, and these functions may be implemented by using one or more APK files.

It may be understood that the "Multi-screen proxy" is merely a word used in the embodiments, a meaning represented by the word has been recorded in the embodiments, and a name of the word does not constitute any limitation on the embodiments.

The following describes examples of some user interfaces (UI) provided by the electronic device and the large-screen device in the embodiments of this disclosure. The term "user interface" in the specification, claims, and accompanying drawings of this disclosure is a medium interface for interaction and information exchange between an application or an operating system and a user, and implements conversion between an internal form of information and a form that can be accepted by the user. The user interface is usually in a representation form of a graphical user interface (GUI), which is a user interface that is related to a computer operation and that is displayed in a graphical manner. The user interface may be an interface element such as an icon, a window, or a control displayed on a display of the electronic device, and the control may include a visual interface element such as an icon, a button, a menu, a tab, a text box, a dialog box, a status bar, a navigation bar, or a widget.

Figure 4A:
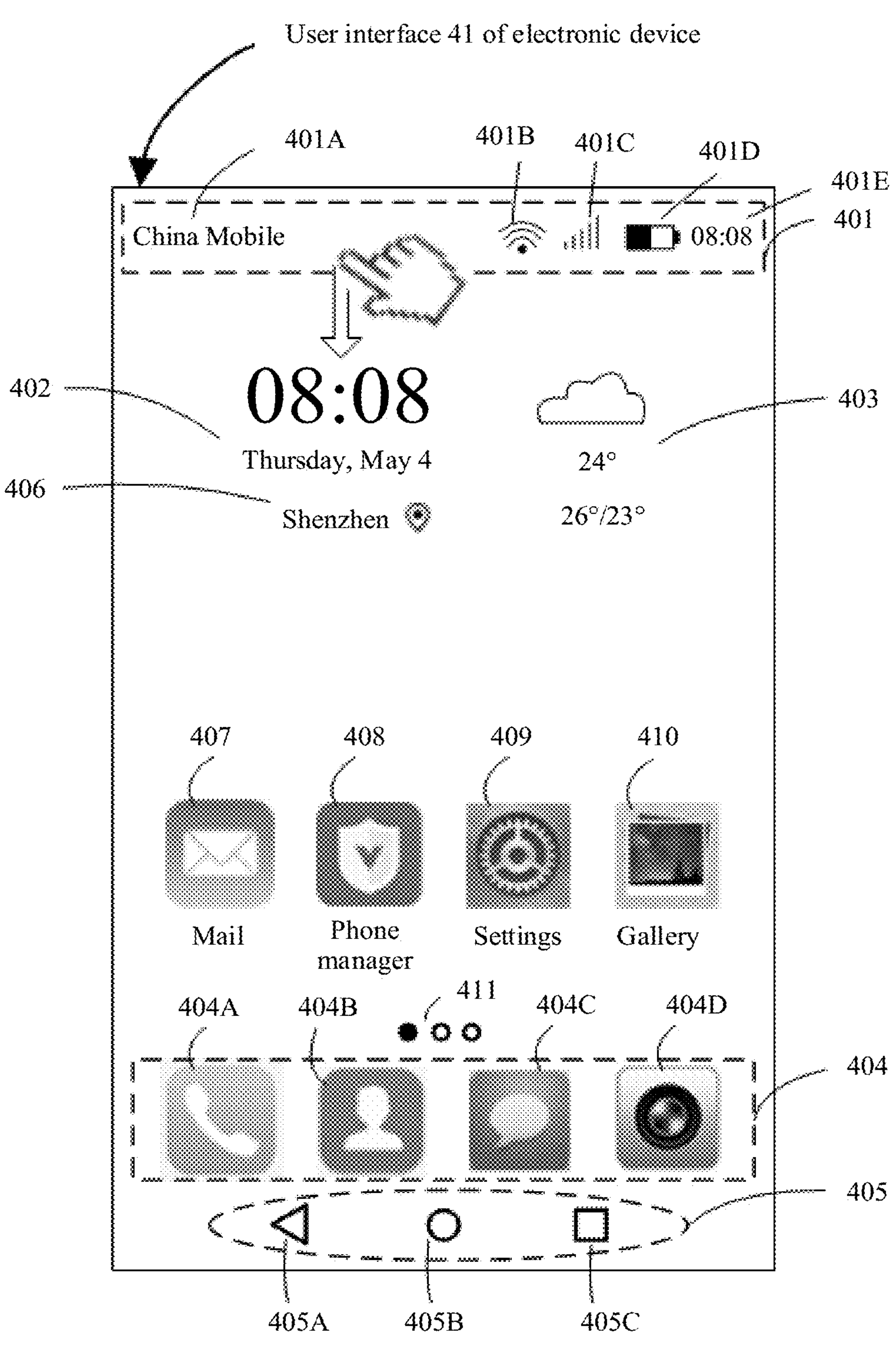
FIG. 4A is a schematic diagram of a user interface of an electronic device according to an embodiment of this disclosure.

FIG. 4A shows an example of a user interface 41 that is of an electronic device and that is used to display an application installed on the electronic device.

The user interface 41 may include a status bar 401, a calendar indicator 402, a weather indicator 403, a tray 404 including commonly used application icons, a navigation bar 405, a location information indicator 406, and other application icons. The status bar 401 may include an operator name (for example, "China Mobile") 401A, one or more signal strength indicators 401B of WI-FI signals, one or more signal strength indicators 401C of mobile communication signals (or cellular signals), a battery status indicator 401D, and a time indicator 401E.

The calendar indicator 402 may be used to indicate a current time, for example, a date, a day of the week, or information stated in hours and minutes.

The weather indicator 403 may be used to indicate a weather type such as cloudy to clear or light rain, and may be further used to indicate information such as a temperature.

The tray 404 including commonly used application icons may display a phone icon 404A, a contacts icon 404B, a messages icon 404C, and a camera icon 404D.

The navigation bar 405 may include system navigation buttons such as a back button 405A, a home button 405B, and a recent button 405C. When detecting that a user taps the back button 405A, the electronic device may display a previous page of a current page. When detecting that the user taps the home button 405B, the electronic device may display a home screen. When detecting that the user taps the recent button 405C, the electronic device may display a task recently started by the user. The navigation buttons may alternatively have other names. This is not limited in this disclosure. Each navigation button in the navigation bar 405 is not limited to a virtual button, and may alternatively be implemented as a physical button.

The location information indicator 406 may be used to indicate information such as a current city and/or a district in the current city.

The other application icons may be, for example, a mail icon 407, a phone manager icon 408, a settings icon 409, and a gallery icon 410.

The user interface 41 may further include a page indicator 411. The other application icons may be distributed on a plurality of pages, and the page indicator 411 may be used to indicate a specific page on which an application currently browsed by the user is located. The user may slide a region of the other application icons leftward or rightward to browse application icons on other pages.

In some embodiments, for example, the user interface 41 shown in FIG. 4A may be a home screen of the electronic device.

In some other embodiments, the electronic device may further include a physical home button. The home button may be used to receive an instruction from the user, and switch from a currently displayed UI to the home screen, so that the user can view the home screen at any time. The instruction may be further an operation instruction of pressing the home button once by the user, may be an operation instruction of consecutively pressing the home button twice within a short time by the user, or may be an operation instruction of touching and holding the home button within a predetermined time by the user. In some other embodiments of this disclosure, a fingerprint sensor may be further integrated into the home button, so that a fingerprint is collected and recognized when the home button is pressed.

It may be understood that FIG. 4A merely shows the example of the user interface of the electronic device, and does not constitute a limitation on the embodiments of this disclosure.

The following describes an example of a manner of enabling a “Multi-screen proxy” service on an electronic device according to an embodiment of this disclosure.

Figure 4B:
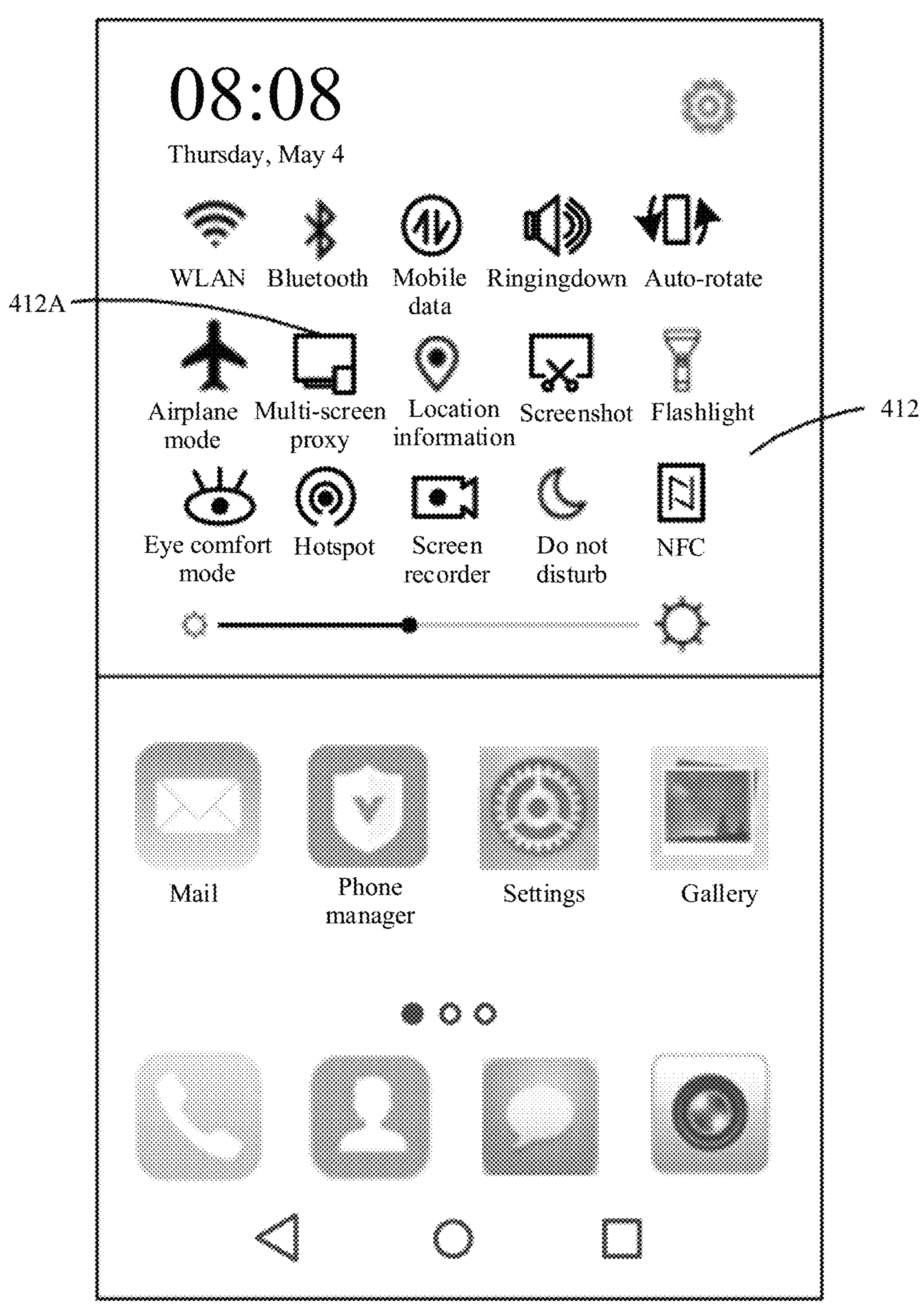
FIG. 4B is a schematic diagram of a dropdown menu of a status bar in a user interface of an electronic device according to an embodiment of this disclosure.

FIG. 4A and FIG. 4B show examples of operations of enabling the “Multi-screen proxy” on the electronic device.

As shown in FIG. 4A, when the electronic device detects a downward slide gesture on the status bar 401, the electronic device may display a window 412 in a user interface 41 in response to the gesture. As shown in FIG. 4B, the window 412 may display a switch control 412A for the “Multi-screen proxy” service, and may further display switch controls for other functions (for example, WI-FI, BLUETOOTH, or flashlight). When detecting a touch operation on the switch control 412A (for example, a tap operation on the switch control 412A) in the window 412, the electronic device may enable the “Multi-screen proxy” service in response to the touch operation.

In other words, the user may perform the downward slide gesture on the status bar 401 to open the window 412, and may tap the switch control 412A for the “Multi-screen proxy” service in the window 412 to conveniently enable the “Multi-screen proxy” service. A representation form of the switch control 412A for the “Multi-screen proxy” service may be but is not limited to, text information and/or an icon.

In this embodiment of this disclosure, after the “Multi-screen proxy” service is enabled through the operations shown in FIG. 4A and FIG. 4B, the electronic device may transmit information to a large-screen device after establishing a connection to the large-screen device.

In a possible implementation, the “Multi-screen proxy” may also be displayed on a desktop of the electronic device in a form of an application icon of an application such as Mail or Gallery. After detecting a tap or touch operation on the “Multi-screen proxy” icon, the electronic device enables the “Multi-screen proxy” service for the electronic device.

In some embodiments of this disclosure, after enabling the “Multi-screen proxy” service, the electronic device may further display, in the status bar 401, prompt information indicating that the “Multi-screen proxy” service has been enabled. For example, in the status bar 401, an icon of the “Multi-screen proxy” service is displayed, or a text “Multi-screen proxy” is directly displayed.

In the embodiments of this disclosure, this is not limited to the foregoing manner of enabling the “Multi-screen proxy” service. In some embodiments, the “Multi-screen proxy” service may be enabled in another manner. In some other embodiments, the electronic device may also enable the “Multi-screen proxy” service by default. For example, the electronic device automatically enables the “Multi-screen proxy” service after being powered on.

Likewise, the “Multi-screen proxy” on the large-screen device may be displayed on a display of the large-screen device in a form of an application icon. The large-screen device enables a “Multi-screen proxy” function of the large-screen device in response to a tap or touch operation on the “Multi-screen proxy” application icon. It should be noted that there is another method for enabling the “Multi-screen proxy” function of the large-screen device. Details are not described herein.

The following describes some embodiments of examples of graphical user interfaces implemented in a process in which an electronic device establishes a connection to a large-screen device after the electronic device enables a “Multi-screen proxy” service function.

First, the following uses an example in which the electronic device is a mobile phone and the large-screen device is a computer to describe the process of discovering the device and establishing the connection between the electronic device and the large-screen device through NFC. The following describes the process of establishing the connection between the two devices in two cases.

Case 1: The electronic device and the large-screen device are not logged in with a same system account.

In a specific embodiment, it is assumed that both the electronic device and the large-screen device are devices of a same brand, but the two devices are not logged in with the same system account after being started, or the electronic device and the large-screen device are devices of different brands. In these cases, it indicates that the electronic device and the large-screen device are devices logged in with different accounts, namely, devices that are not simultaneously logged in with one same system account. In this case, the electronic device and the large-screen device may be connected in the following manner.

Further, the electronic device and the large-screen device each have an NFC function. When the NFC function of the electronic device and the NFC function of the large-screen device are enabled, the electronic device may be placed close to or in contact with the large-screen device, for example, a preset part such as a back of the electronic device may be placed close to or in contact with a preset location such as a location with a sharing or connection tag on the large-screen device, so that the electronic device and the large-screen device can discover each other. Then, a user interface of the discovered large-screen device, for example, an interface shown in FIG. 5A, may be displayed on a display of the electronic device.

Figure 5A:
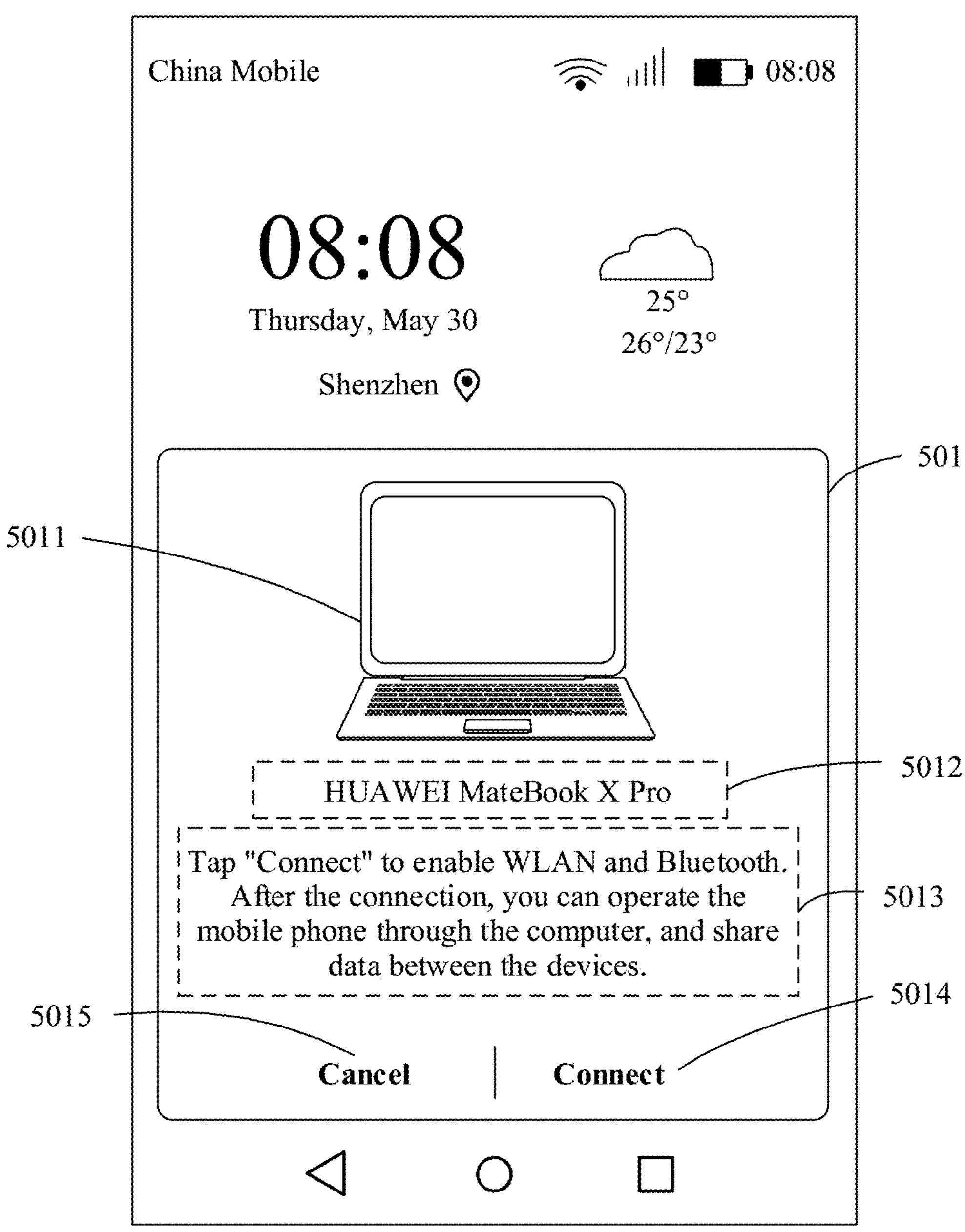
FIG. 5A, FIG. 5B, FIG. 5C, FIG. 5D, FIG. 5E, FIG. 5F, and FIG. 5G are schematic diagrams of a manner of establishing a connection between an electronic device and a large-screen device according to an embodiment of this disclosure.

The user interface shown in FIG. 5A includes a window 501. The window 501 includes an icon 5011 of the discovered large-screen device, a name 5012 of the large-screen device, prompt information 5013, a "Connect" control 5014, and a "Cancel" control 5015.

The icon 5011 of the large-screen device may be, for example, an icon of a computer. The name 5012 of the large-screen device may be, for example, HUAWEI MATEBOOK X Pro. The prompt information 5013 may be used to indicate, to the user, a function of the "Connect" control 5014 and a result after the connection. For example, the prompt information 5013 may be "Tap 'Connect' to enable WLAN and BLUETOOTH. After the connection, you can operate the mobile phone through the computer, and share data between the devices". The "Connect" control 5014 may be configured to send a connection acknowledgment request to the large-screen device. The "Cancel" control 5015 may be configured to cancel a connection operation between the electronic device and the large-screen device.

Optionally, WLAN and BLUETOOTH are enabled after the "Connect" control 5014 in FIG. 5A is tapped. The process of establishing the connection between the electronic device and the large-screen device may be completed through BLUETOOTH. After the connection is successfully established, the data can be exchanged and shared between the electronic device and the large-screen device through WLAN. Data exchange implemented between the electronic device and the large-screen device through WLAN after the connection is established through BLUETOOTH can improve a data exchange speed, and improve mutual response efficiency.

Figure 5B:
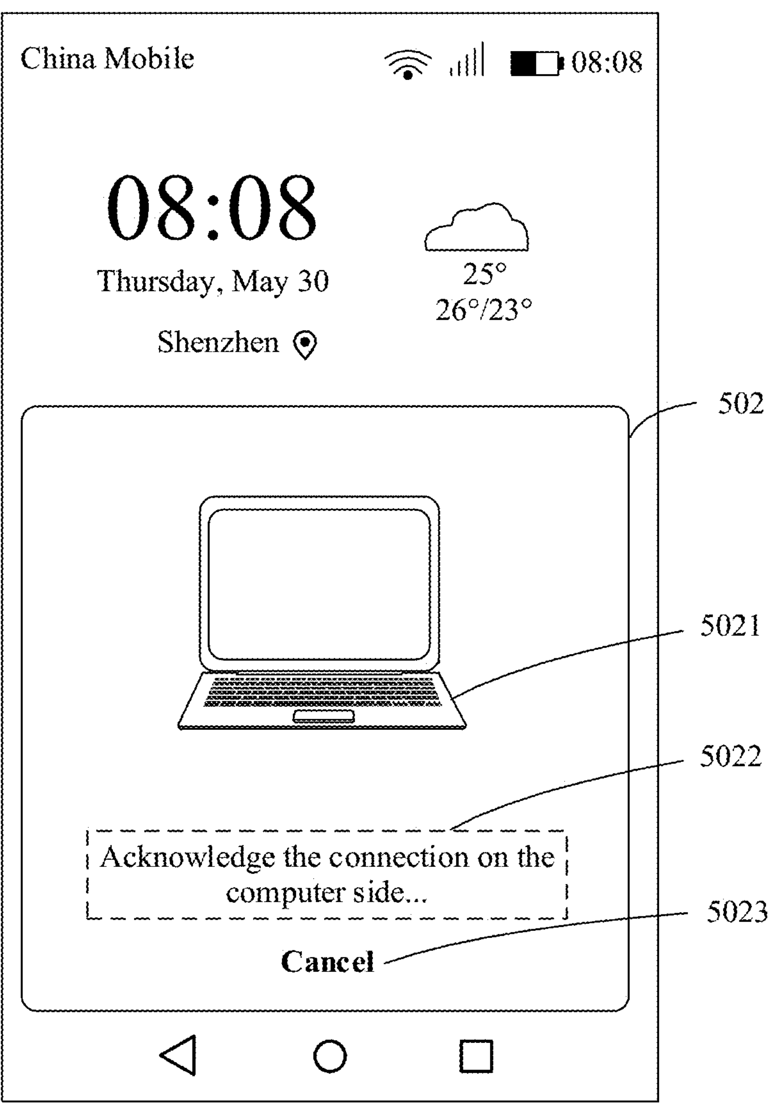

In the user interface shown in FIG. 5A, in response to a touch operation on the "Connect" control 5014, the electronic device displays a user interface shown in FIG. 5B. The user interface shown in FIG. 5B includes a window 502 in which acknowledgment from the large-screen device is awaited after the electronic device sends the connection acknowledgment request to the large-screen device. The window 502 may also include an icon 5021 of the large-screen device, prompt information 5022, and a "Cancel" control 5023.

The icon 5021 of the large-screen device may be, for example, an icon of a computer. The prompt information 5022 is used to indicate that acknowledgment from the large-screen device is awaited. For example, the prompt information 5022 may be "Acknowledge the connection on the computer side . . . ". The "Cancel" control 5023 may be configured to cancel a connection operation between the electronic device and the large-screen device.

In the user interface shown in FIG. 5A, the electronic device sends the connection request to the large-screen device in response to the touch operation on the "Connect" control 5014. After receiving the connection request, the large-screen device displays a user interface shown in FIG. 5C.

Figure 5C:
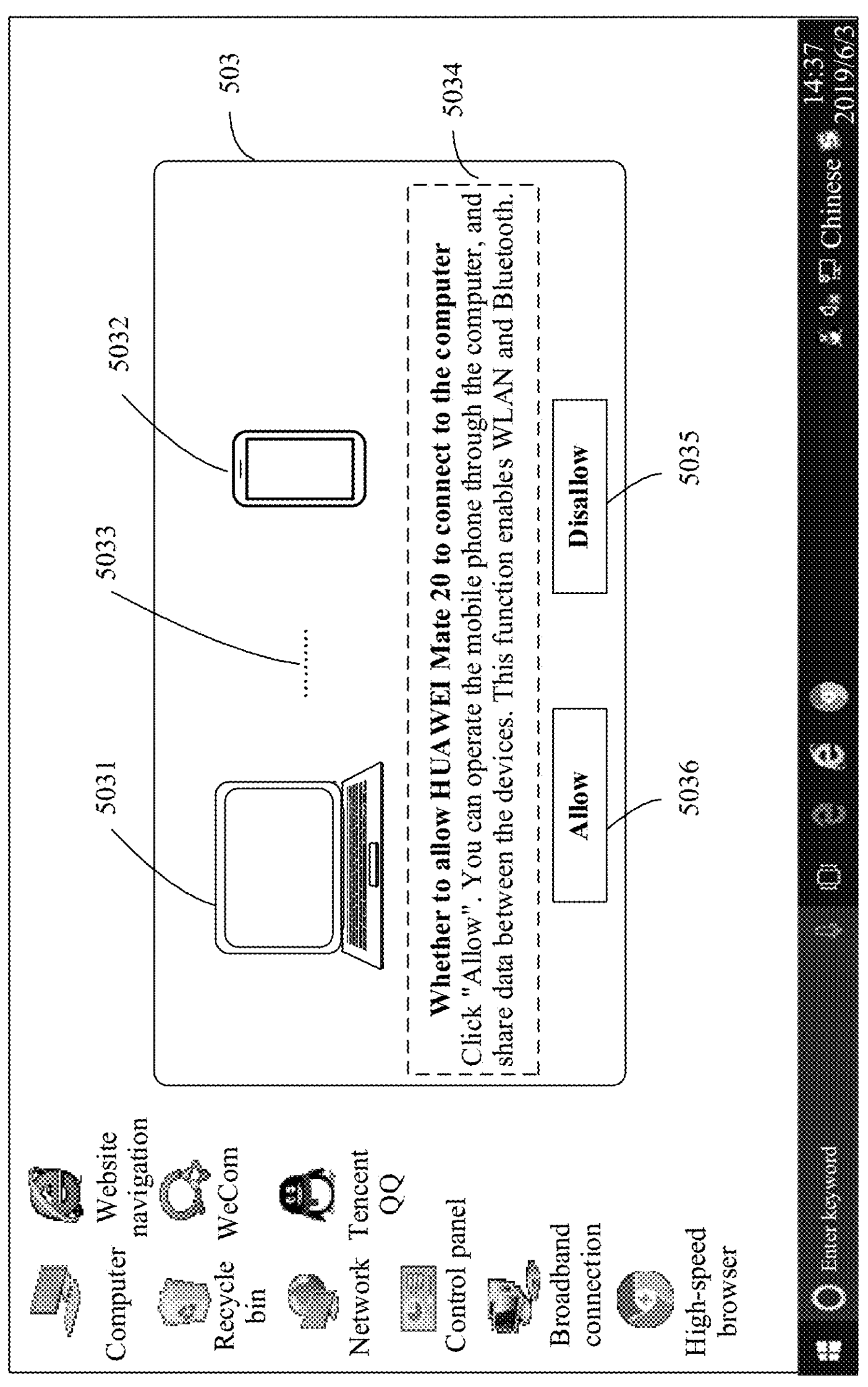

The user interface shown in FIG. 5C includes an acknowledgment window 503 indicating whether the large-screen device is connected to the electronic device. The window 503 includes an icon 5031 of the large-screen device, an icon 5032 of the electronic device, an association identifier 5033 between the large-screen device and the electronic device, prompt information 5034, a "Disallow" control 5035, and an "Allow" control 5036.

The icon 5031 of the large-screen device may be, for example, an icon of a computer. The icon 5032 of the electronic device may be, for example, an icon of a mobile phone. The prompt information 5034 may be used to indicate whether connection is performed, and indicate to the user a function of the "Allow" control 5036, and a result after the connection. For example, the prompt information 5034 may be "Whether to allow HUAWEI MATE 20 to connect to the computer. Click 'Allow'. You can operate the mobile phone through the computer, and share data between the devices. This function enables WLAN and BLUETOOTH." The "Disallow" control 5035 may be configured to disallow a connection to the electronic device. The "Allow" control 5036 may be configured to allow a connection to the electronic device. HUAWEI MATE 20 is a name of the electronic device.

Figure 7:
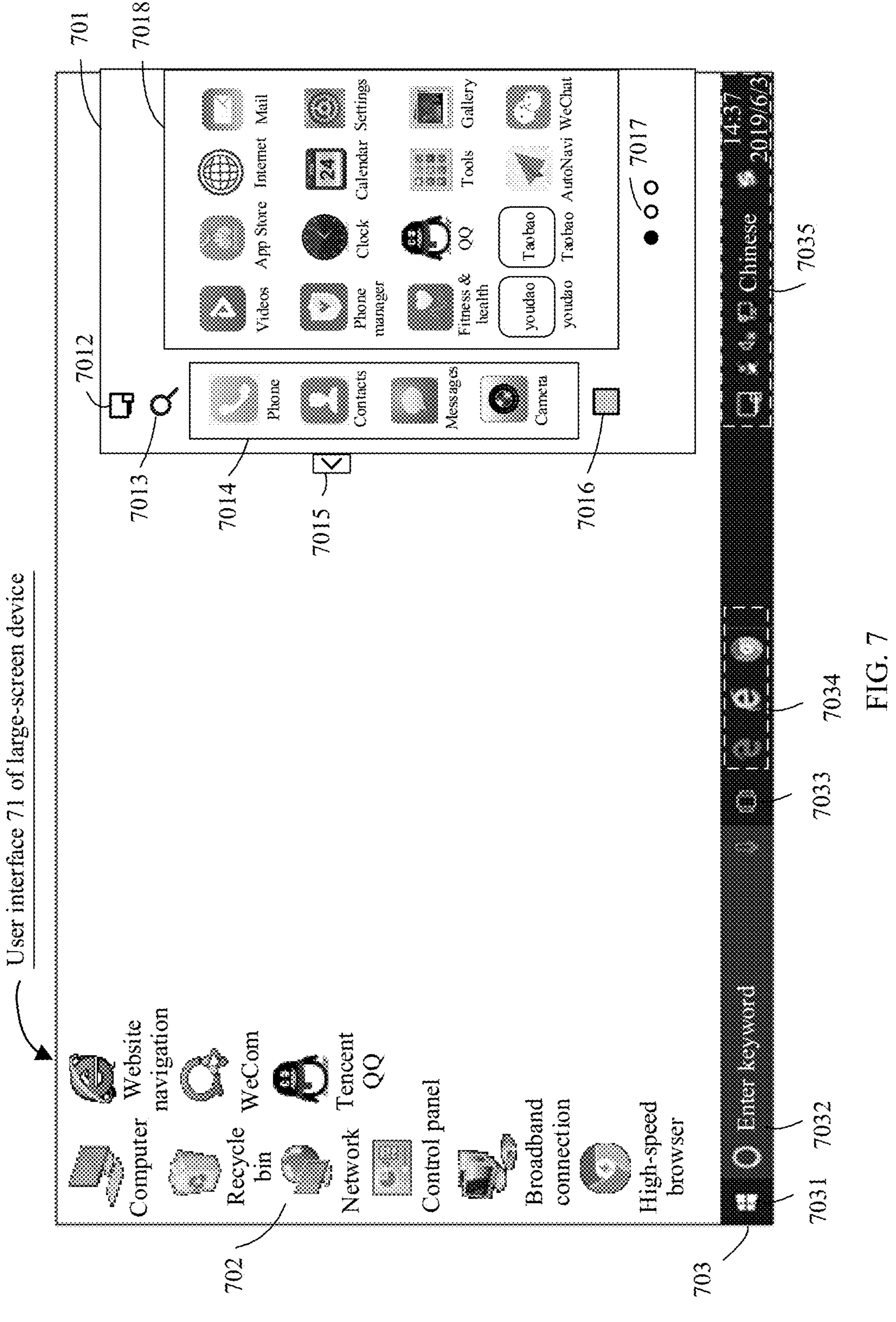
FIG. 7 is a schematic diagram of a user interface of a large-screen device according to an embodiment of this disclosure.

In the user interface shown in FIG. 5C, the large-screen device acknowledges, in response to a click or touch operation on the "Allow" control 5036, to establish the connection to the electronic device. For example, after the connection is established, a diagram of a user interface of the large-screen device may be shown in FIG. 7. It indicates that the connection has been successfully established between the electronic device and the large-screen device, and information on the electronic device is transmitted to the large-screen device and displayed on a display. The diagram of the interface shown in FIG. 7 is described in detail below. Details are not described herein.

A specific implementation of transmitting the information on the electronic device to the large-screen device and displaying the information on the display may include the following content.

A "multi-screen framework" (for example, the "multi-screen framework" at the application framework layer in FIG. 3) notifies an event indicating the connection success to a "Multi-screen proxy" (for example, the "Multi-screen proxy" at the application layer in FIG. 3) after the electronic device is successfully connected to the large-screen device. The "Multi-screen proxy" obtains, by using a resource manager (for example, the resource manager at the application framework layer in FIG. 3) or the "multi-screen framework" in response to the event notification, information about some or all of applications installed on the electronic device, where the information includes a name, an icon, and/or a package name of the application.

If the "Multi-screen proxy" obtains, by using the resource manager in response to the event notification, the information about some or all of the applications installed on the electronic device, after the obtaining is completed, the "Multi-screen proxy" transmits the obtained information to the "multi-screen framework", and sends a screen generation instruction to the "multi-screen framework". The "multi-screen framework" generates a virtual screen according to the received instruction and information. Then, the "multi-screen framework" transmits information about the generated virtual screen to the "Multi-screen proxy". The "Multi-screen proxy" sends the information about the virtual screen to the large-screen device. The large-screen device displays the information on the display after receiving the information about the virtual screen.

Further, the virtual screen in this specification may be a window that may be displayed in a user interface. The operation of generating a virtual screen may be an operation of drawing a virtual screen or the like. This is not limited herein.

If the "Multi-screen proxy" obtains, by using the "multi-screen framework" in response to the event notification, the information about some or all of the applications installed on the electronic device, after the obtaining is completed, the "Multi-screen proxy" sends a screen generation instruction to the "multi-screen framework". The "multi-screen framework" generates a virtual screen according to the received instruction and the obtained information about the applications. Then, the "multi-screen framework" transmits information about the generated virtual screen to the "Multi-screen proxy". The "Multi-screen proxy" sends the information about the virtual screen to the large-screen device. The large-screen device displays the information on the display after receiving the information about the virtual screen.

Further, specific content included in the virtual screen generated by the "multi-screen framework" may be preset content. For example, after the electronic device establishes the connection to the large-screen device, a desktop of the electronic device displayed on the large-screen device is a default desktop (the default desktop may be, for example, a desktop of one or more desktops of the electronic device). In this case, the "multi-screen framework" generates the virtual screen based on data information of the default desktop. For a form of the virtual screen to be displayed on the display after being sent to the large-screen device, refer to a virtual screen 701 of an electronic device in FIG. 7.

Certainly, the virtual screen generated by the "multi-screen framework" may alternatively be a specific virtual screen generated according to a specific instruction from the "Multi-screen proxy". For example, when the instruction from the "Multi-screen proxy" requires generation of a virtual screen including two desktops of the electronic device. The "multi-screen framework" may generate, according to the instruction and the obtained information about the applications, the virtual screen including the two desktops. For a form of the virtual screen to be displayed on the display after being sent to the large-screen device, refer to a virtual screen 701 of an electronic device in FIG. 8B.

The virtual screen generated by the "multi-screen framework" further includes a virtual screen in another form and with another content. Content and a form of the virtual screen are not limited in this embodiment of this disclosure.

It should be noted that, in addition to the resource manager and the "multi-screen framework", the "Multi-screen proxy" may further obtain, by using another module at the application framework layer in response to the event notification, the information about some or all of the applications installed on the electronic device. This is not limited in this embodiment of this disclosure.

Case 2: The electronic device and the large-screen device are logged in with a same system account.

In a specific embodiment, it is assumed that both the electronic device and the large-screen device are devices of a same brand, and the two devices are logged in with the same system account after being started, that is, the two devices are devices having the same account. In this case, the electronic device and the large-screen device may be connected in the following manner.

Further, when an NFC function of the electronic device and an NFC function of the large-screen device are enabled, the electronic device may be placed close to or in contact with the large-screen device, for example, a preset part such as a back of the electronic device may be placed close to or in contact with a preset location such as a location with a sharing or connection tag on the large-screen device, so that the electronic device and the large-screen device can discover each other. Then, a user interface of the discovered large-screen device, for example, an interface shown in FIG. 5A, may be displayed on a display of the electronic device.

In the user interface shown in FIG. 5A, the electronic device sends a connection request to the large-screen device in response to a touch operation performed on a "Connect" control 5014. A trust relationship is automatically established because the electronic device and the large-screen device are the devices having the same account. The large-screen device automatically acknowledges the connection after receiving the connection request sent by the electronic device. The connection between the two devices is established after the connection is acknowledged. In this case, a user interface shown in FIG. 7 is displayed on the large-screen device.

In a possible implementation, when the electronic device and the large-screen device are the devices having the same account, after the connection is successfully established between the large-screen device and the electronic device, the electronic device and the large-screen device may be passively disconnected. For example, the electronic device or the large-screen device may be passively disconnected in an emergency situation such as a network disconnection or automatic power-off of the electronic device or the large-screen device. In these cases, the large-screen device may display a diagram of a user interface shown in FIG. 5D.

Figure 5D:
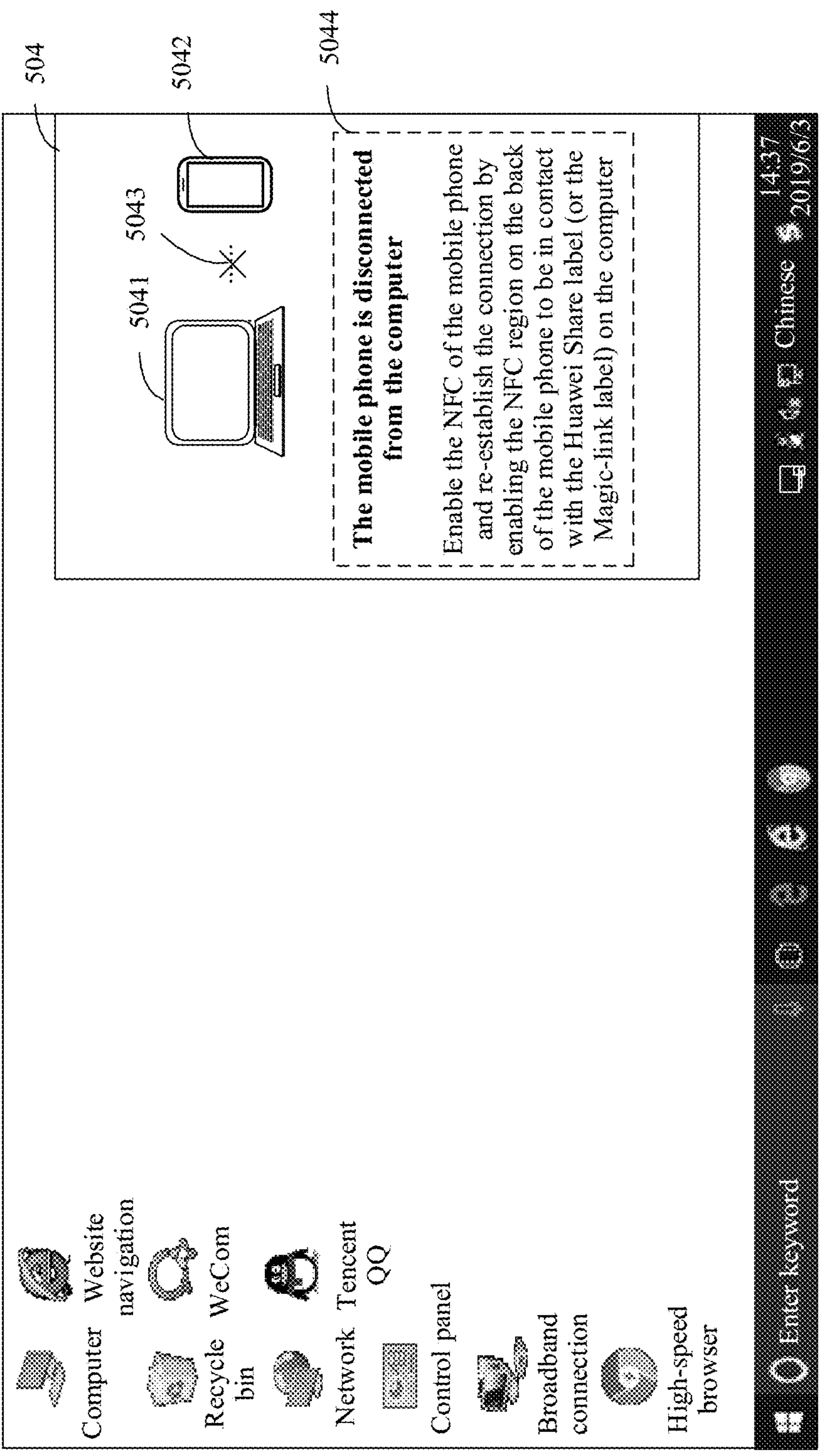

The diagram of the user interface shown in FIG. 5D includes a disconnection prompt window 504. The window 504 includes an icon 5041 of the large-screen device, an icon 5042 of the electronic device, a prompt 5043 of disconnection between the electronic device and the large-screen device, and prompt information 5044.

The icon 5041 of the large-screen device may be, for example, an icon of a computer. The icon 5042 of the electronic device may be, for example, an icon of a mobile phone. The prompt information 5044 may be used to indicate that the electronic device and the large-screen device are disconnected and indicate how to re-establish a connection. For example, the prompt information 5044 may be "The mobile phone is disconnected from the computer. Enable the NFC of the mobile phone and re-establish the connection by enabling the NFC region on the back of the mobile phone to be in contact with the HUAWEI SHARE label (or the Magic-link label) on the computer".

As described in the prompt information 5044 in the foregoing example, after the electronic device is disconnected from the large-screen device, when the NFC of the electronic device is enabled, and a BLUETOOTH function and a WLAN function are enabled, if the preset part such as the back of the electronic device may be placed to be close to or in contact with the preset location such as the location with the sharing or connection tag on the large-screen device, the electronic device and the large-screen device are re-connected automatically, and the user interface of the large-screen device shown in FIG. 7 is re-displayed.

In a possible implementation, when the electronic device and the large-screen device are the devices having the same account, after the connection between the large-screen device and the electronic device is successfully established, the electronic device actively disconnects from the large-screen device. For example, the electronic device side actively disconnects from the large-screen device in response to a disconnection operation of a user, or the large-screen device side actively disconnects from the electronic device in response to a disconnection operation of a user. In these cases, the large-screen device may display a diagram of a user interface shown in FIG. 5E.

Figure 5E:
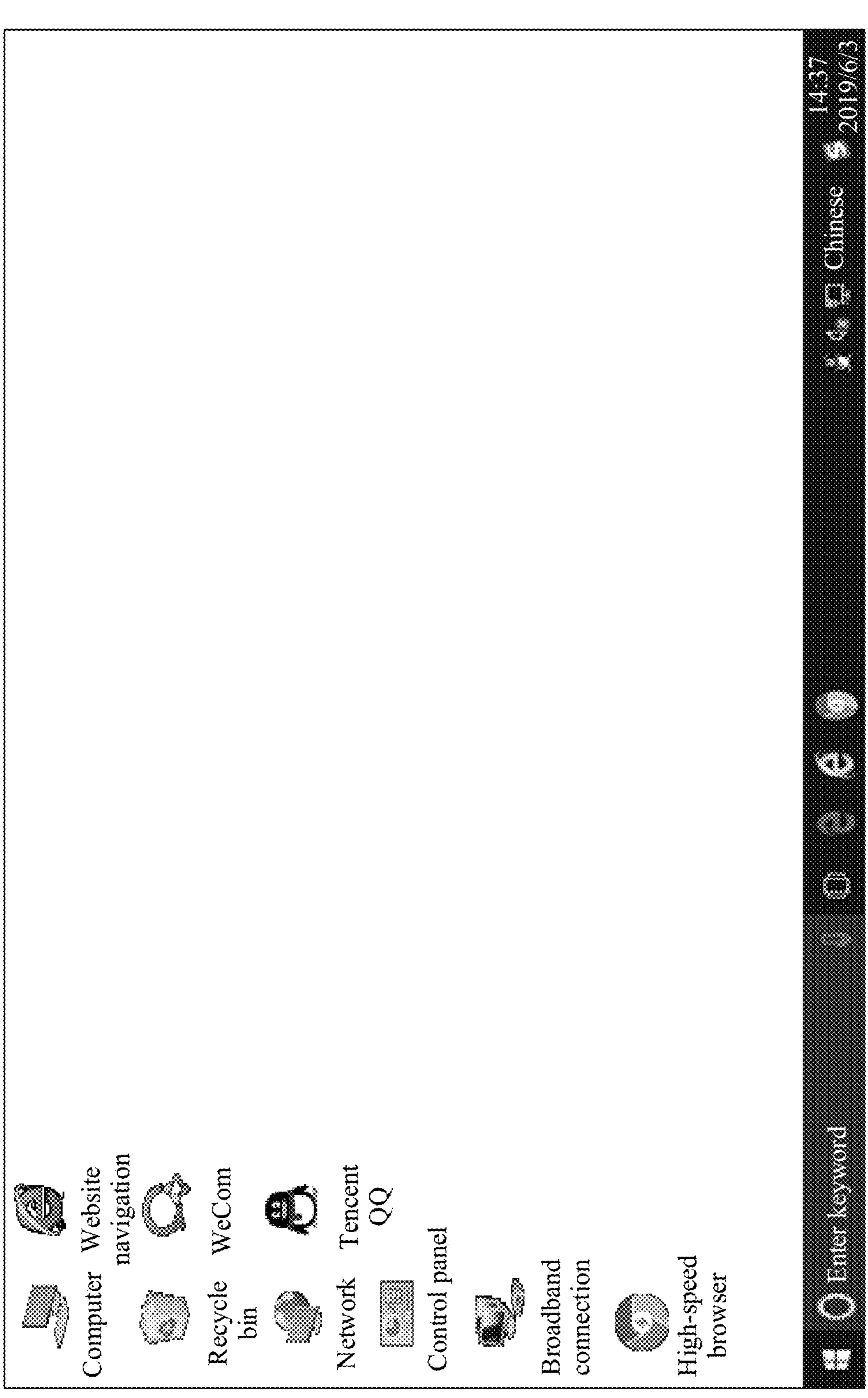

In the user interface shown in FIG. 5E, a window projected by the electronic device onto the large-screen device is closed, and the display of the large-screen device restores an original user interface of the large-screen device. In this case, when the NFC of the electronic device is enabled, and the BLUETOOTH function and the WLAN function are enabled, if the preset part such as the back of the electronic device may be placed to be close to or in contact with the preset location such as the location with the sharing or connection tag on the large-screen device, the electronic device and the large-screen device are re-connected automatically, and the user interface of the large-screen device shown in FIG. 7 is re-displayed.

In a possible implementation, when the electronic device and the large-screen device are the devices having the different accounts, after the electronic device successfully establishes the connection to the large-screen device, if the connection is passively disconnected, the large-screen device may display the diagram of the user interface shown in FIG. 5D. If the connection is actively disconnected, the large-screen device may display the diagram of the user interface shown in FIG. 5E.

In this embodiment of this disclosure, regardless of whether the electronic device and the large-screen device are passively disconnected or actively disconnected, the connection needs to be re-established based on the process in Case 1.

In a possible implementation, when the electronic device and the large-screen device are the devices having the different accounts, after the electronic device successfully establishes the connection to the large-screen device, if the connection is passively disconnected, the large-screen device may display the diagram of the user interface shown in FIG. 5D. If the connection is actively disconnected, the large-screen device may display the diagram of the user interface shown in FIG. 5E.

In this embodiment of this disclosure, regardless of whether the electronic device and the large-screen device are passively disconnected or actively disconnected, if the connection needs to be re-established, when the NFC of the electronic device is enabled, and the BLUETOOTH function and the WLAN function are enabled, if the preset part such as the back of the electronic device may be placed to be close to or in contact with the preset location such as the location with the sharing or connection tag on the large-screen device, the interface shown in FIG. 5A is displayed on the electronic device, and the connection between the electronic device and the large-screen device can be re-established in response to a touch operation on the "Connect" control 5014, without an acknowledgment from the large-screen device.

In a possible implementation, when one electronic device A has established a connection to the large-screen device, another electronic device B attempts to establish a connection to the large-screen device, for example, the electronic device B enables an NFC function, and places a preset part such as a back to be close to or in contact with the preset location such as the location with the sharing or connection tag on the large-screen device. In this case, if the electronic device B and the large-screen device are devices having a same account, the large-screen device displays a user interface shown in FIG. 5F.

Figure 5F:
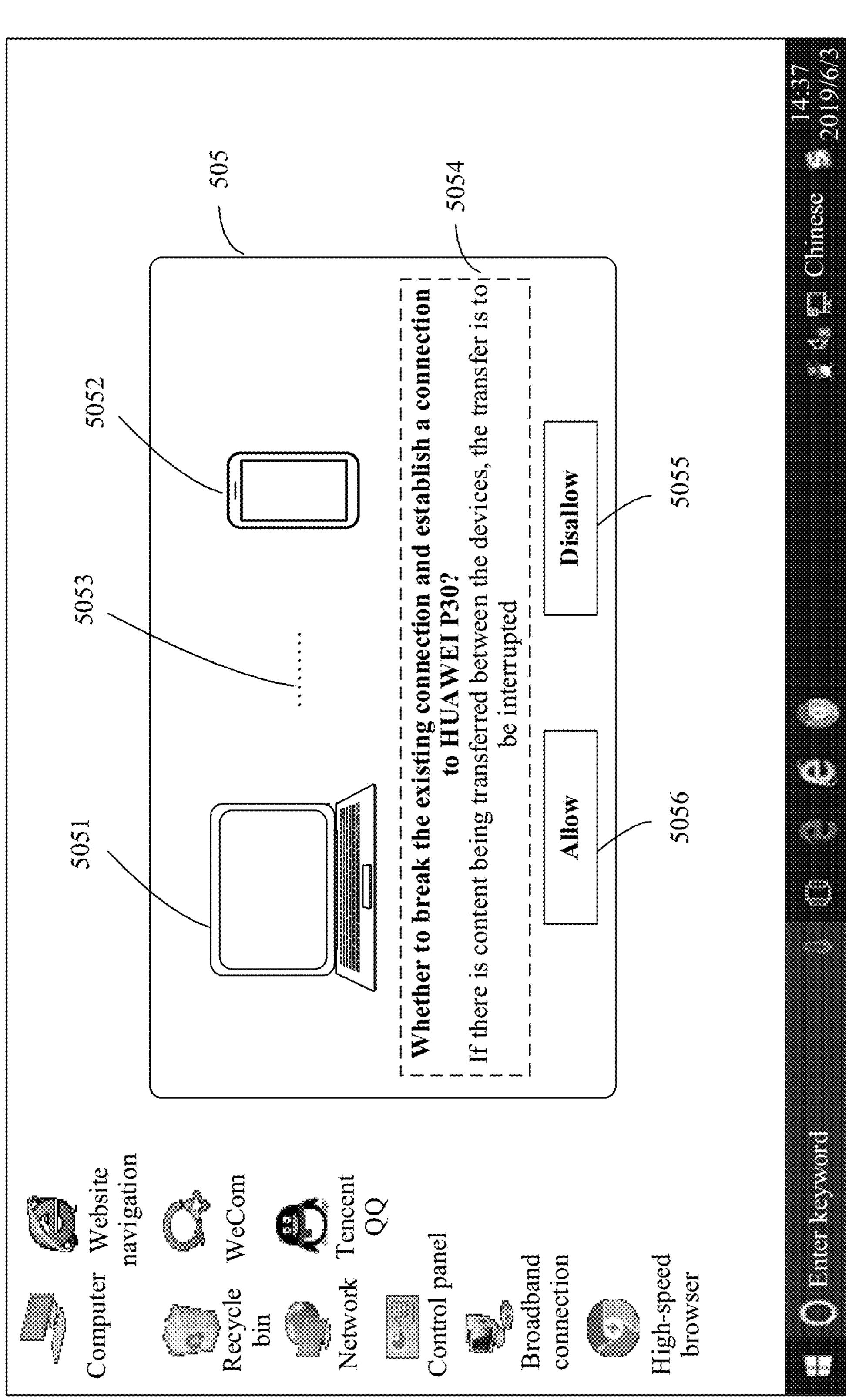

The user interface shown in FIG. 5F includes an acknowledgment window 505 indicating whether the large-screen device is connected to the electronic device. The window 505 includes an icon 5051 of the large-screen device, an icon 5052 of the electronic device, an association identifier 5053 between the large-screen device and the electronic device, prompt information 5054, a "Disallow" control 5055, and an "Allow" control 5056.

The icon 5051 of the large-screen device may be, for example, an icon of a computer. The icon 5052 of the electronic device may be, for example, an icon of a mobile phone. The prompt information 5054 may be used to indicate whether to break an existing connection and establish a connection to a new device, and indicate statuses of the current two devices to the user. For example, the prompt information 5054 may be "Whether to break the existing disconnection and establish a connection to HUAWEI P30? If there is content being transferred between the devices, the transfer is to be interrupted." The "Disallow" control 5055 may be configured to disallow a connection to the electronic device. The "Allow" control 5056 may be configured to allow a connection to the electronic device. HUAWEI P30 is a name of the electronic device B.

In the user interface shown in FIG. 5F, the large-screen device acknowledges to establish the connection to the electronic device B in response to a click or touch operation on the "Allow" control 5056. After the connection is established, the display of the large-screen device displays a window projected by the electronic device B.

Figure 5G:
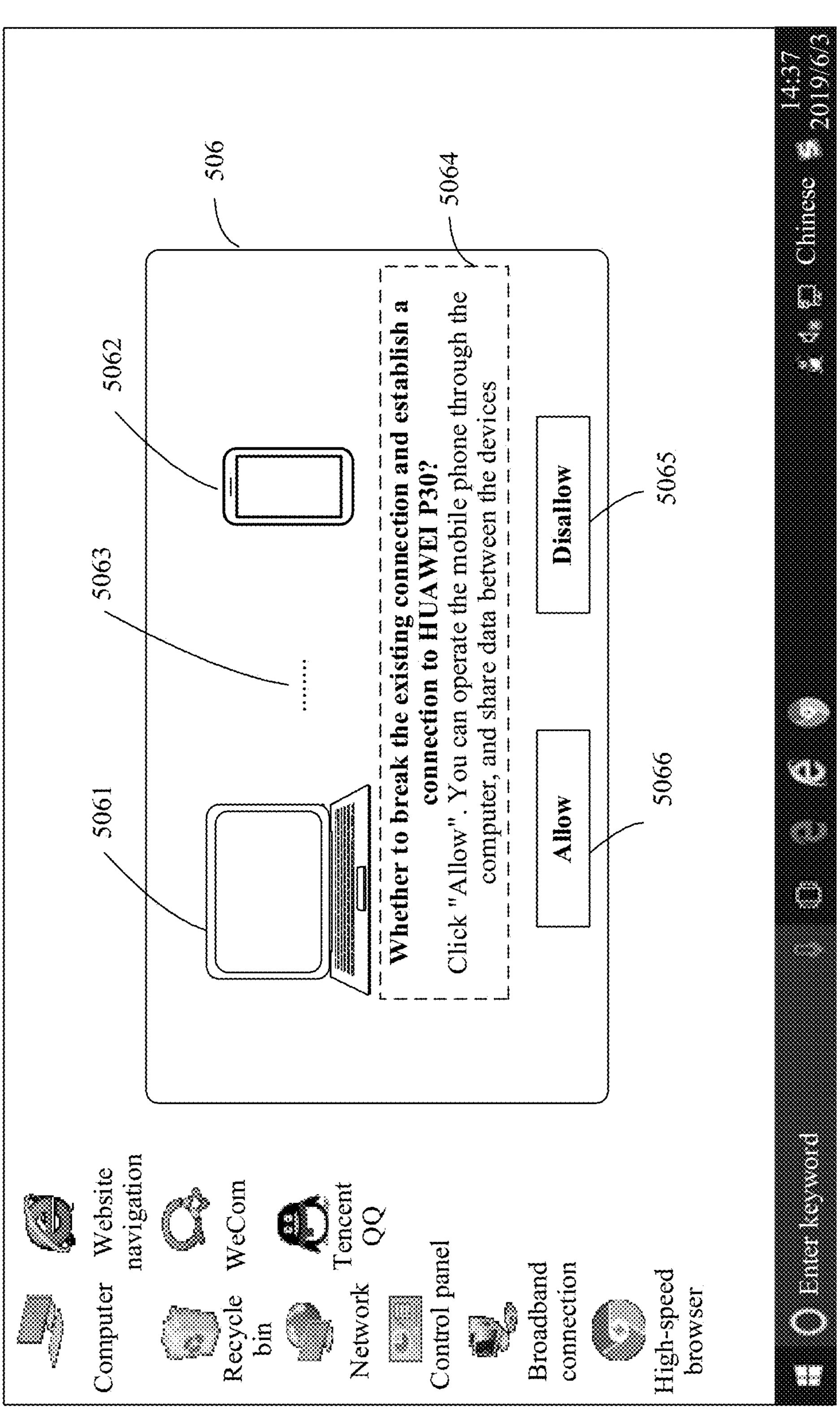

In addition, when one electronic device A has established a connection to the large-screen device, and another electronic device B attempts to establish a connection to the large-screen device, if the electronic device B and the large-screen device are devices having different accounts, the large-screen device displays a user interface shown in FIG. 5G.

The user interface shown in FIG. 5G includes an acknowledgment window 506 indicating whether the large-screen device is connected to the electronic device. The window 506 includes an icon 5061 of the large-screen device, an icon 5062 of the electronic device, an association identifier 5063 between the large-screen device and the electronic device, prompt information 5064, a "Disallow" control 5065, and an "Allow" control 5066.

The icon 5061 of the large-screen device may be, for example, an icon of a computer. The icon 5062 of the electronic device may be, for example, an icon of a mobile phone. The prompt information 5064 may be used to indicate whether to break an existing connection and establish a connection to a new device, and indicate to the user a result after the connection is allowed. For example, the prompt information 5064 may be "Whether to break the existing disconnection and establish a connection to HUAWEI P30? Click 'Allow'. You can operate the mobile phone through the computer, and share data between the devices." The "Disallow" control 5065 may be configured to disallow a connection to the electronic device. The "Allow" control 5066 may be configured to allow a connection to the electronic device. HUAWEI P30 is a name of the electronic device B.

In the user interface shown in FIG. 5G, the large-screen device acknowledges to establish the connection to the electronic device B in response to a click or touch operation on the "Allow" control 5066. After the connection is established, the display of the large-screen device displays a window projected by the electronic device B.

In a possible implementation, the electronic device may be further connected to the large-screen device through BLUETOOTH. For specific diagrams of examples of user interfaces for the connection, refer to FIG. 6A to FIG. 6G.

Figure 6A:
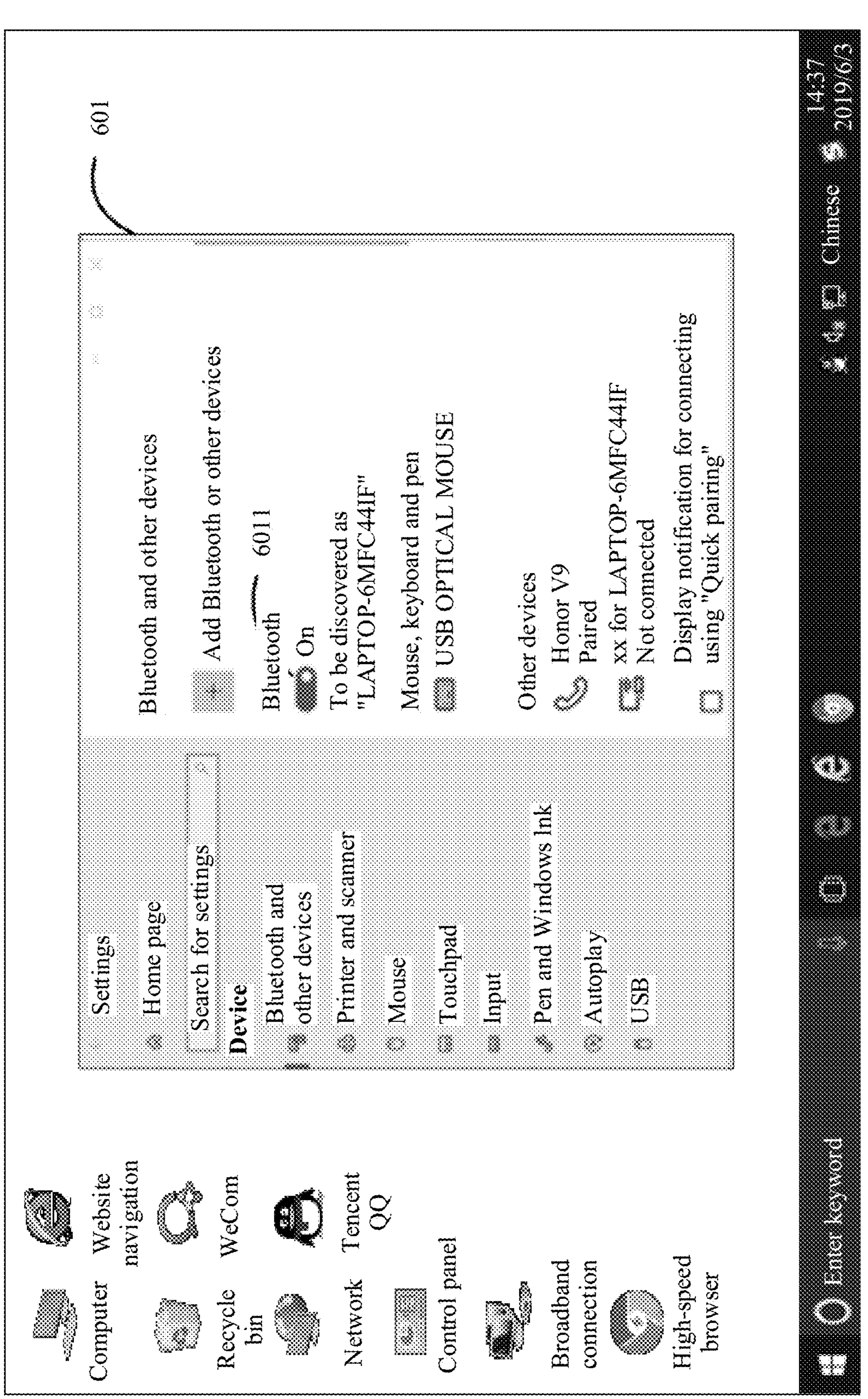
FIG. 6A, FIG. 6B, FIG. 6C, FIG. 6D, FIG. 6E, FIG. 6F, and FIG. 6G are schematic diagrams of another manner of establishing a connection between an electronic device and a large-screen device according to an embodiment of this disclosure.

FIG. 6A is a diagram of an example of a user interface for enabling a BLUETOOTH function of a large-screen device. Further, the large-screen device displays a window 601 on a display in response to a click or touch operation on "BLUETOOTH and another device" in Settings. In the window 601, the large-screen device enables the BLUETOOTH function of the large-screen device in response to a click or touch operation on a BLUETOOTH switch control 6011. The window 601 in FIG. 6A displays a schematic diagram after the BLUETOOTH function of the large-screen device is enabled. After the BLUETOOTH function is enabled, a mark such as an "on" text may be displayed near the switch control 6011 to indicate that the BLUETOOTH function is enabled.

After the BLUETOOTH function of the large-screen device is enabled, another electronic device can find the large-screen device. For example, as shown in FIG. 6A, "To be discovered as LAPTOP-6MFC44IF" is directly displayed in the window 601 to indicate that the other device can discover the large-screen device by using the name LAPTOP-6MFC44IF of the large-screen device.

The following describes a process in which an electronic device enables a BLUETOOTH function.

Figure 6B:
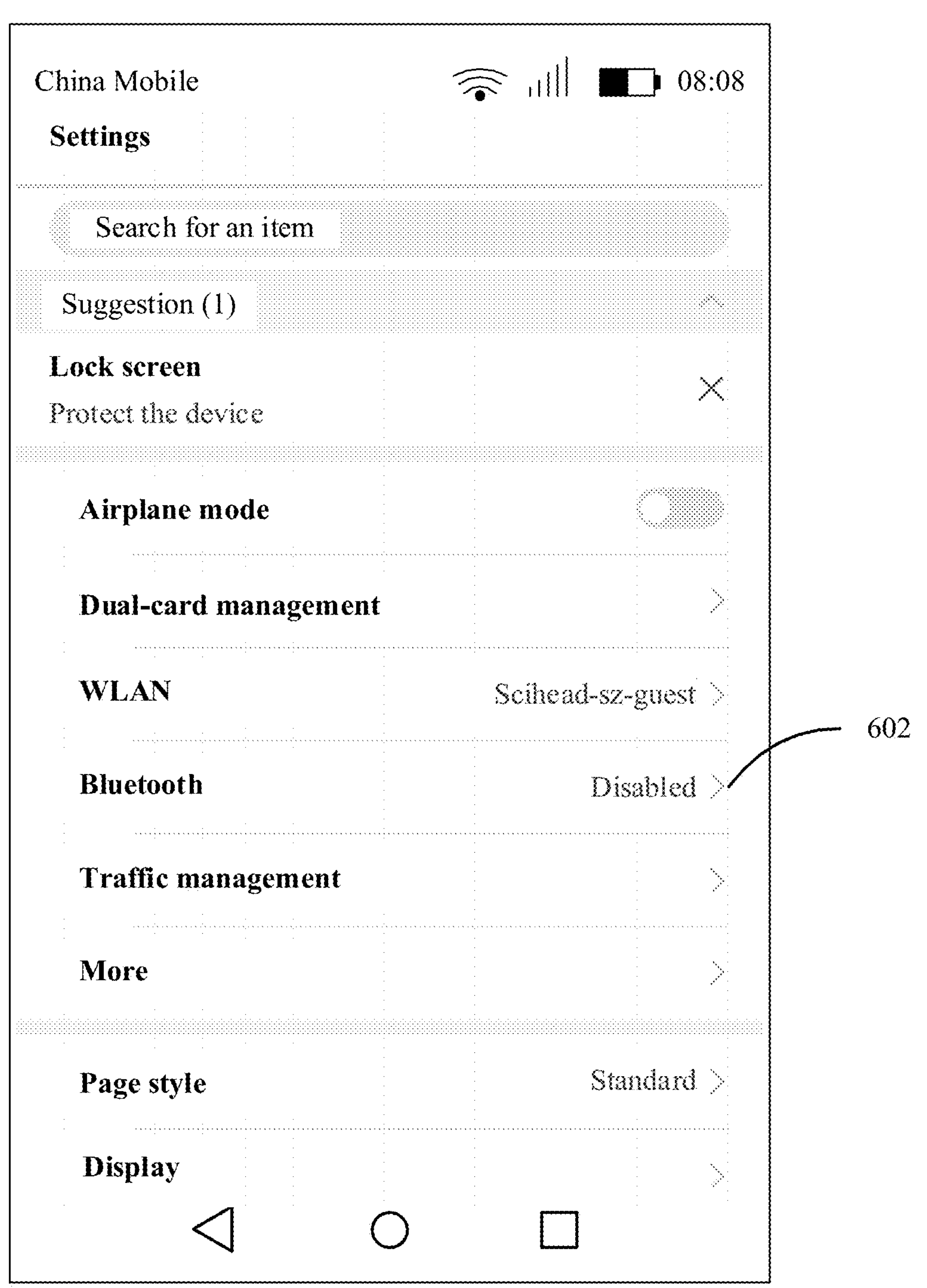

As shown in FIG. 6B, a plurality of function services, for example, BLUETOOTH, Airplane mode, Wireless network, and Traffic management are displayed on an interface of the electronic device, and modes or statuses of the function services may be set on the Settings interface. The BLUETOOTH function is disabled by default. The electronic device displays an interface shown in FIG. 6C in response to a tap or touch operation on a next-level menu control 602 for BLUETOOTH.

Figure 6C:
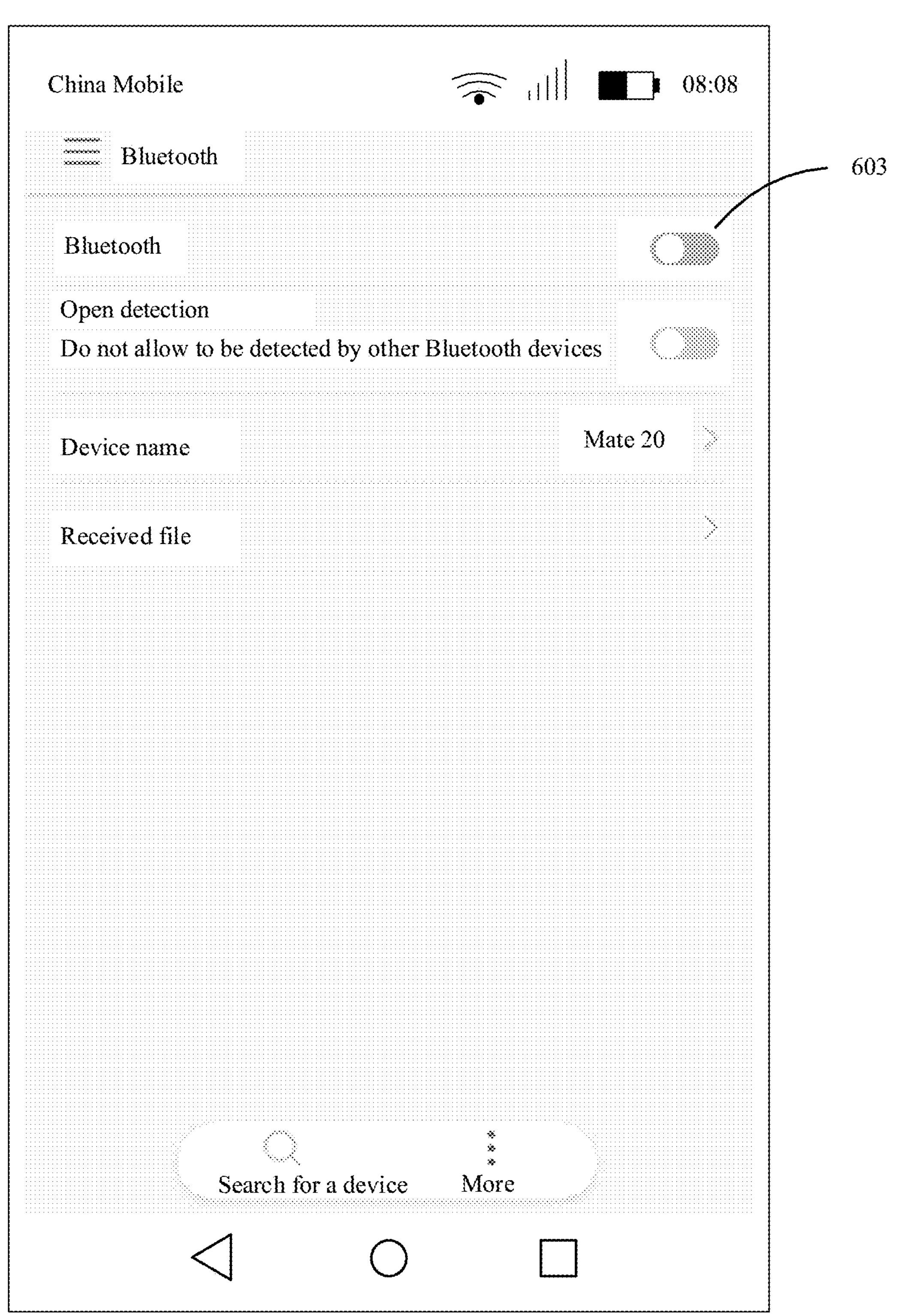
Figure 6D:
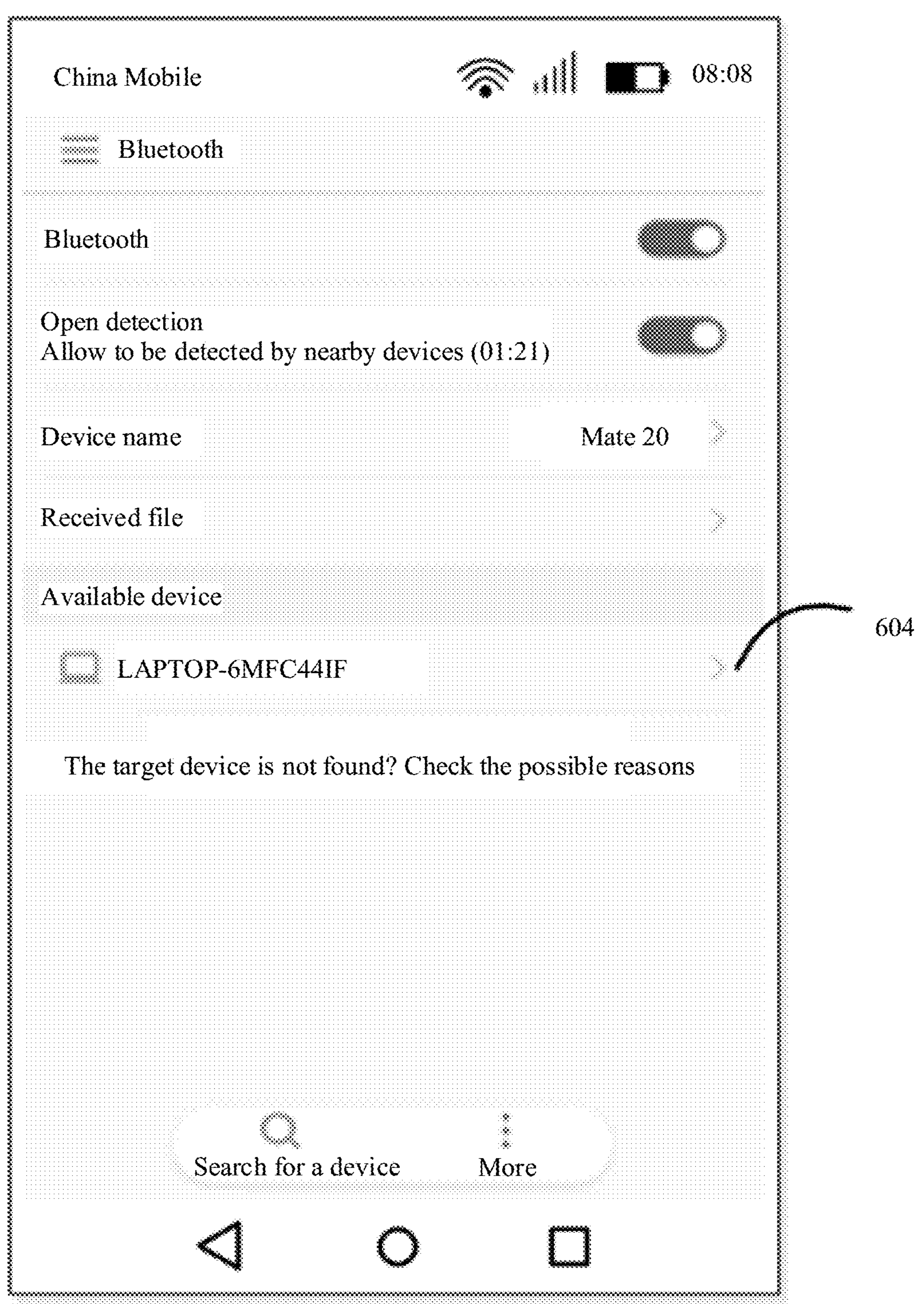

In FIG. 6C, a BLUETOOTH switch control 603 on the electronic device is in a disabled state. The electronic device enables the BLUETOOTH function in response to a tap or touch operation on the switch control 603, as shown in FIG. 6D. It should be noted that an "Open detection" switch control, Name of the electronic device, and "Received file" may be further included in FIG. 6C. If "Open detection" is enabled, the other device may detect the electronic device. If "Open detection" is disabled, the other device cannot detect the electronic device. The "Received file" indicates a list of files received by the electronic device from the other device by using the BLUETOOTH function.

After enabling the BLUETOOTH function, the electronic device directly starts to search for an available device and displays a found available device in the interface. As shown in FIG. 6D, the electronic device finds one available device, and a name of the available device is LAPTOP-6MFC44IF, namely, the large-screen device described in FIG. 6A. In response to a tap or touch operation on a display bar 604 for the available device LAPTOP-6MFC44IF, the electronic device displays an interface shown in FIG. 6E, namely, an interface for a BLUETOOTH pairing request. It should be noted that there may be one or more available devices found after the electronic device enables the BLUETOOTH function. In this embodiment, one device that is found is used as an example for description.

Figure 6E:
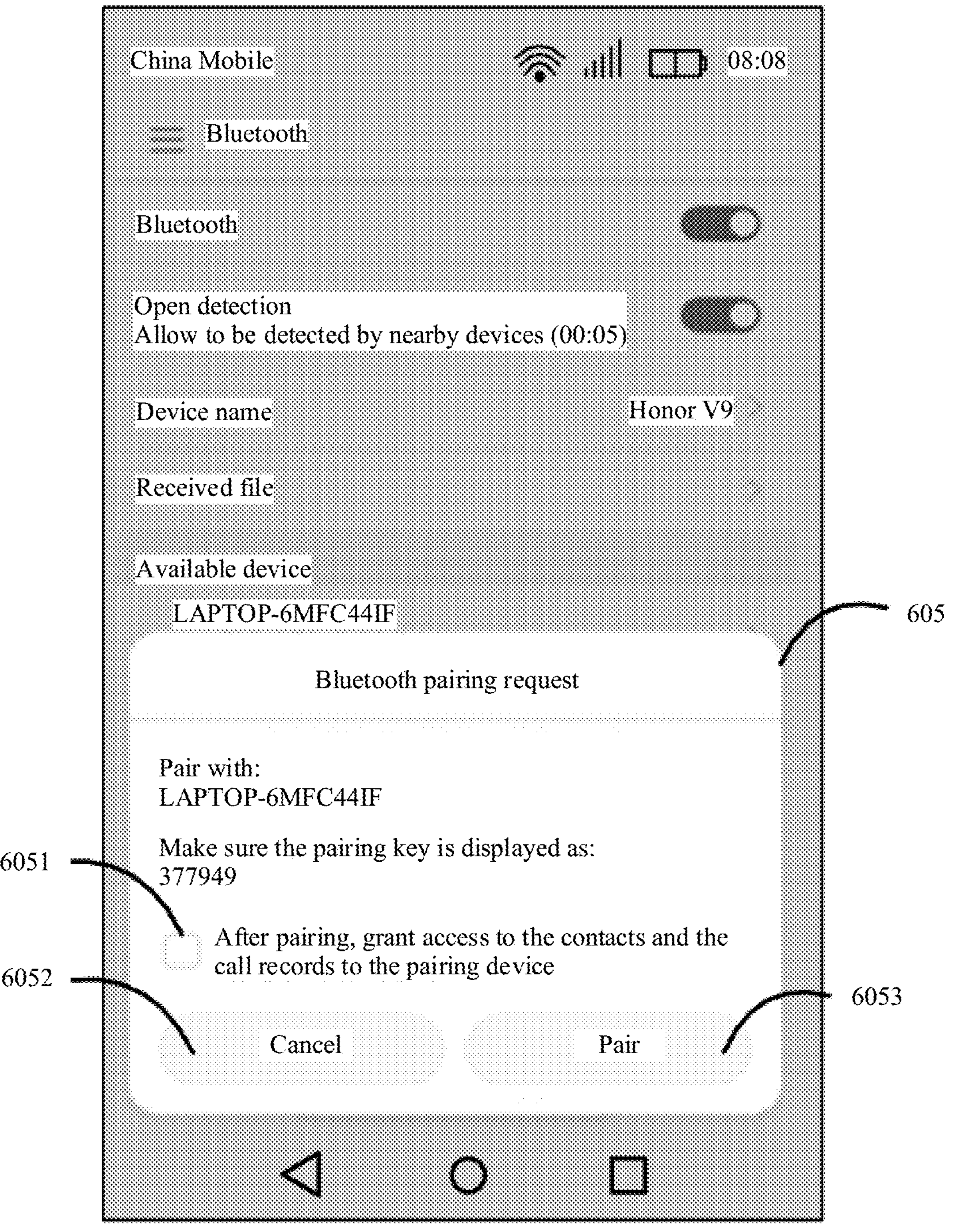

In FIG. 6E, the electronic device displays a small window 605 for the BLUETOOTH pairing request in the interface, and may display, in the small window 605, a name of a pairing device, a pairing key description, and a permission processing description after pairing. The information may be displayed in a form of a text in the small window 605. For example, "Pair with: LAPTOP-6MFC44IF", "Make sure the pairing key is displayed as: 377949", and "After pairing, grant access to the contacts and the call records to the pairing device". Certainly, a processing manner may be selected for the permission processing after the pairing. The permission processing after the pairing may be described. For example, there is a select box 6051 displayed in front of "After pairing, grant access to the contacts and the call records to the pairing device". The select box 6051 is not selected by default. The electronic device may select the select box in response to a tap or touch operation on the select box, to indicate that the electronic device needs to grant access to the contacts and the call records to the large-screen device after pairing. In addition, the small window 605 further includes a "Cancel" button 6052 and a "Pair" button 6053. The "Cancel" button 6052 is configured to cancel the pairing operation, and the "Pair" button 6053 is configured to pair with a corresponding device.

Figure 6F:
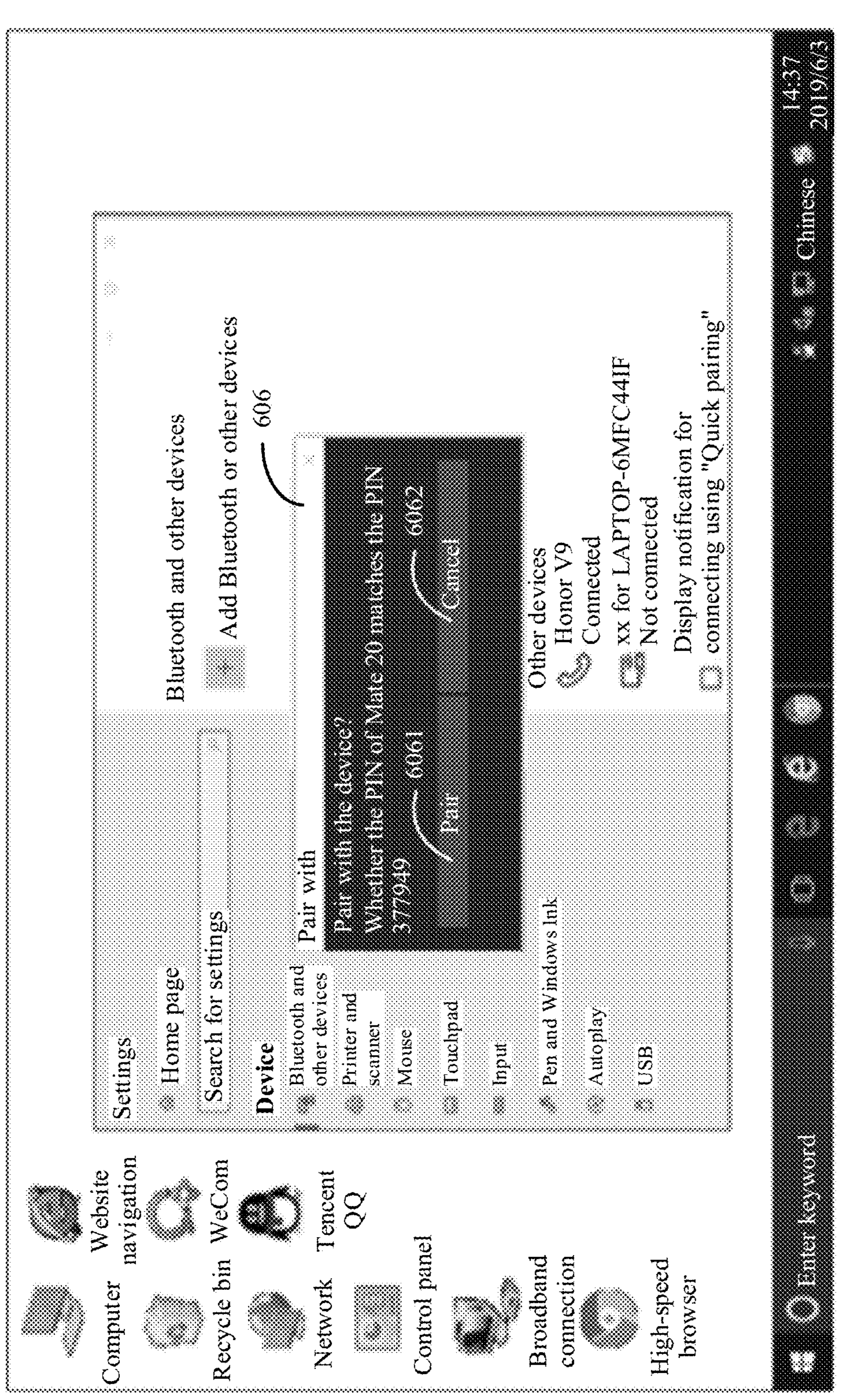

When the electronic device displays the interface shown in FIG. 6E, an interface shown in FIG. 6F is correspondingly displayed on a display of a large-screen device. The large-screen device displays a small pairing window 606 on the display in response to the BLUETOOTH pairing request from the electronic device. The small window 606 mainly displays a pairing description and a pairing key. For example, text information "Pair with the device? Whether the PIN of Mate 20 matches the PIN 377947?" is displayed in the small window 606 in FIG. 6F. In addition, the small window 606 further includes a "Pair" button 6061 and a "Cancel" button 6062. The large-screen device cancels the pairing in response to a click operation on the "Cancel" button 6062. The large-screen device performs a pairing operation in response to a click operation on the "Pair" button 6061.

Figure 6G:
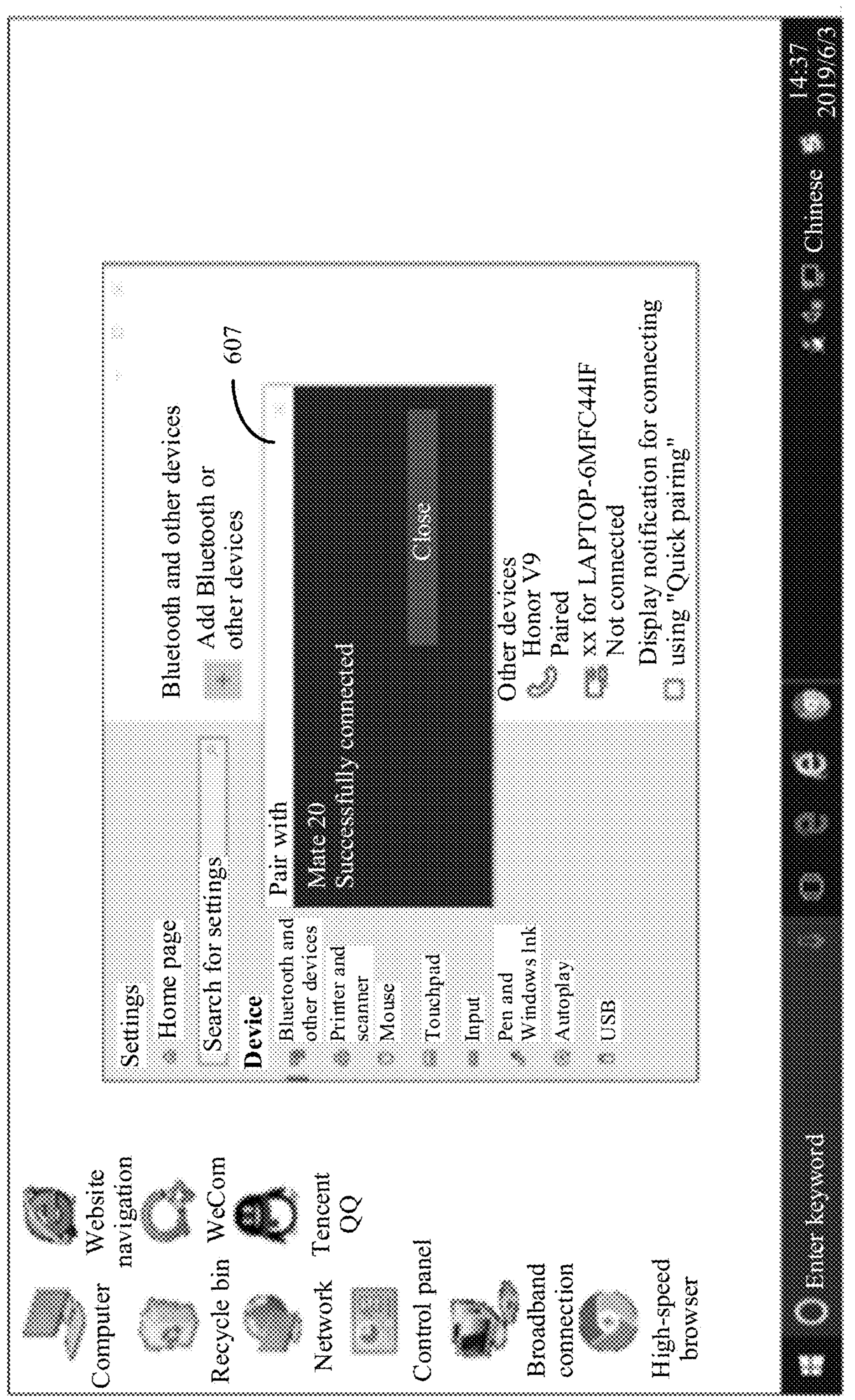

When the electronic device in FIG. 6E performs the pairing in response to a tap or touch operation on "Pair" 6053, and when the large-screen device in FIG. 6F responds to the click or touch operation on the button 6061, the small window 606 on the interface of the display of the large-screen device in FIG. 6F is switched to a small window 607, shown in FIG. 6G. The small window 607 displays connection success information, for example, "Mate 20 is successfully connected". This indicates that the electronic device has successfully connected to the large-screen device through BLUETOOTH.

After the electronic device is successfully connected to the large-screen device through BLUETOOTH, the electronic device can send data information to the large-screen device via a wireless network channel, as long as the electronic device and the large-screen device are in a same network, that is, the two devices are connected to a same wireless network, and a "Multi-screen proxy" function of the electronic device is enabled. The large-screen device displays the data information on the display of the large-screen device in a form of a window interface after receiving the data information.

Alternatively, after the electronic device is successfully connected to the large-screen device through BLUETOOTH, data may be transmitted between the electronic device and the large-screen device through BLUETOOTH. In this case, the electronic device can send data information of a desktop to the large-screen device through BLUETOOTH, as long as a "Multi-screen proxy" function of the electronic device is enabled. The large-screen device displays the data information on the display of the large-screen device in a form of a window interface after receiving the data information.

In a possible implementation, after the "Multi-screen proxy" function of the electronic device is enabled in FIG. 4B, the electronic device may automatically enable the BLUETOOTH function of the electronic device for connecting to BLUETOOTH of the large-screen device in response to enabling the function. For a specific connection establishment process, refer to specific descriptions in FIG. 6E, FIG. 6F, and FIG. 6G. Details are not described herein again.

In a possible implementation, the electronic device and the large-screen device may establish the connection and exchange data through NFC.

It should be noted that there is another manner of establishing the connection between the electronic device and the large-screen device. This is not limited in this embodiment of this disclosure.

The following describes some embodiments of graphical user interfaces implemented on the large-screen device after the electronic device establishes the connection to the large-screen device. An example in which the large-screen device is a computer is used for description.

FIG. 7 shows an example of a user interface 71 displayed by default by a large-screen device after an electronic device establishes a connection to the large-screen device and the electronic device projects a generated virtual screen to the large-screen device. Further, the electronic device may include one or more desktops, and the desktops mainly display icons and names of applications installed on the electronic device.

The user interface 71 may include the virtual screen 701 of the electronic device, a desktop 702 of the large-screen device, and a taskbar 703 of the large-screen device. The virtual screen 701 of the electronic device may include an indicator 7012 indicating that the virtual screen of the electronic device is projected onto the large-screen device, where the indicator may be for example, an icon of a "Multi-screen proxy" service, or a text form of a "Multi-screen proxy" service, a search button 7013, where the search button 7013 may be configured to search for an application already installed on the electronic device to quickly find a required application, a quick launch bar 7014, where the quick launch bar 7014 may correspond to the tray 305 (refer to FIG. 4A) having commonly used application icons of the electronic device, and also includes a phone icon, a contacts icon, a messages icon, and a camera icon, a desktop activity button 7015, where the desktop activity button 7015 may be configured to change a quantity of desktops of the electronic device that are displayed on a display of the large-screen device (specific implementations are described in detail below, and details are not described herein), a multi-window button 7016, where the multi-window button 7016 may be configured to invoke an interface of an application running in a background of the electronic device and display the interface on the display of the large-screen device (specific implementations are described in detail below, and details are not described herein), a page indicator 7017, where the page indicator 7017 may correspond to the page indicator 411 (refer to FIG. 4A) on the electronic device, a quantity of small dots included in the page indicator 7017 is undetermined, and the quantity of small dots in the page indicator 7017 depends on a quantity of desktops of the electronic device, and a default desktop 7018, where the default desktop 7018 is a desktop displayed on the large-screen device by default after the electronic device is connected to the large-screen device, the desktop displayed by default may be any one of one or more desktops included in the electronic device, may be a desktop including icons and names of some of all applications installed on the electronic device, or may be a desktop in another form, and this is not limited herein.

After the electronic device is connected to the large-screen device, only any one of the one or more desktops included in the electronic device may be displayed on the display of the large-screen device by default. Compared with the conventional technology in which all the desktops of the electronic device are displayed, this embodiment reduces an area that is occupied on the display of the large-screen device by the desktop projected by the electronic device, and improves utilization of an area of the display of the large-screen device.

The desktop 702 of the large-screen device includes icons and names of applications installed on the large-screen device, for example, may include a computer icon, a recycle bin icon, a network icon, a control panel icon, a broadband connection icon, a browser icon, an online navigation icon, a WECOM icon, a TENCENT QQ icon, and names corresponding to the application icons.

The taskbar 703 includes a start menu 7031, a search region 7032, a task view 7033, a large-screen device application quick launch bar 7034, and a tray region 7035. The start menu 7031 may be configured to start most application software installed on the large-screen device. The search region 7032 may be configured to search for an application, a document, and a web page. The task view 7033 may be configured to display an application running in the background of the large-screen device, an opened document, an opened page, and the like in tile mode. The large-screen device application quick launch bar 7034 includes shortcuts of one or more applications, and may be configured to quickly start the commonly used applications. The tray region 7035 graphically displays important information of computer software and hardware by using various small icons. The tray region 7035 further includes a time indicator used to indicate time. In addition, the tray region 7035 may further include a "Multi-screen proxy" service icon used to indicate that the electronic device has established the connection to the large-screen device and is projecting the desktop onto the large-screen device.

It should be noted that, as shown in FIG. 7, a display location of the virtual screen 701 on the display of the large-screen device may be on a left side of the large-screen device, or certainly may be on the center, a right side, or the like of the large-screen device. This is not limited herein. In addition, for the large-screen device, the display location of the virtual screen 701 on the large-screen device may be moved in response to a touch operation performed on the virtual screen 701. Display locations of the search button 7013, the quick launch bar 7014, and the multi-window button 7016 on the display of the large-screen device may be on a right side of the default desktop 7018 on the virtual screen 701, or certainly may be on a left side, a top side, a bottom side, or the like of the default desktop 7018 on the virtual screen 701. This is not limited herein.

In the conventional technology, all the desktops are projected onto and displayed on the large-screen device after the electronic device establishes the connection to the large-screen device, whereas in this embodiment of this disclosure, only one desktop of the electronic device is projected onto and displayed on the large-screen device by default after the electronic device establishes the connection to the large-screen device. Compared with the conventional technology, this embodiment of this disclosure reduces the area that is occupied on the display of the large-screen device by the projected desktop, has more flexibility in displaying the projected desktop in this embodiment of this disclosure, helps a user operate applications on the electronic device and the large-screen device at the same time, and improves user experience.

The desktop activity button 7015 may be configured to change the quantity of desktops of the electronic device that are displayed on the display of the large-screen device. In a specific embodiment, the large-screen device may correspondingly display, on the display in response to different operations on the button, user interfaces that match the operations. The operations on the desktop activity button 7015 may include a click operation, a touch operation, a drag operation, and the like.

The click operation may be a click operation of a mouse, or a tap operation of a finger of the user, of a touch pen, or the like on a touchscreen. The touch operation may be a touch operation of a finger of the user or the like on a touchscreen. The drag operation may be an operation in which a mouse is held down and then moved, or may be an operation in which the user presses a touchscreen with a finger on the touchscreen to move, or the like.

Figure 8A:
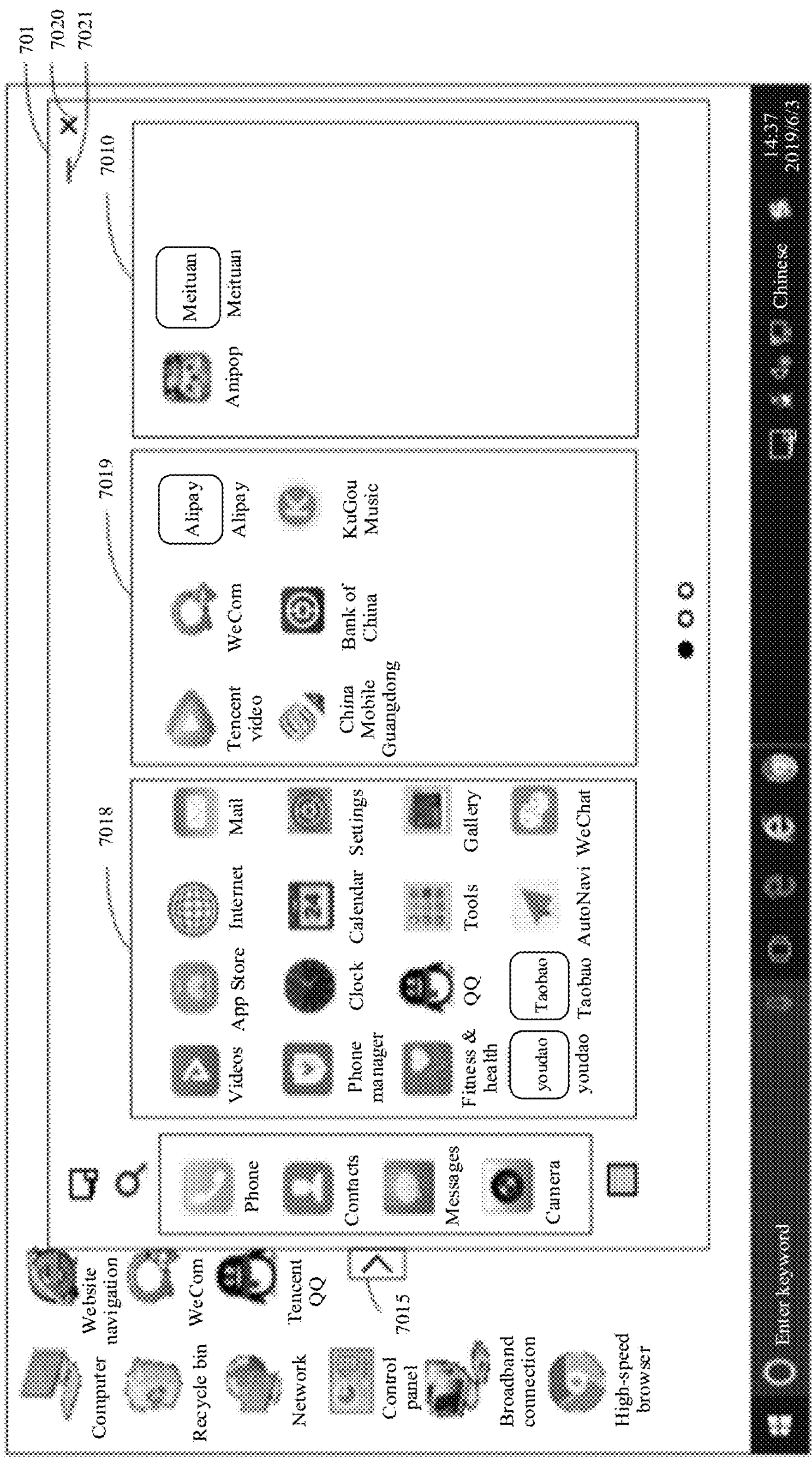
FIG. 8A and FIG. 8B are schematic diagrams of user interfaces of a large-screen device according to an embodiment of this disclosure.

Further, assuming that the operation on the desktop activity button 7015 is a click or touch operation, the large-screen device may display, in response to the click or touch operation, all the desktops included in the electronic device on the display of the large-screen device. The click operation may be a click or a double-click operation. Alternatively, the click operation may be a right-click operation, and then the large-screen device may display a window on the display in response to the right-click operation. A similar option such as "Display all the desktops of the electronic device in tile mode" may be selected in the window. Then the large-screen device may display, in response to the selection, all the desktops included in the electronic device on the display of the large-screen device, for example, as shown in FIG. 8A.

Further, the click operation may be a click operation of a mouse, or may be a tap operation of a finger of the user or a touch pen on a touchscreen. The double-click operation may be a double-click operation of a mouse, or may be a double-tap operation of a finger of the user or a touch pen on a touchscreen.

Figure 8B:
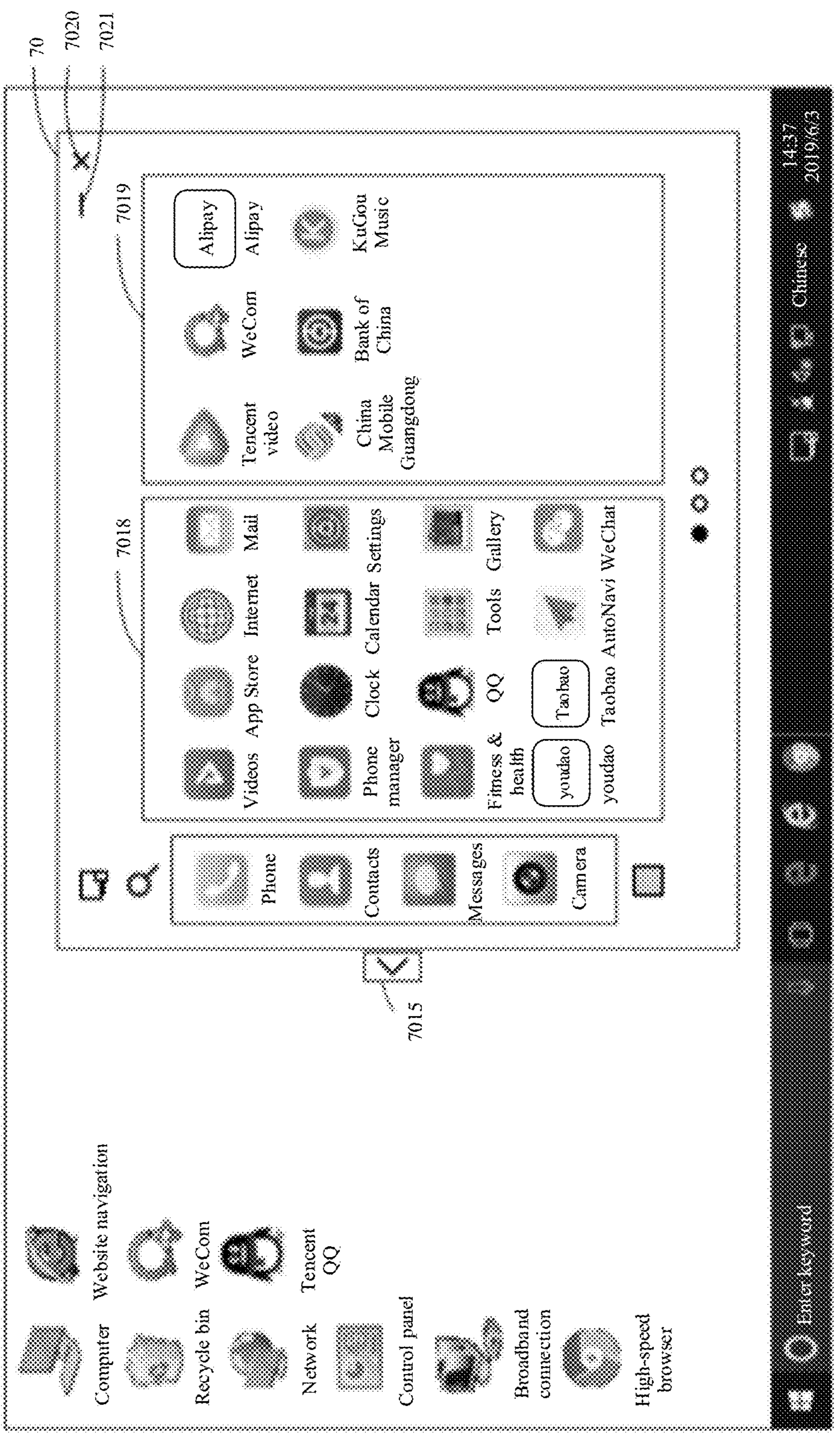

In a possible implementation, the large-screen device may display one more desktop of the electronic device on the display in response to the click or touch operation on the desktop activity button 7015. For example, in the interface shown in FIG. 7, the large-screen device may display, in response to the click or touch operation on the desktop activity button 7015, one more interface of the electronic device on the virtual screen 701 of the electronic device. In other words, two desktops of the electronic device may be displayed on the virtual screen 701 of the electronic device. For example, an interface is shown in FIG. 8B. In the interface shown in FIG. 8B, if a large-screen device may further display, in response to a click or touch operation on a desktop activity button 7015, one more interface of an electronic device on a virtual screen 701 of the electronic device, three desktops of the electronic devices may be displayed on the virtual screen 701 of the electronic device. For example, an interface is shown in FIG. 8A. In other words, before all the desktops of the electronic device are totally displayed on the virtual screen 701 of the electronic device, the large-screen device may display, in response to a click or touch operation on the desktop activity button 7015 each time, one more desktop of the electronic device on the virtual screen 701 of the electronic device. The one more displayed desktop may be any one of desktops of the electronic device that has not been displayed on the display of the large-screen device. In this implementation, the large-screen device may further display all the desktops of the electronic device on the virtual screen 701 of the electronic device at a time in response to a double-click operation on the desktop activity button 7015.

Further, assuming that the operation on the desktop activity button 7015 is a drag button, a drag operation with a different distance may correspondingly match one user interface to be displayed. For example, in the interface shown in FIG. 7, the large-screen device may correspondingly match and display, in response to a drag operation with a unit of a preset distance on the desktop activity button 7015, two desktops of the electronic device on the virtual screen 701 of the electronic device. In the interface shown in FIG. 7, the large-screen device may correspondingly match and display, in response to a drag operation with a unit of two preset distances on the desktop activity button 7015, three desktops of the electronic device on the virtual screen 701 of the electronic device. In other words, before all the desktops of the electronic device are totally displayed on the virtual screen 701 of the electronic device, the large-screen device may display, in response to a drag operation with a unit of a preset distance on the desktop activity button 7015 each time, one more desktop of the electronic device on the virtual screen 701 of the electronic device. The one more displayed desktop may be any one of desktops of the electronic device that has not been displayed on the display of the large-screen device. The unit of the preset distance may be any length between 1 cm and 5 cm. Certainly, this is merely an example for description, and a specific unit of the preset distance may be determined based on a specific case.

In a possible implementation, the large-screen device may also determine, in response to touch force on the desktop activity button 7015, a quantity of desktops of the electronic device that need to be correspondingly matched and displayed. For example, if detecting that touch force on the desktop activity button 7015 falls within a first preset range, the large-screen device correspondingly matches and displays two desktops of the electronic device. When detecting that touch force on the desktop activity button 7015 falls within a second preset range, the large-screen device correspondingly matches and displays three desktops of the electronic device. The other desktops are to be matched and displayed in a similar manner.

For ease of understanding, an example is used for description. For example, the force in the first preset range may be 0.1 Newton to 1 Newton, and the force in the second preset range may be 1 Newton to 2 Newtons. When detecting that the touch force on the desktop activity button 7015 is between 0.1 Newton and 1 Newton, the large-screen device may correspondingly match and display two desktops of the electronic device. When detecting that the touch force on the desktop activity button 7015 is between 1 Newton and 2 Newtons, the large-screen device may correspondingly match and display three desktops of the electronic device.

It should be noted that the preset force range is not limited to the example ranges. The preset force range may be determined according to an actual situation, and this is not limited herein.

In a possible implementation, the large-screen device may also control, in response to a voice, the quantity of desktops of the electronic device to be displayed on the display. For example, the large-screen device receives a voice prompt indicating a quantity of displayed desktops of the electronic device, and the large-screen device correspondingly displays, in response to the voice prompt, the corresponding quantity desktops of electronic devices on the display.

The foregoing embodiment can flexibly display the desktop projected by the electronic device, enrich display forms of the desktop projected by the electronic device onto the large-screen device, and improve user experience.

The following uses a diagram of an example of a user interface to describe a function of the desktop activity button 7015.

In a specific embodiment, after detecting the click, touch, or drag operation performed on the desktop activity button 7015, the large-screen device sends a multi-desktop obtaining instruction to the electronic device in response to the operation. The multi-desktop obtaining instruction may carry a description of the quantity of desktops that need to be obtained. For example, the description may be "Obtain two desktops". After receiving the multi-desktop obtaining instruction, the electronic device invokes a "multi-screen framework" or a resource manager by using a "Multi-screen proxy" to obtain information about applications on the corresponding desktops. Then, the "multi-screen framework" generates a virtual screen according to a screen generation instruction from the "Multi-screen proxy" and the obtained information about the applications on the corresponding desktops. The "Multi-screen proxy" sends information about the generated virtual screen to the large-screen device. The large-screen device displays the information on the display of the large-screen device after receiving the information about the virtual screen.

FIG. 8A and FIG. 8B are diagrams of examples of interfaces displayed on a display of a large-screen device in response to a click, touch, or drag operation on the desktop activity button 7015 in the interface shown in FIG. 7.

In the interface shown in FIG. 7, the large-screen device displays, in response to the click, touch, or drag operation on the desktop activity button 7015, all the desktops of the electronic device on the display, as shown in FIG. 8A. Compared with the virtual screen 701 in FIG. 7, a virtual screen 701 of the electronic device in FIG. 8A further includes a desktop 7019 and a desktop 7010. The desktop 7019 and the desktop 7010 are desktops of the electronic device displayed on the large-screen device in response to the click, touch, or drag operation on the desktop activity button 7015. The click operation may be two click operations on the desktop activity button 7015, or a double-click operation on the desktop activity button 7015 in the interface shown in FIG. 7. The drag operation may be a drag operation with a unit of two preset distances on the desktop activity button 7015 in the interface shown in FIG. 7.

The virtual screen 701 of the electronic device further includes a hidden button 7020 and a minimization control 7021.

Figure 9:
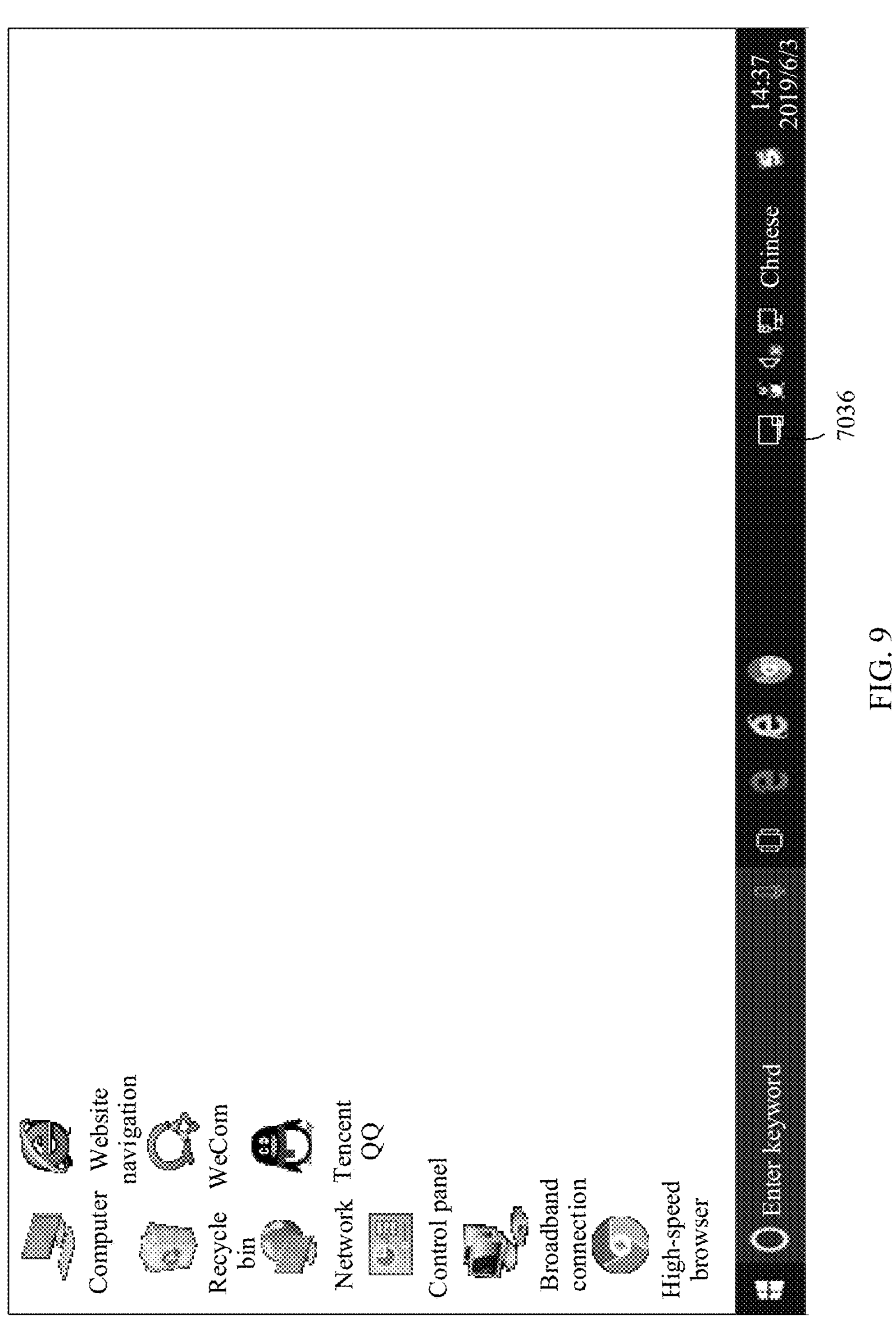
FIG. 9, FIG. 10A, and FIG. 10B are schematic diagrams of user interfaces of a large-screen device according to an embodiment of this disclosure.

The hidden control 7020 may be configured to hide the virtual screen 701 of the electronic device. The large-screen device hides the virtual screen 701 of the electronic device in response to a click operation on the hidden control 7020, as shown in FIG. 9. However, the large-screen device may resume, in response to a click or touch operation on the "Multi-screen proxy" service icon 7036 shown in FIG. 7, a display interface of a virtual screen 701 of the electronic device on the display. It should be noted that, the virtual screen 701 of the electronic device resumed and displayed may be the interface displayed by default in FIG. 7, or may be the virtual screen 701 of the electronic device displayed before the virtual screen 701 is hidden.

Optionally, the hidden control 7020 may be configured to disconnect the electronic device from the large-screen device, and the large-screen device may actively disconnect from the electronic device in response to a click operation on the hidden control 7020. If the large-screen device needs to re-establish a connection to the electronic device, refer to descriptions corresponding to FIG. 5A to FIG. 5G. Details are not described herein again.

Figure 10A:
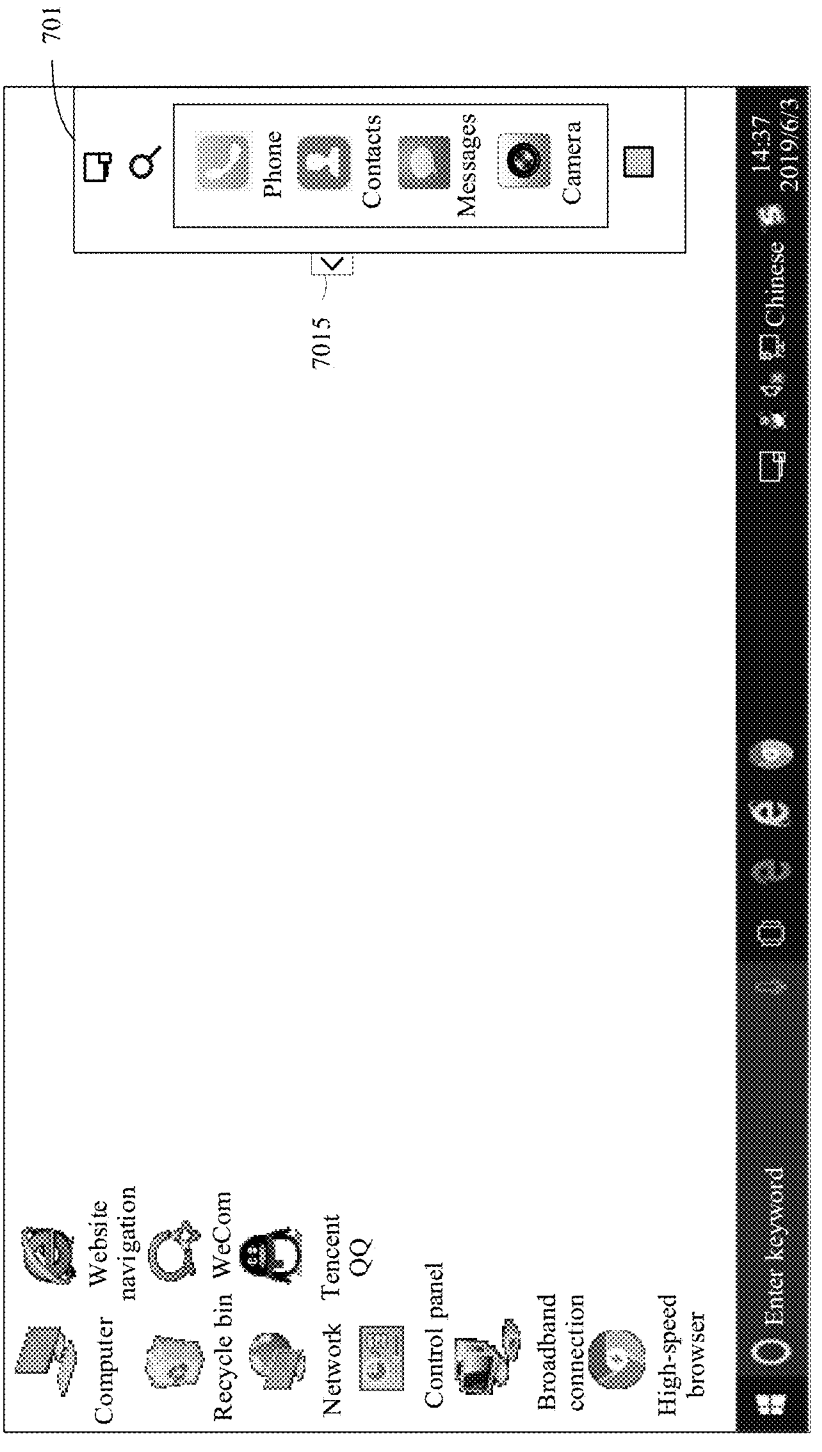

The minimization control 7021 may be configured to minimize the virtual screen 701 of the electronic device. The large-screen device minimizes the virtual screen 701 of the electronic device in response to a click or touch operation on the minimization control 7021. A minimized virtual screen 701 may be, for example, shown in FIG. 10A, and only an indicator 7012 indicating that a virtual screen of an electronic device is projected onto a large-screen device, a search button 7013, a quick launch bar 7014, a desktop activity button 7015, and a multi-window button 7016 are retained. Alternatively, the minimized virtual screen 701 may be, for example, as shown in FIG. 10B, and only a desktop activity button 7015 is retained.

Figure 10B:
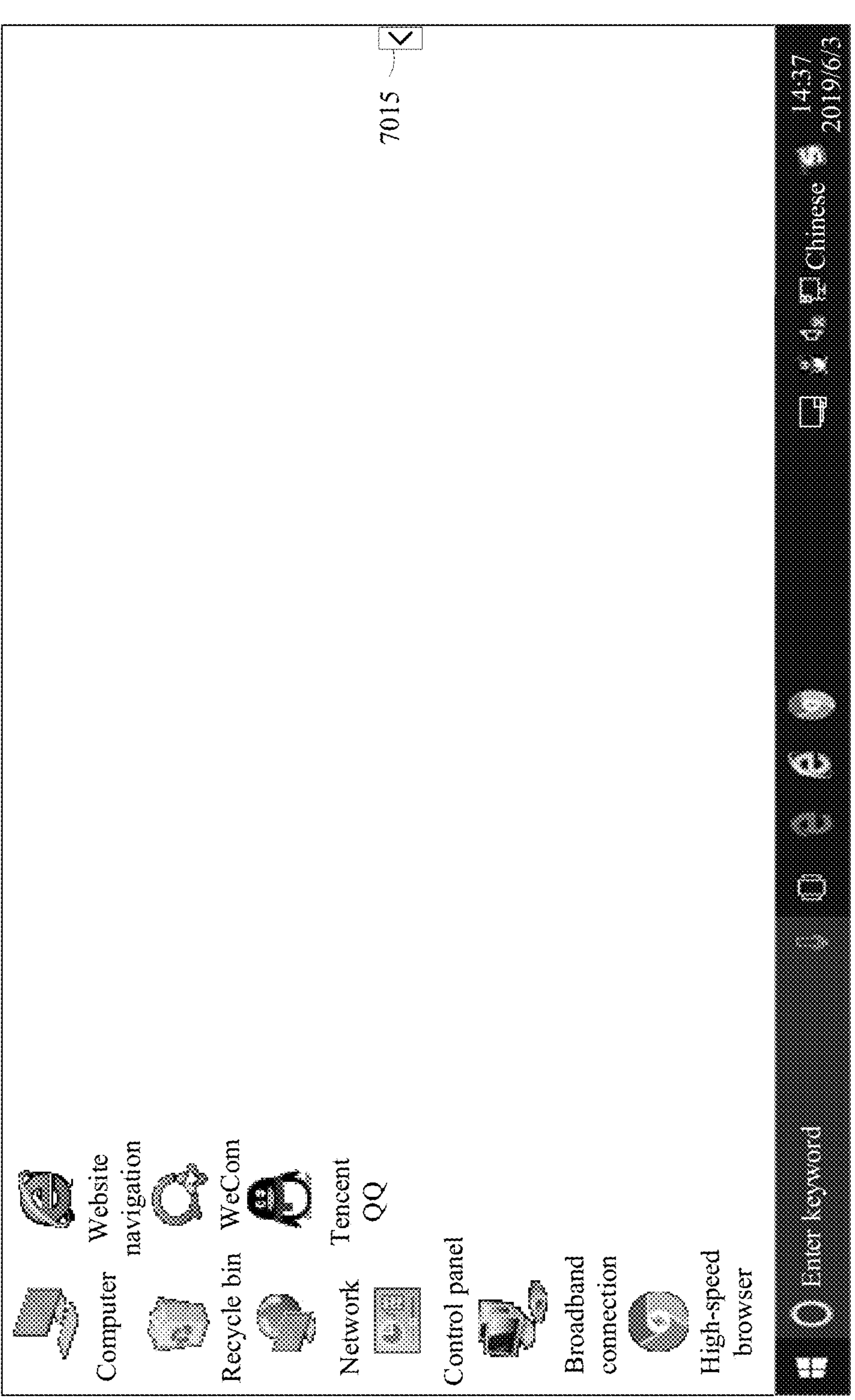

Optionally, in a user interface shown in FIG. 10B, a location of the desktop activity button 7015 is slidable. For example, on the large-screen device, in response to a drag operation on the desktop activity button 7015, the desktop activity button 7015 may be slid upward and downward along a screen edge next to the desktop activity button 7015.

Optionally, in the user interface shown in FIG. 10B, after the desktop activity button 7015 is slid to change a location, when the large-screen device detects a touch operation on the desktop activity button 7015, and the large-screen device displays, in response to the operation, a virtual screen including one or desktops of the electronic device on the display, the desktop activity button 7015 may be resumed and displayed at an original location along a right side edge of the virtual screen, for example, a location shown in FIG. 7, FIG. 8A, or FIG. 8B. Alternatively, after the desktop activity button 7015 is slid to change a location, when the large-screen device detects a touch operation on the desktop activity button 7015, and the large-screen device displays, in response to the operation, a virtual screen including one or more desktops of the electronic device on the display, the desktop activity button 7015 may be displayed at a first location point along a right side edge of the virtual screen. The first location point and a location point at which the desktop activity button 7015 is located before the large-screen device detects the touch operation are on a same horizontal line.

The large-screen device may resume the display interface of the virtual screen 701 of the electronic device on the display in response to the click, touch, or drag operation on the desktop activity button 7015. It should be noted that, the virtual screen 701 of the electronic device that is resumed and displayed by the large-screen device in response to the tap operation on the desktop activity button 7015 may be the interface displayed by default in FIG. 7, or may be the virtual screen 701 of the electronic device displayed before the virtual screen 701 is hidden. The quantity of desktops of the electronic device displayed on the display of the large-screen device in response to the drag operation on the desktop activity button 7015 is determined based on a drag distance.

In addition, in FIG. 8A, because all the desktops of the electronic device have been displayed, an arrow direction of the desktop activity button 7015 changes to a direction pointing to the desktop of the electronic device. In this case, the display interface of the large-screen device may be resumed to the default display interface in FIG. 7 in response to a click, touch, or drag operation on the desktop activity button 7015.

Certainly, in the interface shown in FIG. 7, the display interface of the large-screen device may be as shown in FIG. 8B in response to the click, touch, or drag operation on the desktop activity button 7015. FIG. 8B displays only two desktops of the electronic device. Further, in the interface shown in FIG. 7, the large-screen device displays the interface shown in FIG. 8B on the display in response to the click operation on the desktop activity button 7015, or in response to the drag operation with a unit of one preset distance on the desktop activity button 7015.

In addition, in FIG. 8B, because not all the desktops of the electronic device are displayed, the arrow direction of the desktop activity button 7015 still points to a direction opposite to the direction of the desktop of the electronic device. In this case, another display interface of the electronic device may be displayed on the large-screen device in response to a click or drag operation on the desktop activity button 7015.

The following describes an example of a function of the multi-window button 7016.

The multi-window button 7016 may be configured to invoke the interface of the application running in the background of the electronic device and display the interface on the display of the large-screen device.

In a specific embodiment, after detecting a click or touch operation performed on the multi-window button 7016, the large-screen device sends, in response to the click or touch operation, an obtaining instruction for the interface of the application running in the background to the electronic device. After receiving the obtaining instruction, the electronic device invokes the "multi-screen framework" or the resource manager by using the "Multi-screen proxy" to obtain information about the interface of the application running in the background. Then, the "multi-screen framework" generates the virtual screen according to a screen generation instruction from the "Multi-screen proxy" and the obtained information about the interface of the application running in the background. The "Multi-screen proxy" sends information about the generated virtual screen to the large-screen device. The large-screen device displays the information about the virtual screen on the display of the large-screen device after receiving the information about the virtual screen.

After detecting a click or touch operation performed on the multi-window button 7016 again, in response to the click or touch operation, the large-screen device hides the interface that is of the application running in the background of the electronic device and that is being displayed on the display, and resumes displaying a user interface that is displayed before the click or touch operation performed on the multi-window button 7016 is detected for the first time.

Further, the large-screen device may store each virtual screen sent by the electronic device. When a virtual screen needs to be displayed on the display of the large-screen device again, the large-screen device may directly invoke the virtual screen from a memory and display the virtual screen on the display. For example, after detecting a click or touch operation performed on the multi-window button 7016 again, in response to the click or touch operation, the large-screen device hides the interface that is of the application running in the background of the electronic device and that is being displayed on the display, invokes, from the memory, the user interface that is displayed before the click or touch operation performed on the multi-window button 7016 is detected for the first time, and displays the interface on the display.

Alternatively, after detecting a click or touch operation performed on the multi-window button 7016 again, in response to the click or touch operation, the large-screen device may send an obtaining instruction to the electronic device again to obtain the user interface that is displayed before the click or touch operation performed on the multi-window button 7016 is detected for the first time, and display the interface on the display.

Figure 11A:
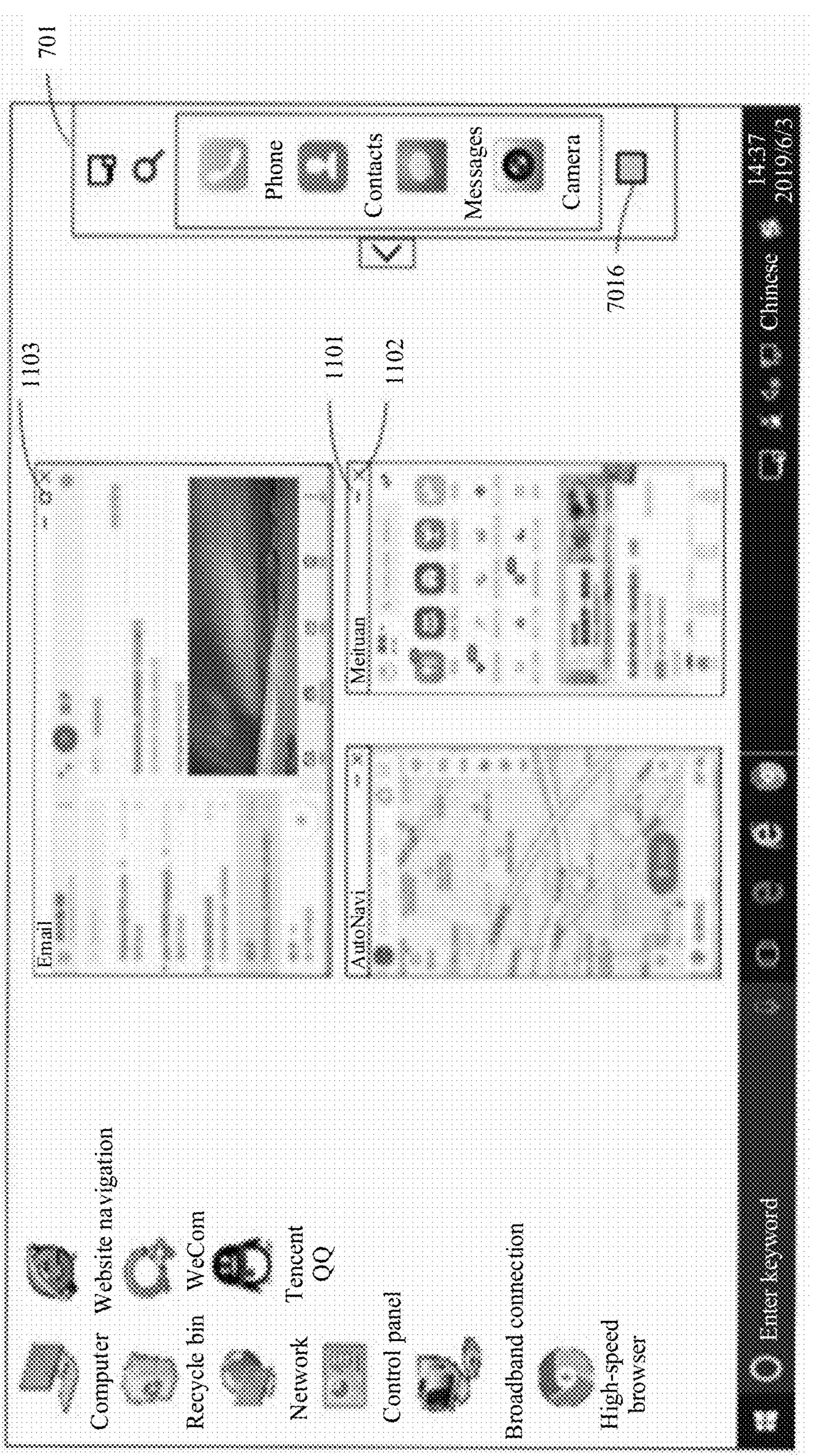
FIG. 11A, FIG. 11B, and FIG. 11C are schematic diagrams of user interfaces of a large-screen device according to an embodiment of this disclosure.
Figure 11B:
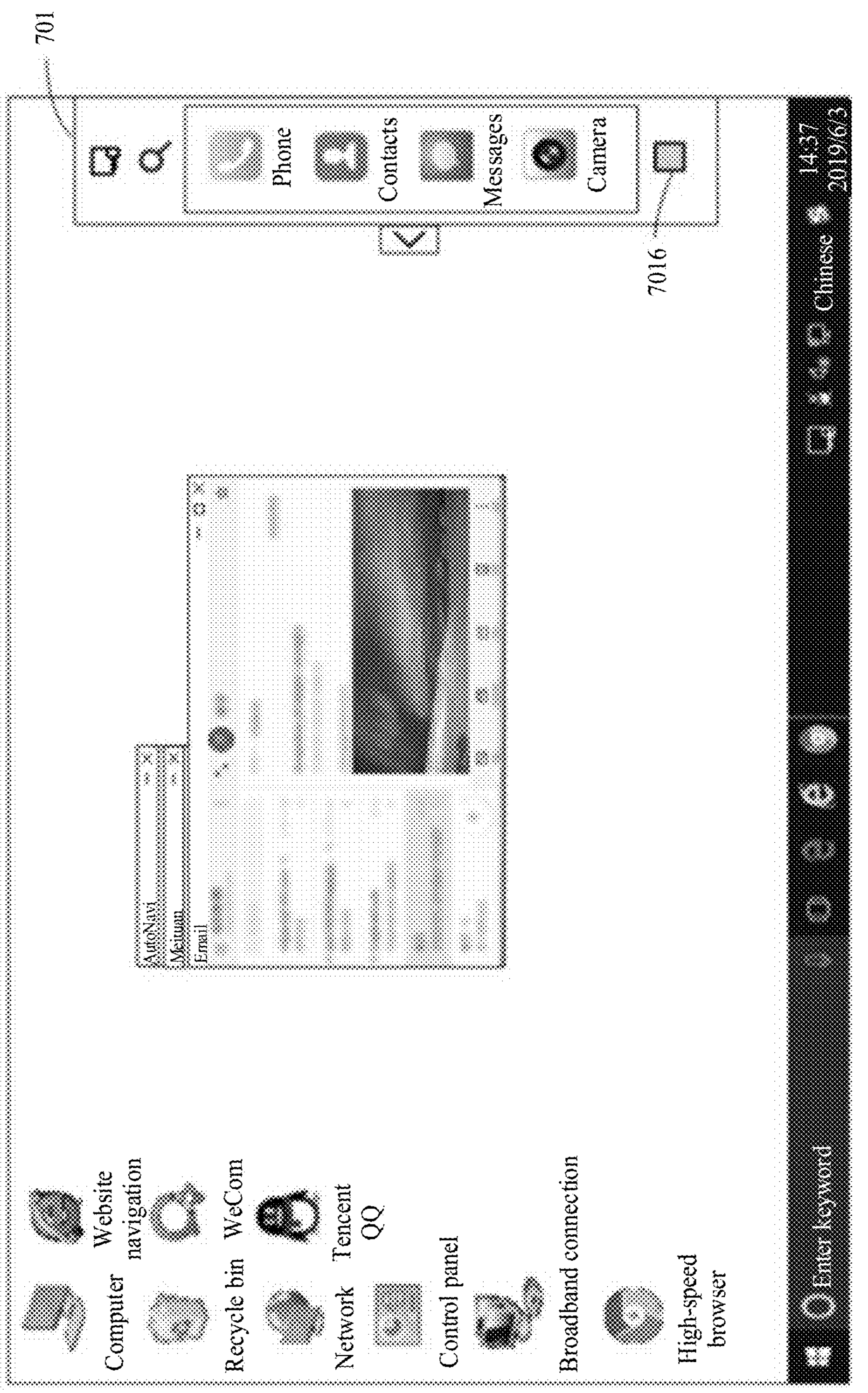
Figure 11C:
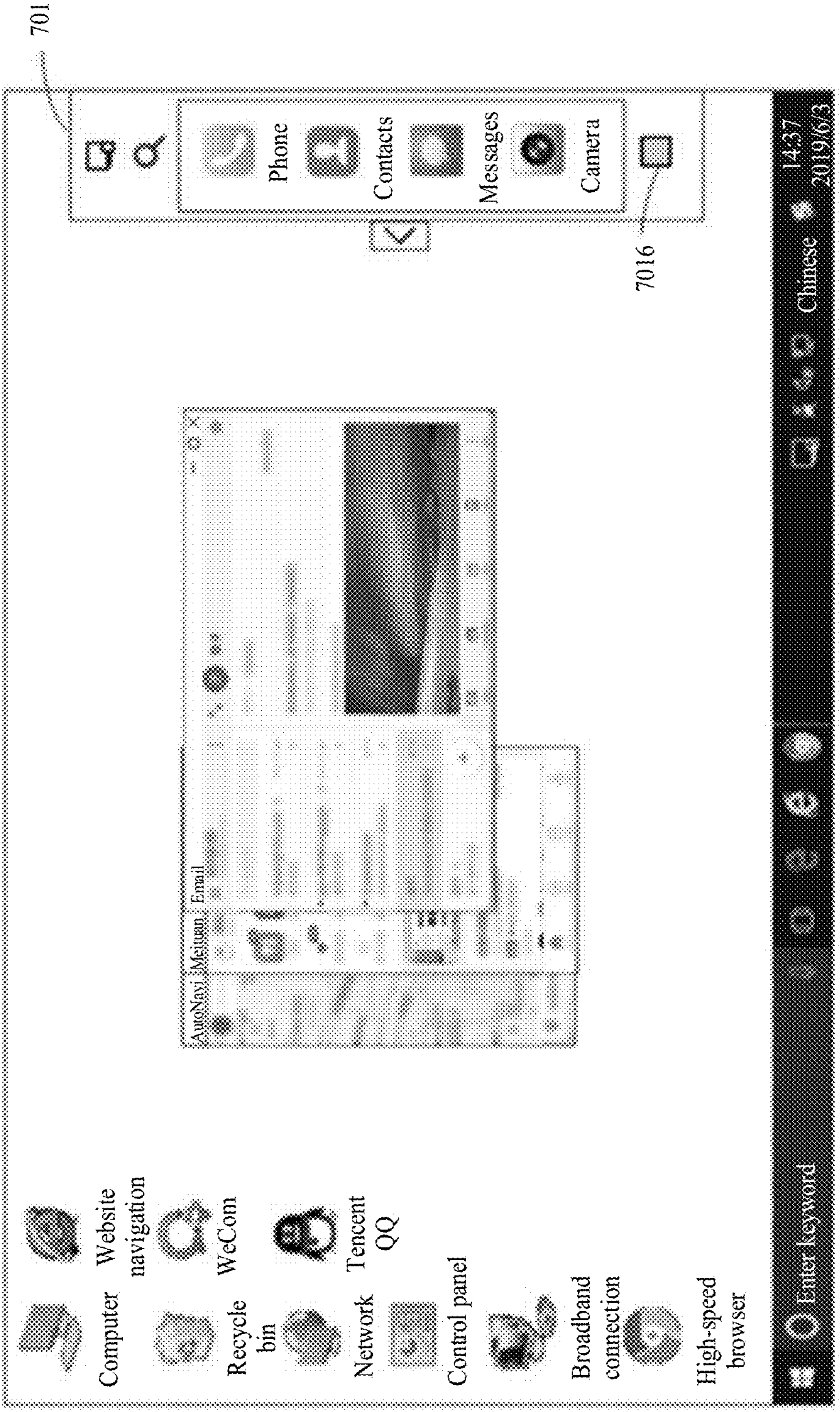

FIG. 11A, FIG. 11B, and FIG. 11C are diagrams of examples of interfaces displayed on a display of a large-screen device in response to a click operation on a multi-window button 7016.

An interface displayed on the display of the large-screen device in response to the click or touch operation on the multi-window button 7016 may be shown in FIG. 11A in which interfaces corresponding to applications running in the background of the electronic device are displayed in tile mode on the display. It can be seen from FIG. 11A that because an interface of an application such as Email is adaptable to a screen size of the large-screen device, and other applications are not adaptable to the big screen of the large-screen device, sizes of the interfaces of the applications on the electronic device that are displayed on the display of the large-screen device may be different. Therefore, after the interface of the application is projected from the electronic device onto the large-screen device, a size of the interface of the application may be adjusted to a size adaptable to the screen size of the large-screen device. However, the other applications such as MEITUAN and AUTONAVI cannot be adaptable to the screen size of the large-screen device. In this case, after being projected from the electronic device onto the large-screen device, the other applications are still displayed in a form adaptable to a screen size of the electronic device.

In addition, the interfaces of the applications in the background of the electronic device that are projected onto the display of the large-screen device may be randomly displayed in tile mode, may be displayed in a displaying sequence from left to right and then from top to bottom, or may be displayed based on user's use habit. For example, the displaying sequence from left to right and then from top to bottom may be a sequence of running the applications by the electronic device, or a sequence for displaying the applications in tile mode in descending order or ascending order of activation frequencies of the applications, or the displaying sequence from left to right and then from top to bottom may be a sequence for displaying in tile mode in descending order or ascending order of activation duration of the applications. Certainly, another displaying sequence is further included, and details are not described herein.

In a possible implementation, the interfaces of the applications in the background of the electronic device in FIG. 11A may alternatively be displayed in tile mode on the display of the large-screen device after the large-screen device scales down the interfaces of the applications in the background according to a preset proportion. For the displaying sequence, refer to the descriptions in the above paragraph. Details are not described herein again.

In addition to the displaying in tile mode, the large-screen device may display, on the display of the large-screen device in response to a click or touch operation on the multi-window button 7016, the interfaces corresponding to the applications running in the background of the electronic device in a superimposition manner, for example, as shown in FIG. 11B and FIG. 11C.

In FIG. 11B, the interfaces corresponding to the applications running in the background of the electronic device may be vertically superimposed and displayed on the display of the large-screen device, and an interface of each application retains a name bar of the application on the interface to display on the display of the large-screen device. The interfaces of the applications may be randomly superimposed from top to bottom, or may be displayed according to a sequence in which the electronic device runs the applications, or may be displayed in ascending order or descending order based on frequencies of using the applications by the user.

In FIG. 11C, the interfaces corresponding to the applications running in the background of the electronic device may be horizontally superimposed and displayed on the display of the large-screen device, and an interface of each application retains a name of an application on the interface to display on the display of the large-screen device. The interfaces of the applications may be randomly superimposed from left to right, or may be displayed according to a sequence in which the electronic device runs the applications, or may be displayed in ascending order or descending order based on frequencies of using the applications by the user.

In FIG. 11A, FIG. 11B, and FIG. 11C, a name bar of each application on the interface may include a hidden button 1102 and a minimization button 1101. The hidden button 1102 may be configured to hide the interface of the application, and the minimization button 1101 may be configured to minimize the interface of the application and display the interface at a preset location, for example, a lower right corner. The application, such as a Mail, that may be adaptable to the screen size of the large-screen device may further include a maximization button 1103 in an upper left corner of the interface of the application. The maximization button 1103 may be configured to display the interface of the corresponding application in full screen.

In the interface of the application shown in FIG. 11A, FIG. 11B, or FIG. 11C, if the large-screen device detects a click or touch operation performed on the multi-window button 7016 again, the large-screen device hides the interfaces of the applications such as Mail, MEITUAN, and AUTONAVI that are shown in the interfaces in the figures, and returns to an interface before the click or touch operation performed on the multi-window button 7016 is detected last time, for example, the interface shown in FIG. 7.

It should be noted that, as shown in FIG. 11A, FIG. 11B, and FIG. 11C, when the large-screen device displays, on the display in response to the click or touch operation performed on the multi-window button 7016, the interfaces of the applications running in the background of the electronic device, a virtual screen 701 of the electronic device may be displayed on a left side of the display of the large-screen device in a minimized form. Certainly, the virtual screen 701 of the electronic device may also be displayed on the left side of the display of the large-screen device in the form shown in FIG. 7.

In a possible embodiment, an interface of an application may be activated in response to a click or touch operation performed on the interface of the application (a click or tap operation on a special button included in a name bar is excepted). For example, refer to FIG. 12A and FIG. 12B.

Figure 12A:
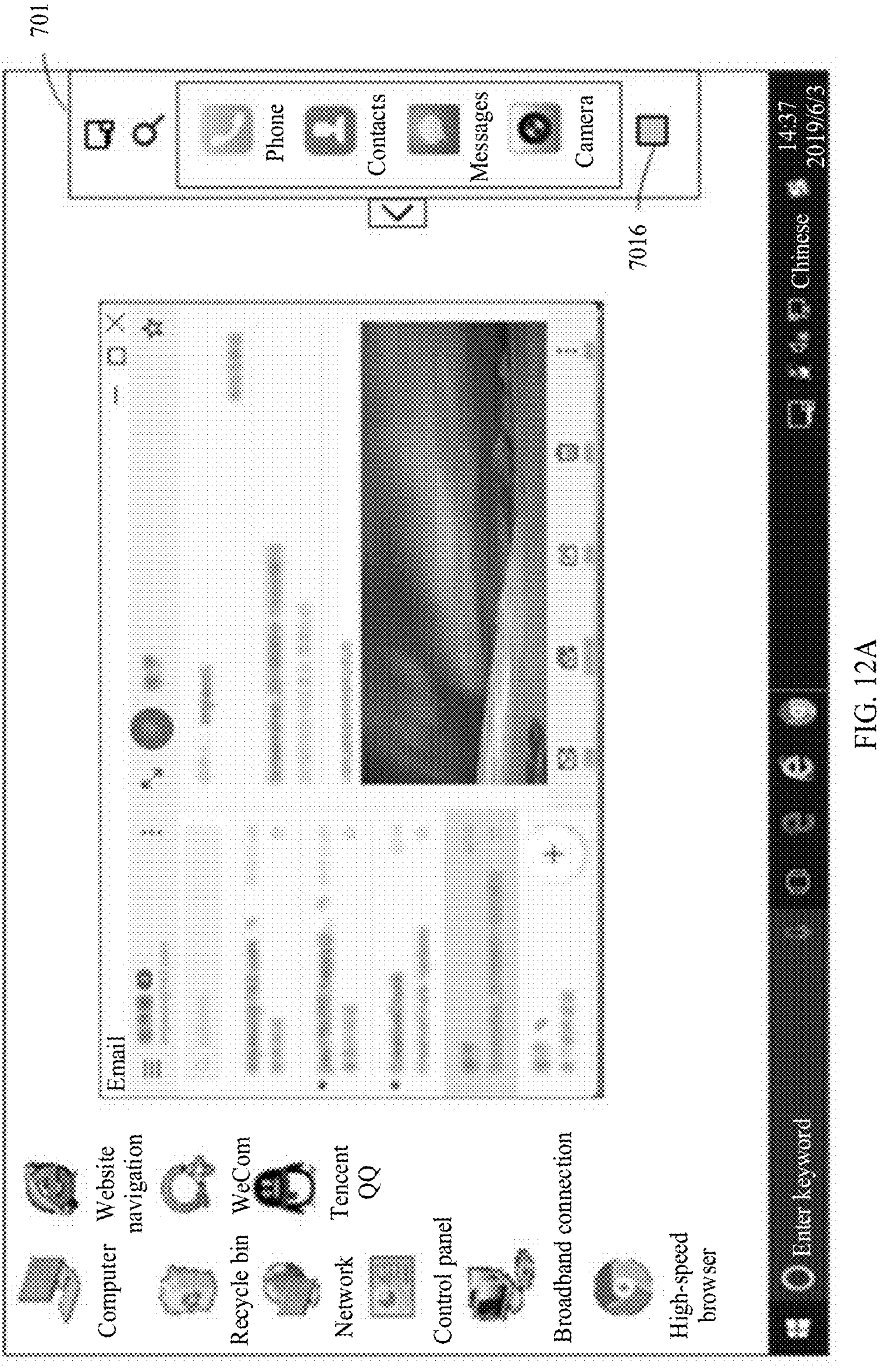
FIG. 12A and FIG. 12B are schematic diagrams of user interfaces of a large-screen device according to an embodiment of this disclosure.

FIG. 12A shows an activated interface of a Mail application displayed on a display of a large-screen device. Further, in the interface shown in FIG. 11A, FIG. 11B, or FIG. 11C, after the large-screen device detects a click (for example, a click operation or a double-click operation) or touch operation on the interface of the Mail application, in response to the click or touch operation, the large-screen device hides the interfaces of the other applications, and displays an activated interface of the Mail application on the display.

Figure 12B:
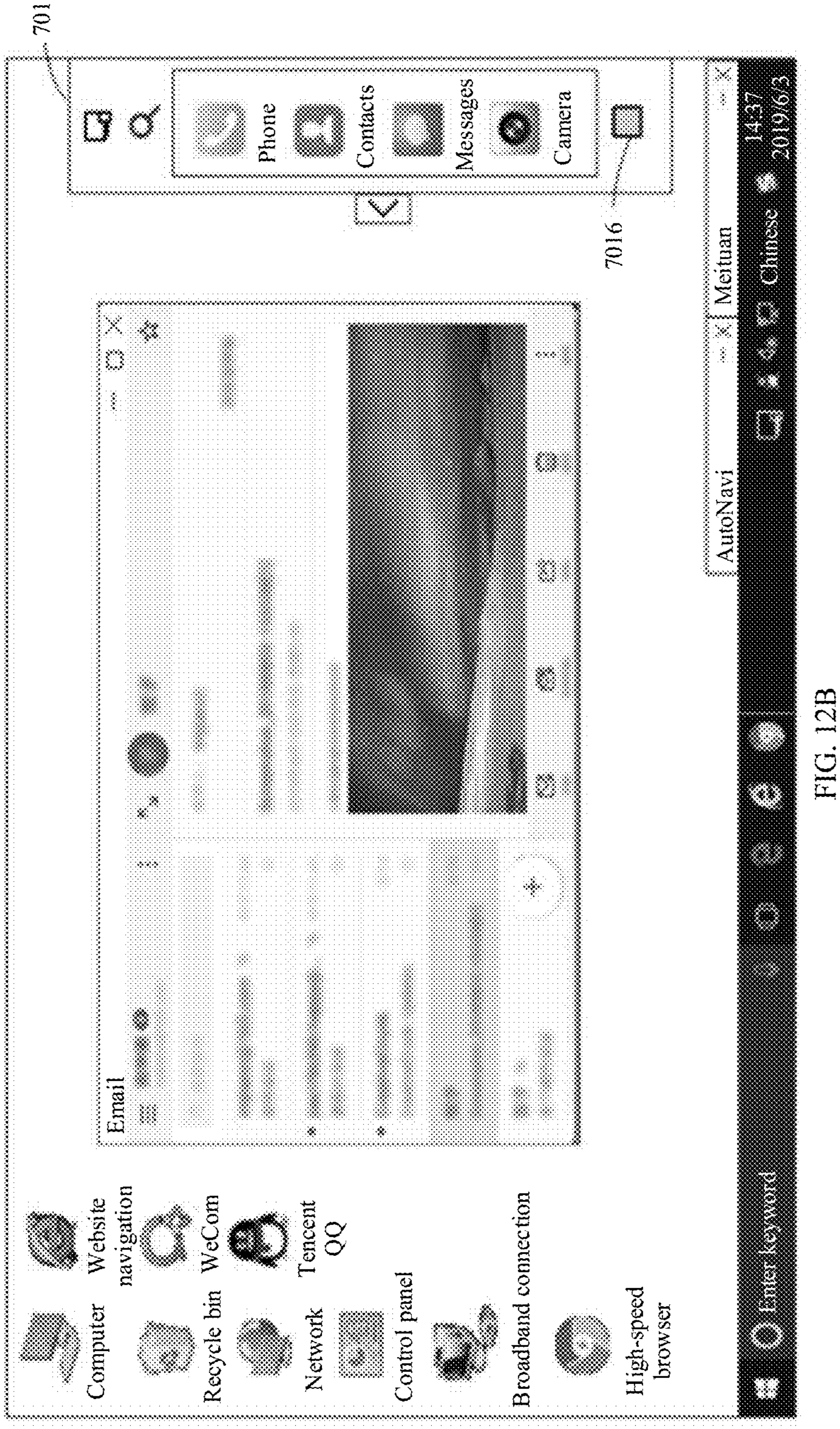

FIG. 12B shows an activated interface of a Mail application displayed on a display of a large-screen device. Further, in the interface shown in FIG. 11A, FIG. 11B, or FIG. 11C, after the large-screen device detects a click (for example, a click operation or a double-click operation) or touch operation on the interface of the Mail application, in response to the click or touch operation, the large-screen device minimizes the interfaces of the other applications and places the interfaces at a preset location, for example, on a bottom left side of the display of the large-screen device, and then displays an activated interface of the Mail application on the display.

In a possible implementation, when an interface of an application running in a background of an electronic device shown in FIG. 12A or FIG. 12B is activated, in this case, if the large-screen device detects a click or touch operation performed on a multi-window button 7016, the large-screen device displays, on the display in response to the operation, interfaces of all applications running in the background of the electronic device again, for example, as shown in FIG. 11A, FIG. 11B, or FIG. 11C.

Further, the large-screen device may store each virtual screen sent by the electronic device. When a virtual screen needs to be displayed on the display of the large-screen device again, the large-screen device may directly invoke the virtual screen from a memory and display the virtual screen on the display. For example, the large-screen device may store, in the memory, the virtual screens that are sent by the electronic device and that include information about the interfaces of the applications running in the background of the electronic device. When an interface of an application running in the background of the electronic device shown in FIG. 12A or FIG. 12B is activated, if the large-screen device detects the click or touch operation performed on the multi-window button 7016, in response to the operation, the large-screen device may invoke, in the memory, the interfaces of all the applications running in the background of the electronic device and display the interfaces on the display.

Certainly, when the interface of the application running in the background of the electronic device shown in FIG. 12A or FIG. 12B is activated, if the large-screen device detects a click or touch operation performed on the multi-window button 7016, the large-screen device may send, in response to the operation, an instruction of obtaining an interface of an application running in the background to the electronic device again, to obtain the interface of the application running in the background of the electronic device.

Figure 13:
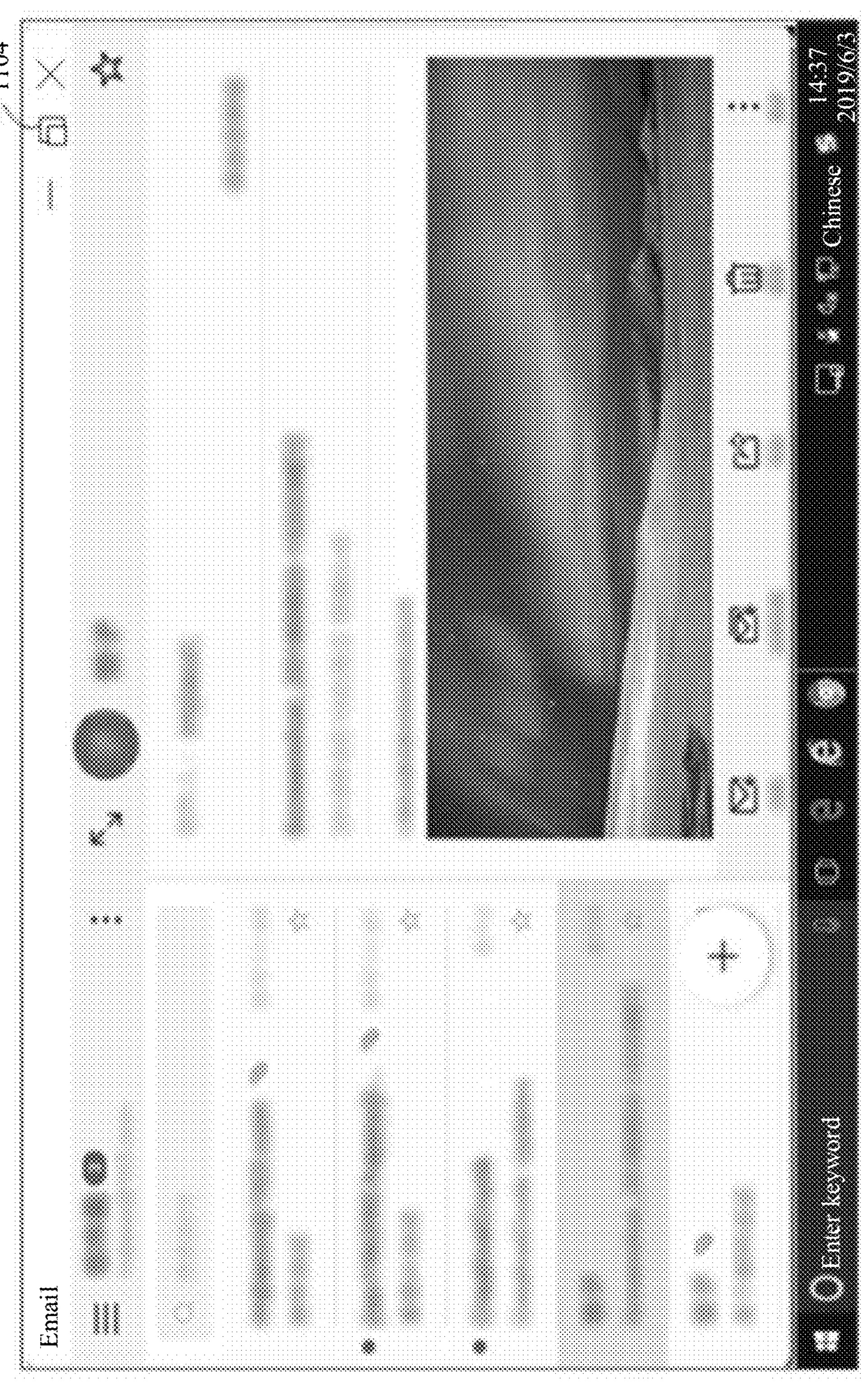
FIG. 13 is a schematic diagram of another user interface of a large-screen device according to an embodiment of this disclosure.

In a possible implementation, because the interface of the mail application can be adaptable to the screen size of the large-screen device, the interface of the mail application can be maximized in response to a click or touch operation on a maximization button 1103 in the interface of the mail application in FIG. 12A or FIG. 12B, as shown in FIG. 13. In FIG. 13, a maximization button 1103 in an upper left corner of an interface of a mail application changes to a downward restoration button 1104. In response to a click or touch operation on the downward restoration button 1104, the interface of the mail application may be restored to the interface shown in FIG. 12A or FIG. 12B.

In a possible implementation, in response to the click or touch operation on the interface of the application, the interface of the application may be activated. After the interface of the application is activated, if the interface of the application can be adaptable to the screen size of the large-screen device, the large-screen device may display the activated interface of the application in full screen. For example, refer to the interface shown in FIG. 13.

In a possible implementation, in response to the click or touch operation on the interface of the application, the interface of the application may be activated. After the interface of the application is activated, if the interface of the application is not adaptable to the screen size of the large-screen device, for example, if the activated application is a MEITUAN or AUTONAVI application, the large-screen device still displays the activated interface of the application on the display in a screen size of the electronic device.

The following describes an example of a function of the search button 7013.

The search button 7013 may be configured to search for the application already installed on the electronic device to quickly find the required application.

Figure 14A:
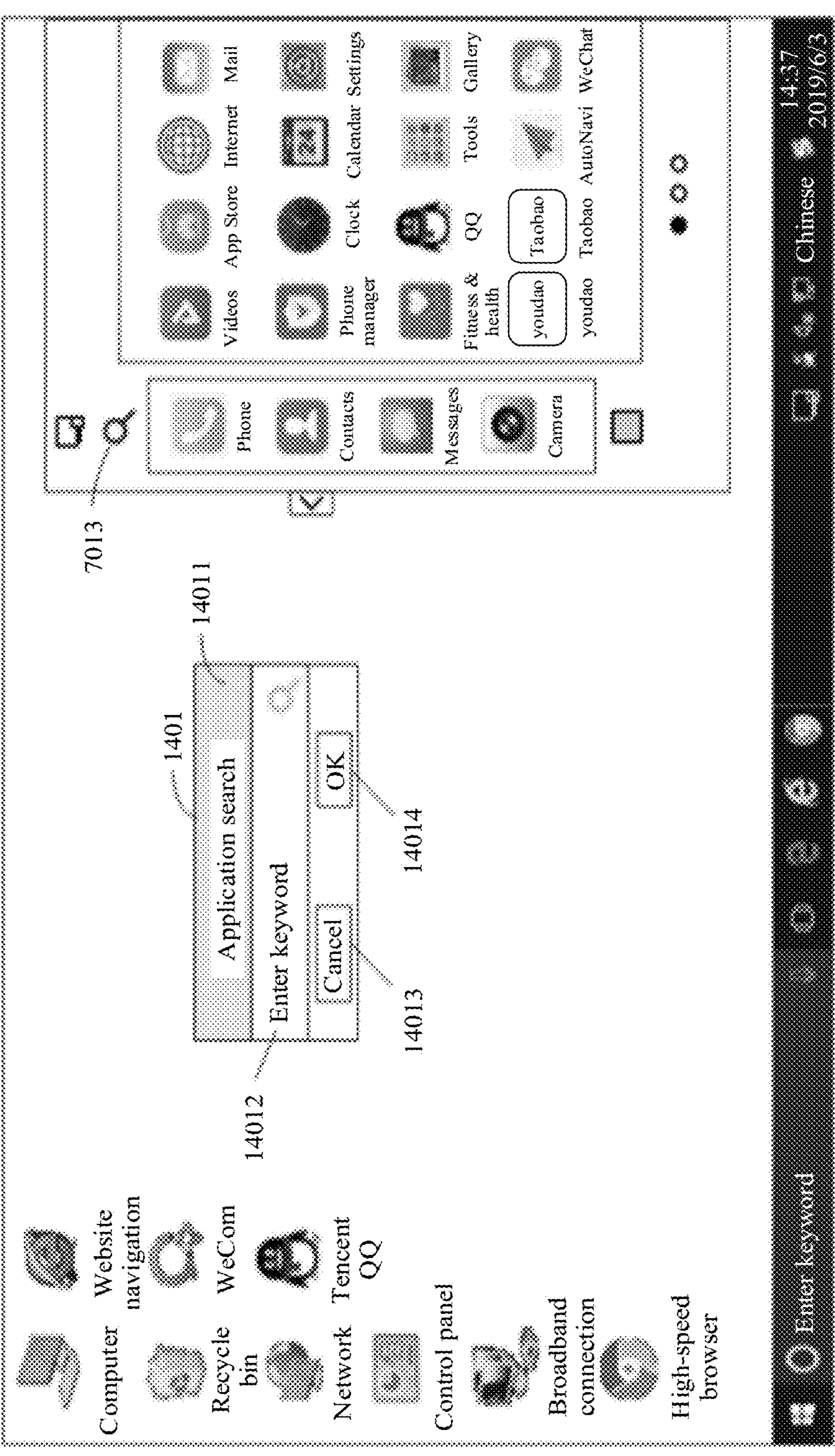
FIG. 14A, FIG. 14B, FIG. 14C, FIG. 14D, and FIG. 14E are schematic diagrams of user interfaces of a large-screen device according to an embodiment of this disclosure.

Referring to FIG. 14A, in a specific embodiment, a large-screen device pops up a small window 1401 on a display in response to a click or touch operation on a search button 7013. The small window 1401 is a window of searching for an application. The window may include a subject name 14011 ("Application search"), an input box 14012 ("Enter keyword"), an "OK" button 14014, and a "Cancel" button 14013.

The input box 14012 may receive a search keyword entered by a user. After receiving the keyword in the input box, the large-screen device may send a search instruction to an electronic device in response to a click or touch operation on the "OK" button 14014, where the search instruction may include information about the keyword received in the input box 14012. The electronic device searches for an application corresponding to the keyword according to the search instruction after receiving the search instruction.

If the application corresponding to the keyword is found, a "multi-screen framework" notifies a "Multi-screen proxy" of an event indicating that the corresponding application is found. The "Multi-screen proxy" obtains, by using the "multi-screen framework" or a resource manager in response to the event notification, information about the corresponding application or information about all applications on a desktop of the electronic device on which the corresponding application is located. Then, the "multi-screen framework" generates a virtual screen based on the obtained information in response to a screen generation instruction from the "Multi-screen proxy", and uses a special mark to mark the corresponding application in the generated virtual screen, so that the user can quickly identify the application. Then, the "Multi-screen proxy" sends information about the generated virtual screen to the large-screen device, and the large-screen device displays the information about the virtual screen on the display of the large-screen device after receiving the information about the virtual screen.

If no application corresponding to the keyword is found by the electronic device after receiving the search instruction, the electronic device may return, to the large-screen device, prompt information indicating that the corresponding application is not found. After receiving the prompt information, the large-screen device displays the information on the display.

Figure 14B:
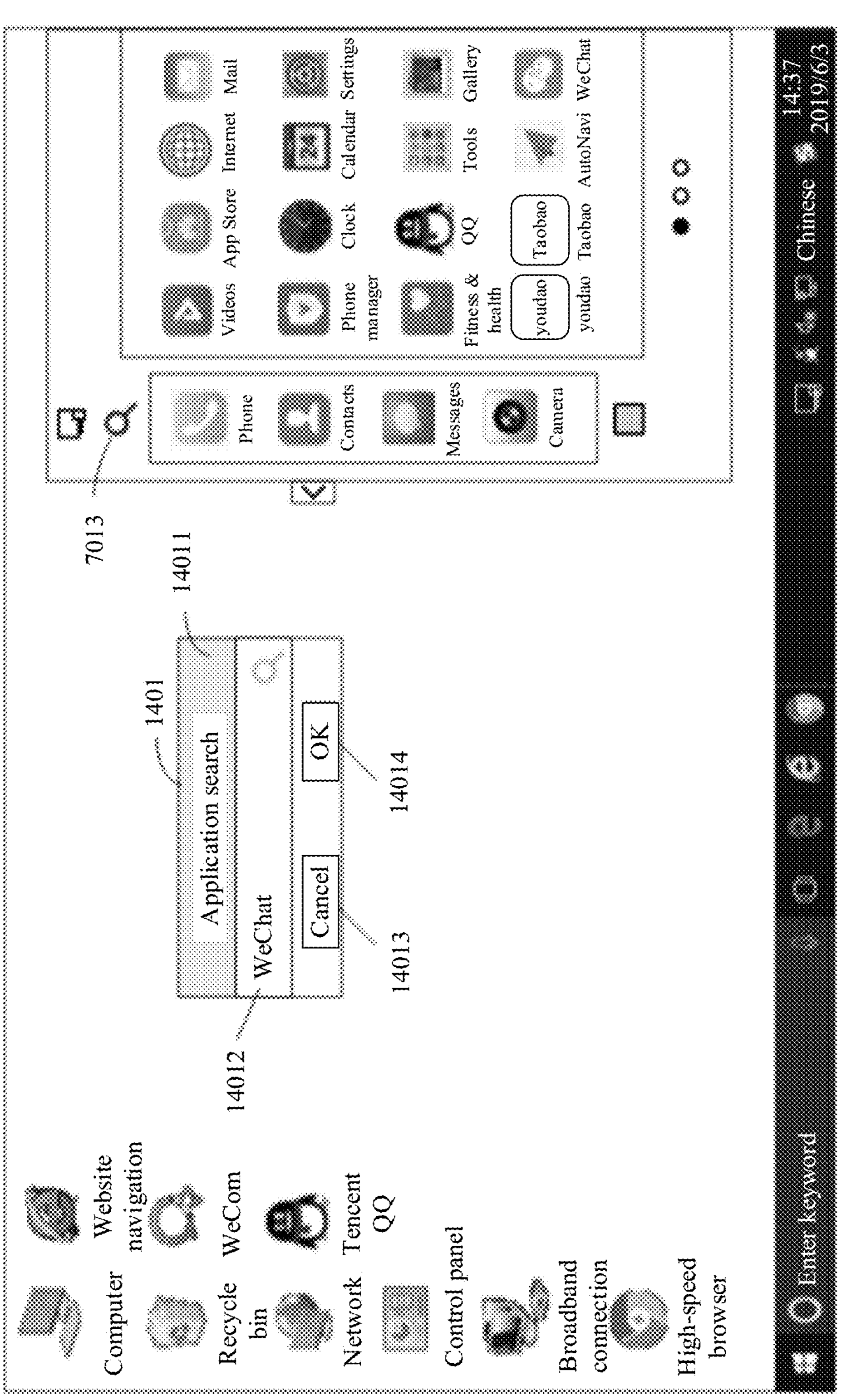

For example, referring to FIG. 14B, a large-screen device may obtain a search keyword WECHAT in an input box 14012. Then, in response to a click or touch operation on an "OK" button 14014, the large-screen device may send an electronic device a search instruction that carries description information about a WECHAT application. After receiving the search instruction, the electronic device searches for information about the WECHAT application based on the keyword WECHAT in the search instruction. After the WECHAT application is found, a "multi-screen framework" notifies a "Multi-screen proxy" of an event indicating that the WECHAT application is found. The "Multi-screen proxy" obtains, by using the "multi-screen framework" or a resource manager in response to the event notification, information about all applications on a desktop of the electronic device on which the WECHAT application is located. Then, the "multi-screen framework" generates, in response to a screen generation instruction from the "Multi-screen proxy", a virtual screen based on the obtained information, and uses a special mark to mark the WECHAT application in the generated virtual screen, so that the user can quickly identify the WECHAT application. Then, the "Multi-screen proxy" sends information about the generated virtual screen to the large-screen device, and the large-screen device displays the information about the virtual screen on a display of the large-screen device after receiving the information about the virtual screen, as shown in FIG. 14C.

Figure 14C:
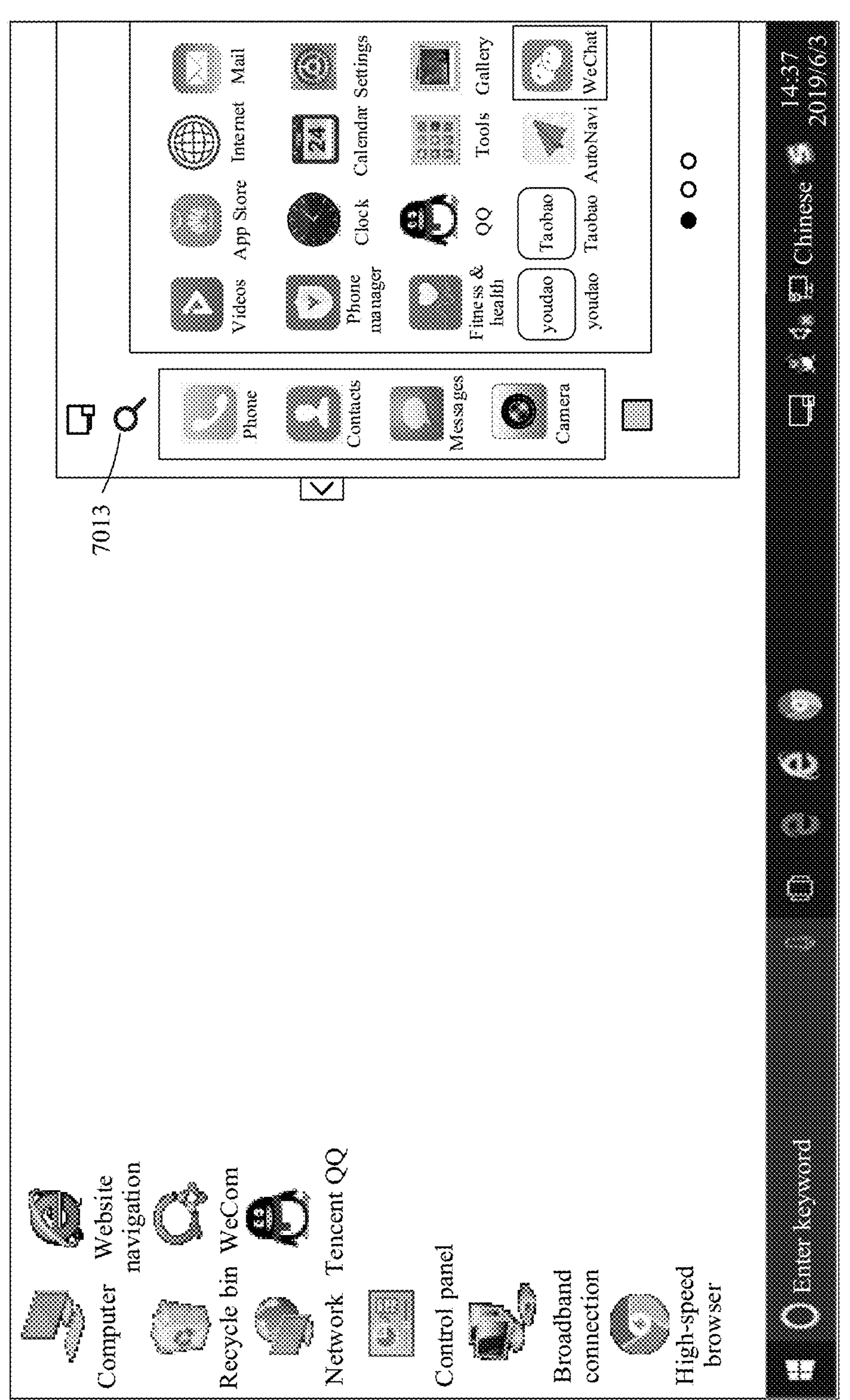

It can be seen in FIG. 14C that a searched WECHAT application is framed by a box for highlighting, which indicates that the WECHAT application is found. It should be noted that the box may be a box with a color, for example, red, or the box may be replaced with a highlighted mark form such as circled, shaded, or ticked. A highlighted mark form is not limited in this solution of this disclosure.

Figure 14D:
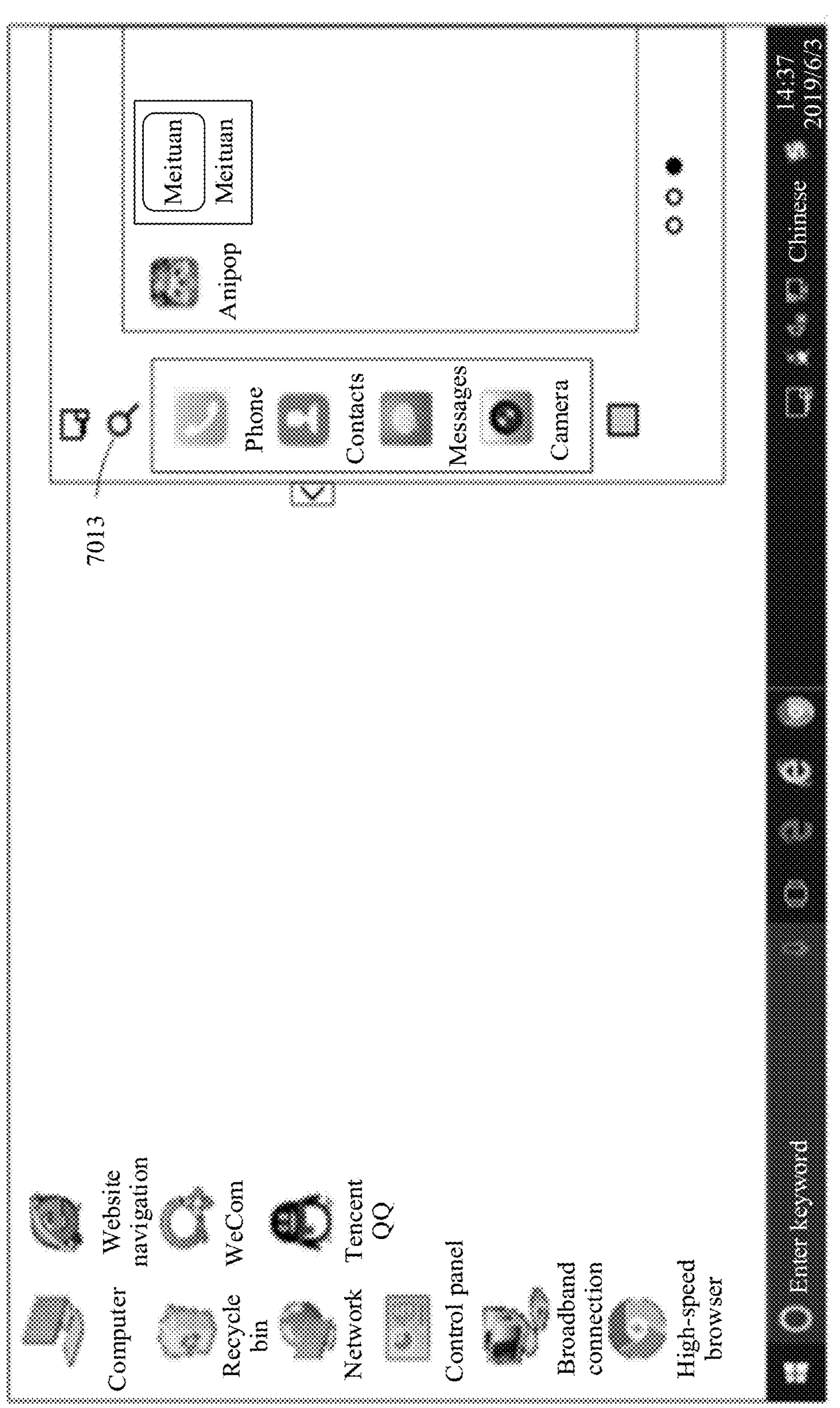

For another example, it is assumed that a large-screen device obtains a search keyword MEITUAN in an input box 14012 in FIG. 14B. Then, in response to a click or touch operation on an "OK" button 14014, the large-screen device may send an electronic device a search instruction that carries description information about a MEITUAN application. After receiving the search instruction, the electronic device searches for information about the MEITUAN application based on the keyword MEITUAN in the search instruction. After the MEITUAN application is found, a "multi-screen framework" notifies a "Multi-screen proxy" of an event indicating that the MEITUAN application is found. The "Multi-screen proxy" obtains, by using the "multi-screen framework" or a resource manager in response to the event notification, information about all applications on a desktop of the electronic device on which the MEITUAN application is located. Then, the "multi-screen framework" generates, in response to a screen generation instruction from the "Multi-screen proxy", a virtual screen based on the obtained information, and uses a special mark to mark the MEITUAN application in the generated virtual screen, so that the user can quickly identify the MEITUAN application. Then, the "Multi-screen proxy" sends information about the generated virtual screen to the large-screen device, and the large-screen device displays the information about the virtual screen on a display of the large-screen device after receiving the information about the virtual screen, as shown in FIG. 14D.

It can be seen in FIG. 14C that a searched MEITUAN application is framed by a box for highlighting, which indicates that the MEITUAN application is found. In addition, in FIG. 14D, because a MEITUAN icon is not in a default desktop 7018 but in a desktop in a third page of desktops of the electronic device, a projected desktop of the electronic device displayed on a virtual screen 701 of the electronic device is the desktop in the third page.

In an implementation, after receiving the search instruction, the electronic device searches for information about the MEITUAN application based on the keyword MEITUAN in the search instruction. After the MEITUAN application is found, the "multi-screen framework" notifies the "Multi-screen proxy" of the event indicating that the MEITUAN application is found. The "Multi-screen proxy" obtains the information about the MEITUAN application by using the "multi-screen framework" or the resource manager in response to the event notification. Then, the "multi-screen framework" generates, in response to a screen generation instruction from the "Multi-screen proxy", the virtual screen based on the obtained information, where the virtual screen includes only the information about the MEITUAN application. Then, the "Multi-screen proxy" sends the information about the generated virtual screen to the large-screen device. The large-screen device displays the information about the virtual screen on the display of the large-screen device after receiving the information about the virtual screen, as shown in FIG. 14E.

Figure 14E:
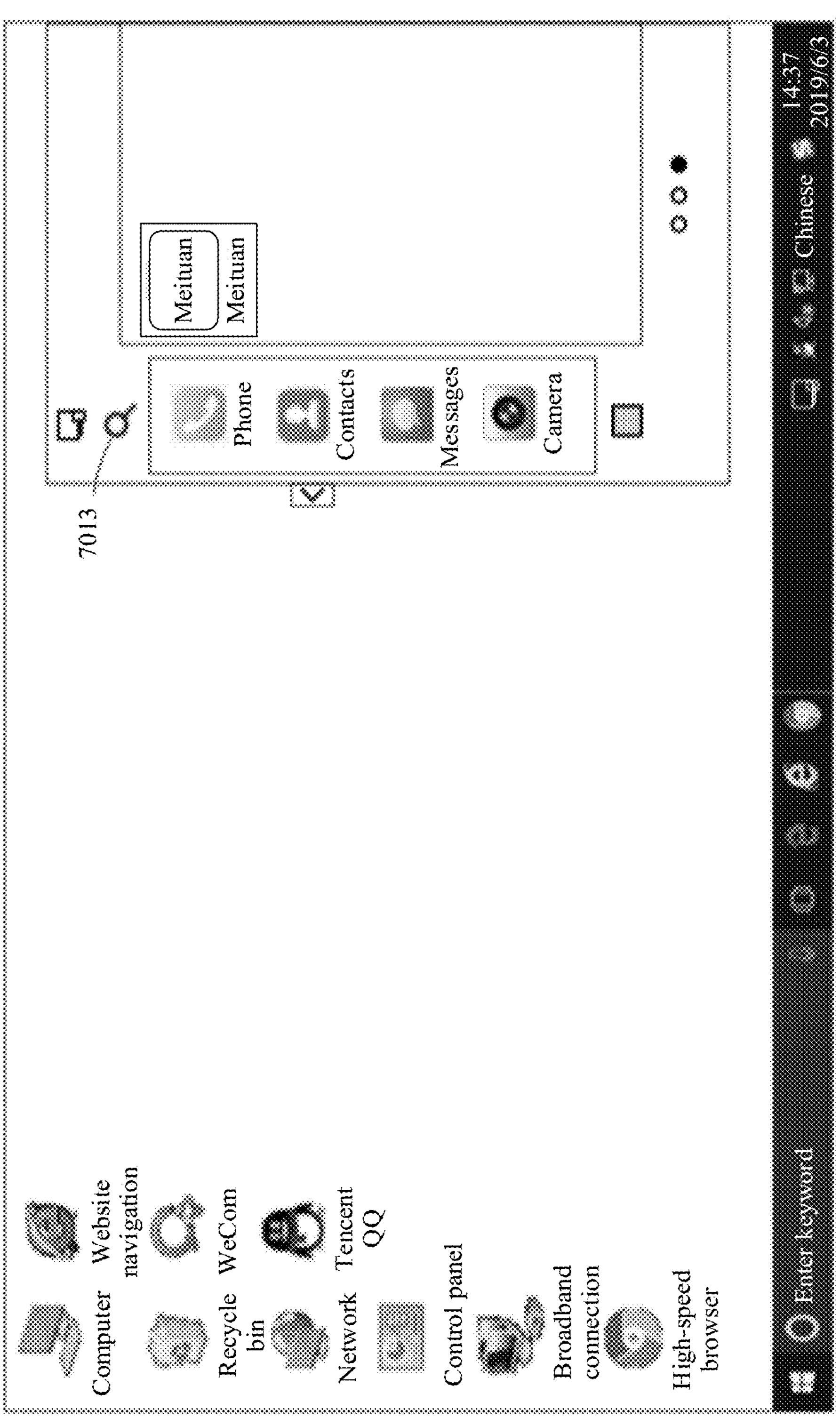

In FIG. 14E, an application that needs to be found is separately displayed on a virtual screen 701, so that a user quickly starts the required application.

It should be noted that the foregoing describes only an example of the embodiment of this disclosure, but the embodiment of this disclosure is not limited to the foregoing embodiment.

In this embodiment of this disclosure, the search button is used to search for the required application. This improves application search efficiency, and improves user experience.

The foregoing embodiments describe embodiments in which after the electronic device establishes the connection to the large-screen device, the electronic device generates the virtual screen and sends the virtual screen to the large-screen device for display, the electronic device determines display content and a display form, and the large-screen device is only responsible for displaying the received virtual screen. The following describes an embodiment in which after an electronic device establishes a connection to a large-screen device, the electronic device sends information about an application to the large-screen device, and the large-screen device generates a window for displaying a desktop of the electronic device, and displays the window on a display, where content on and a form of the displayed window are determined by the large-screen device, and the electronic device only needs to send the information about the application to the large-screen device.

In this embodiment of this disclosure, a "Multi-screen proxy" application is installed on both of the electronic device and the large-screen device. In addition, a "Window interface display" application is further installed on the large-screen device. The "Window interface display" application is used to obtain, from the "Multi-screen proxy" application, the information about the application on the electronic device to generate the window and display the generated window on the display of the large-screen device.

After the electronic device establishes the connection to the large-screen device, a "multi-screen framework" on the electronic device (for example, the "multi-screen framework" at the application framework layer in FIG. 3) notifies the "Multi-screen proxy" (for example, the "Multi-screen proxy" at the application layer in FIG. 3) of an event indicating that the connection succeeds. The "Multi-screen proxy" obtains, by using a resource manager (for example, the resource manager at the application framework layer in FIG. 3) or the "multi-screen framework" in response to the event notification, information about some or all of applications installed on the electronic device, where the information includes a name, an icon, and/or a package name of the application. Then, the resource manager or the "multi-screen framework" transmits the obtained information to the "Multi-screen proxy", and the "Multi-screen proxy" sends the obtained information to the large-screen device.

The large-screen device receives, by using the "Multi-screen proxy" of the large-screen device, the information about the application sent by the electronic device, and then transmits the received information to the "Window interface display" application. After receiving the information about the application sent by the electronic device, the "Window interface display" application generates the window based on the information about the application, and displays the generated window on the display.

Further, the specific content included in the window generated by the "Window interface display" application may be preset content. For example, after the electronic device establishes the connection to the large-screen device, the desktop projected onto the large-screen device is a default desktop (the default desktop may be, for example, a desktop of one or more desktops of the electronic device). The "Window interface display" application generates the window based on data information in the default desktop, and displays the generated window on the display. For the displayed window, refer to the virtual screen 701 of the electronic device in FIG. 7.

Certainly, the window generated by the "Window interface display" application may alternatively a specific virtual screen generated according to a specific instruction from the "Multi-screen proxy" on the large-screen device. For example, when the instruction from the "Multi-screen proxy" on the large-screen device requires to generate the window including two desktops of the electronic device, the "Window interface display" application may generate, according to the instruction and the obtained information about the application sent by the electronic device, the window including the two desktops, and then display the generated window on the display of the large-screen device. For example, refer to the virtual screen 701 of the electronic device in FIG. 8B.

The window on the "Window interface display" application further includes a window of another form and with another content. Content in and a form of the window are not limited in this embodiment of this disclosure.

In a possible implementation, content projected by the electronic device onto the large-screen device may be determined by the electronic device. For example, after the electronic device establishes the connection to the large-screen device, the electronic device only sends, to the large-screen device, the information about the application in the desktop preset to be displayed by default. The large-screen device generates the window with the default desktop based on the information about the application, and displays the window with the default desktop on the display of the large-screen device. For example, when the large-screen device needs to display two desktops of the electronic device on the display in response to a touch operation on a control, the large-screen device may send a request instruction for obtaining the two desktops to the electronic device. The electronic device obtains information about applications in the two desktops according to the request instruction, and sends the information about the applications to the large-screen device. The large-screen device generates, by using the "Window interface display" application, the window according to the received information about the applications and displays the window on the display of the large-screen device.

For ease of understanding, the following describes an example of the embodiment of this disclosure with reference to a diagram of a specific user interface.

FIG. 7 shows an example of a user interface 71 displayed by default on a large-screen device after an electronic device establishes a connection to the large-screen device, and a desktop of the electronic device is projected onto the large-screen device. For a specific description of FIG. 7, refer to the corresponding description of FIG. 7. Details are not described herein again.

Refer to FIG. 8A and FIG. 8B. In addition to the foregoing specific implementation, specific implementation of displaying the interfaces shown in FIG. 8A and FIG. 8B may be further as follows.

After detecting a click, touch, or drag operation performed on a desktop activity button 7015, a sensor of a large-screen device notifies a "Multi-screen proxy" application on the large-screen device of an event of the click, touch, or drag operation in response to the operation. The "Multi-screen proxy" application generates a window generation instruction based on the event notification, where the window generation instruction includes description information of a quantity of desktops of the electronic device that need to be generated, and sends the window generation instruction to a "Window interface display" application. The "Window interface display" application generates a window according to the instruction and information about an application sent by the electronic device after a connection is established, and displays the generated window on a display of the large-screen device, for example, as shown in FIG. 8A or FIG. 8B.

Alternatively, specific implementation of displaying the interfaces shown in FIG. 8A and FIG. 8B may be further as follows.

After detecting a click, touch, or drag operation performed on a desktop activity button 7015, a sensor of a large-screen device notifies the "Multi-screen proxy" application on the large-screen device of an event of the click, touch, or drag operation in response to the operation. The "Multi-screen proxy" application generates an application information obtaining instruction based on the event notification, where the application information obtaining instruction includes description information of a quantity of desktops of the electronic device that need to be generated, and sends the application information obtaining instruction to the electronic device. The electronic device obtains, based on the application information obtaining instruction, information about applications corresponding to the quantity of desktops, and sends the information about the applications to the large-screen device. The large-screen device receives the information about the applications by using the "Multi-screen proxy", generates a window generation instruction, where the window generation instruction includes the description information of the quantity of desktops of the electronic device that need to be generated, and then sends the window generation instruction and the received information about the applications to a "Window interface display" application. The "Window interface display" application generates a window according to the instruction and the information about the applications, and displays the generated window on a display of the large-screen device, for example, as shown in FIG. 8A or FIG. 8B.

Refer to FIG. 11A, FIG. 11B, and FIG. 11C. In addition to the foregoing specific implementation, specific implementation of displaying the interfaces shown in FIG. 11A, FIG. 11B, and FIG. 11C may be further as follows.

After a large-screen device detects a click or touch operation performed on a multi-window button 7016, the large-screen device sends, in response to the click or touch operation, an obtaining instruction of an interface of an application running in a background to an electronic device. After receiving the obtaining instruction, the electronic device invokes, by using the "Multi-screen proxy", a "multi-screen framework" or a resource manager to obtain information about the interface of the application running in the background, and then sends the obtained information about the interface to the large-screen device. After receiving the information about the interface by using the "Multi-screen proxy", the large-screen device generates a window generation instruction, where the window generation instruction includes description information about a display rule (for a specific display rule, refer to corresponding descriptions in FIG. 11A, FIG. 11B, and FIG. 11C, and details are not described herein again) of the interface of the application running in the background of the electronic device, and then sends the window generation instruction and the received information about the interface to a "Window interface display" application. The "Window interface display" application generates a window according to the instruction and the information about the interface, and displays the generated window on a display of the large-screen device, for example, as shown in FIG. 11A, FIG. 11B, or FIG. 11C.

Refer to FIG. 14C, FIG. 14D, and FIG. 14E. In addition to the foregoing specific implementation, specific implementation of displaying the interfaces shown in FIG. 14C, FIG. 14D, and FIG. 14E may be further as follows.

After obtaining a keyword typed in an input box 14012 in FIG. 14B, a large-screen device searches, based on the keyword, in information about an application sent by an electronic device after a connection is established, for an application corresponding to the keyword. If the corresponding application is found, the large-screen device generates a window generation instruction by using the "Multi-screen proxy", where the window generation instruction includes description information that marks the found application, and then sends the window generation instruction to "Window interface display" application. "Window interface display" application generates a window according to the instruction and the information about the application sent by the electronic device after the connection is established, and displays the generated window on a display of the large-screen device, for example, as shown in FIG. 14C, FIG. 14D, or FIG. 14E.

Alternatively, after obtaining a keyword typed in an input box 14012 in FIG. 14B, a large-screen device generates a search instruction by using the "Multi-screen proxy" based on the keyword, where the search instruction may include information about the keyword received in the input box 14012, and sends the search instruction to an electronic device. The electronic device finds a corresponding application according to the search instruction, obtains information about the application or information about all applications in a desktop on which the application is located, and sends the information to the large-screen device. The large-screen device receives the information about the application by using the "Multi-screen proxy", generates a window generation instruction, where the window generation instruction includes description information for adding a mark of the searched application, and then sends the window generation instruction and the received information about the application to a "Window interface display" application. The "Window interface display" application generates a window according to the instruction and the information about the application, and displays the generated window on a display of the large-screen device, for example, as shown in FIG. 14C, FIG. 14D, or FIG. 14E.

In this embodiment of this disclosure, the large-screen device obtains the information about the application on the electronic device, and then generates a projected window of the electronic device based on the obtained information about the application, and displays the projected window on the display of the large-screen device. This reduces processing load of the electronic device, and improves efficiency of projecting the desktop of the electronic device onto the large-screen device.

Figure 15:
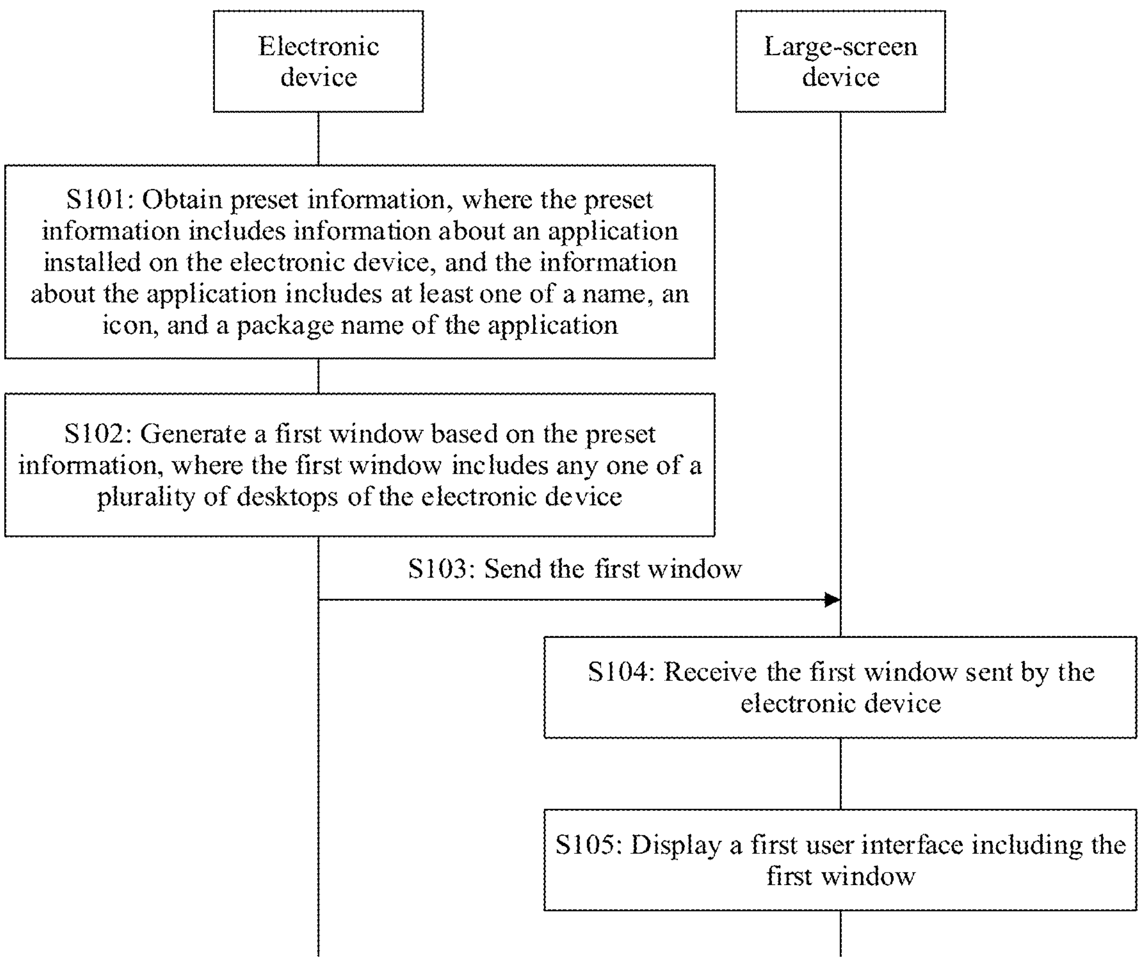
FIG. 15 is a schematic diagram of an interaction procedure of a display method according to an embodiment of this disclosure.

Based on the foregoing description, FIG. 15 is a schematic diagram of an interaction procedure of a display method according to an embodiment of this disclosure. Referring to FIG. 15, the display method may include the following steps.

- S101: An electronic device obtains preset information, where the preset information includes information about an application installed on the electronic device, and the information about the application includes at least one of a name, an icon, and a package name of the application.
- S102: The electronic device generates a first window based on the preset information, where the first window includes any one of a plurality of desktops of the electronic device.
- S103: The electronic device sends the first window to a large-screen device.
- S104: The large-screen device receives the first window sent by the electronic device.
- S105: The large-screen device displays a first user interface including the first window.

Further, the first window may be, for example, the virtual screen 701 shown in FIG. 7. The first user interface may be, for example, the user interface 71 shown in FIG. 7.

For specific implementation of this embodiment of this disclosure, refer to specific descriptions in the foregoing specific implementation in which information on the electronic device is transmitted to the large-screen device and displayed on a display. Details are not described herein again.

In a possible implementation, the first window further includes a first control. The first control is configured to adjust a quantity of desktops of the electronic device included in the first window. After the large-screen device displays a first user interface including the first window, the method further includes the following.

The large-screen device receives a first operation on the first control. The large-screen device generates a first instruction in response to the first operation, where the first instruction is used to obtain two desktops of the electronic device. The large-screen device sends the first instruction to the electronic device. The electronic device generates a second window according to the first instruction, where the second window includes any two of the plurality of desktops of the electronic device. The electronic device sends the second window to the large-screen device. The large-screen device displays a second user interface including the second window.

Further, the first operation may be the click operation, the touch operation, the drag operation, or the like correspondingly described in FIG. 7 and FIG. 8A. The first control may be, for example, the desktop activity button 7015 shown in FIG. 7. The second window may be, for example, the virtual screen 701 shown in FIG. 8B. The second user interface may be, for example, the user interface shown in FIG. 8B.

In a possible implementation, the electronic device includes three or more desktops. The second window further includes the first control. After the large-screen device displays a second user interface including the second window, the method further includes that the large-screen device receives a second operation on the first control in the second window. The large-screen device generates a second instruction in response to the second operation, where the second instruction is used to obtain three desktops of the electronic device. The large-screen device sends the second instruction to the electronic device. The electronic device generates a third window according to the second instruction, where the third window includes any three of the plurality of desktops of the electronic device. The electronic device sends the third window to the large-screen device. The large-screen device displays a third user interface including the third window.

Further, the second operation may be the click operation, the touch operation, the drag operation, or the like correspondingly described in FIG. 7, FIG. 8A, and FIG. 8B. The third window may be, for example, the virtual screen 701 shown in FIG. 8A. The third user interface may be, for example, the user interface shown in FIG. 8A.

For specific implementation of the foregoing two embodiments of this disclosure, refer to corresponding descriptions in FIG. 8A and FIG. 8B. Details are not described herein again.

In a possible implementation, the first window further includes a second control. The second control is configured to display, in the large-screen device, an interface of an application running in the electronic device. After the large-screen device displays a first user interface including the first window, the method further includes that the large-screen device receives a third operation on the second control. The large-screen device generates a third instruction in response to the third operation, where the third instruction is used to obtain the interface of the application running in the electronic device. The large-screen device sends the third instruction to the electronic device. The electronic device generates a fourth window according to the third instruction, where the fourth window includes the interface of the application running in the electronic device. The electronic device sends the fourth window to the large-screen device. The large-screen device displays a fourth user interface including the fourth window.

Further, the third operation may be the click operation, the touch operation, or the like correspondingly described in FIG. 11A, FIG. 11B, and FIG. 11C. The first control may be, for example, the multi-window button 7016 shown in FIG. 7. The fourth window may be, for example, a window including the interfaces of the applications running in the background in the electronic device shown in FIG. 11A, FIG. 11B, or FIG. 11C. The fourth user interface may be, for example, the user interface shown in FIG. 11A, FIG. 11B, or FIG. 11C.

For specific implementation of this embodiment of this disclosure, refer to the corresponding descriptions in FIG. 11A, FIG. 11B, and FIG. 11C. Details are not described herein again.

In a possible implementation, the first window further includes a third control, and the third control is configured to search the first window for the application on the electronic device. Further, the first control may be, for example, the search button 7013 shown in FIG. 7.

For specific implementation of this embodiment of this disclosure, refer to the corresponding descriptions in FIG. 14A to FIG. 14E. Details are not described herein again.

According to the context, the term "when" used in the foregoing embodiments may be interpreted as a meaning of "if", "after", "in response to determining", or "in response to detecting". Likewise, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive), or the like.

A person of ordinary skill in the art may understand that all or some of the procedures of the methods in the embodiments may be implemented by a computer program instructing related hardware. The program may be stored in a computer-readable storage medium. When the program is executed, the procedures of the methods in the embodiments may be performed. The foregoing storage medium includes any medium that can store program code, such as a read-only memory (ROM), a RAM, a magnetic disk, or an optical disk.

What is claimed is:

1. A method comprising:

obtaining, by an electronic device, preset information, wherein the preset information comprises information about a first application installed on the electronic device, and wherein the information about the first application comprises at least one of a name, an icon, or a package name of the first application;

generating, by the electronic device, a first window based on the preset information, wherein the first window comprises any one of a plurality of desktops of the electronic device and a first control configured to adjust a quantity of desktops of the electronic device in the first window, and wherein the first control comprises a search button configured to search for applications installed on the electronic device;

sending, by the electronic device, the first window to a large-screen device, so that the large-screen device displays a first user interface, wherein the first user interface comprises the first window and the search button;

receiving, by the electronic device, a window generation instruction, based on a search keyword, from the large-screen device; and sending, by the electronic device, a virtual screen based on the search keyword to the large-screen device.

2. The method of claim 1, wherein after the sending, by the electronic device, the first window to the large-screen device, the method further comprises:

receiving, by the electronic device, a first instruction from the large-screen device, wherein the first instruction is generated by the large-screen device in response to a first operation on the first control, and wherein the first instruction is used to obtain two desktops of the electronic device;

generating, by the electronic device, a second window according to the first instruction, wherein the second window comprises any two of the plurality of desktops of the electronic device; and sending, by the electronic device, the second window to the large-screen device, so that the large-screen device displays a second user interface, wherein the second user interface comprises the second window.

3. The method of claim 2, wherein the electronic device comprises three or more desktops, wherein the second window further comprises the first control, and wherein after the sending, by the electronic device, the second window to the large-screen device, the method further comprises:

receiving, by the electronic device, a second instruction from the large-screen device, wherein the second instruction is generated by the large-screen device in response to a second operation on the first control in the second window, and wherein the second instruction is used to obtain three desktops of the electronic device;

generating, by the electronic device, a third window according to the second instruction, wherein the third window comprises any three of the plurality of desktops of the electronic device; and sending, by the electronic device, the third window to the large-screen device, so that the large-screen device displays a third user interface, wherein the third user interface comprises the third window.

4. The method of claim 1, wherein the first window further comprises a second control configured to display, in the large-screen device, an interface of a second application running in the electronic device, and wherein after sending, by the electronic device, the first window to the large-screen device, the method further comprises:

receiving, by the electronic device, a third instruction from the large-screen device, wherein the third instruction is generated by the large-screen device in response to a third operation on the second control;

generating, by the electronic device, a fourth window according to the third instruction, wherein the fourth window comprises the interface of the second application running in the electronic device; and sending, by the electronic device, the fourth window to the large-screen device, so that the large-screen device displays a fourth user interface, wherein the fourth user interface comprises the fourth window.

5. The method of claim 1, wherein the first window further comprises a third control, and wherein the third control is configured to search the first window for third application on the electronic device.

6. A method comprising:

receiving, by a large-screen device, a first window from an electronic device, wherein the first window is generated by the electronic device based on preset information, wherein the preset information comprises information about a first application installed on the electronic device, and wherein the information about the first application comprises at least one of a name, an icon, or a package name of the first application;

displaying, by the large-screen device, a first user interface based on the first window, wherein the first user interface comprises the first window, and the first window comprises any one of a plurality of desktops of the electronic device and a first control configured to adjust a quantity of desktops of the electronic device in the first window, wherein the first control comprises a search button configured to search for applications installed on the electronic device;

displaying, by the large-screen device, an input box, in response to an operation on the search button, configured to receive a search keyword; and sending, by the large-screen device, a window generation instruction, in response to the search keyword, to the electronic device.

7. The method of claim 6, wherein after displaying, by the large-screen device, the first user interface based on the first window, the method further comprises:

receiving, by the large-screen device, a first operation on the first control; and displaying, by the large-screen device, a second user interface in response to the first operation, wherein the second user interface comprises a second window, and wherein the second window comprises any two of the plurality of desktops of the electronic device.

8. The method of claim 7, wherein the electronic device comprises three or more desktops, wherein the second window further comprises the first control, and wherein after the displaying, by the large-screen device, the second user interface, the method further comprises:

receiving, by the large-screen device, a second operation on the first control in the second window; and displaying, by the large-screen device, a third user interface in response to the second operation, wherein the third user interface comprises a third window, and the third window comprises any three of the plurality of desktops of the electronic device.

9. The method of claim 6, wherein the first window further comprises a second control configured to display, in the large-screen device, an interface of a second application running in the electronic device, and wherein after displaying, by the large-screen device, the first user interface based on the first window, the method further comprises:

receiving, by the large-screen device, a third operation on the second control; and displaying, by the large-screen device, a fourth user interface in response to the third operation, wherein the fourth user interface comprises the interface of the second application running in the electronic device.

10. The method of claim 9, wherein after the displaying, by the large-screen device, the fourth user interface, the method further comprises:

receiving, by the large-screen device, a fourth operation on a first application interface in the fourth user interface; and displaying, by the large-screen device, a fifth user interface in response to the fourth operation, wherein the fifth user interface comprises the first application interface that is activated, and the first application interface is an interface of any application in interfaces of applications running in the electronic device.

11. The method of claim 10, wherein the fifth user interface comprises the second control, and wherein after the displaying, by the large-screen device, the fifth user interface, the method further comprises:

receiving, by the large-screen device, a fifth operation on the second control in the fifth user interface; and displaying, by the large-screen device, the fourth user interface in response to the fifth operation.

12. The method of claim 6, wherein the first window further comprises a third control, and wherein the third control is configured to search the first window for a second application on the electronic device.

13. An electronic device comprising:

a memory storing a computer program;

a communications module; and one or more processors coupled to the memory and the communications module, wherein the one or more processors are configured to execute the computer program to:

obtain preset information, wherein the preset information comprises information about a first application installed on the electronic device, and the information about the first application comprises at least one of a name, an icon, or a package name of the first application;

generate a first window based on the preset information, wherein the first window comprises any one of a plurality of desktops of the electronic device and a first control configured to adjust a quantity of desktops of the electronic device comprised in the first window, and wherein the first control comprises a search button configured to search for applications installed on the electronic device;

send the first window to a large-screen device, so that the large-screen device displays a first user interface, wherein the first user interface comprises the first window and the search button;

receive a window generation instruction, based on a search keyword, from the large-screen device; and send a virtual screen based on the search keyword to the large-screen device.

14. The electronic device of claim 13, wherein the one or more processors, after the sending the first window to the large-screen device, are configured to:

receive a first instruction from the large-screen device, wherein the first instruction is generated by the large-screen device in response to a first operation on the first control, and wherein the first instruction is used to obtain two desktops of the electronic device;

generate a second window according to the first instruction, wherein the second window comprises any two of the plurality of desktops of the electronic device; and send the second window to the large-screen device, so that the large-screen device displays a second user interface, wherein the second user interface comprises the second window.

15. The electronic device of claim 14, wherein the electronic device comprises three or more desktops, wherein the second window further comprises the first control, and wherein the one or more processors, after sending the second window to the large-screen device, are configured to:

receive a second instruction from the large-screen device, wherein the second instruction is generated by the large-screen device in response to a second operation on the first control in the second window, and wherein the second instruction is used to obtain three desktops of the electronic device;

generate a third window according to the second instruction, wherein the third window comprises any three of the plurality of desktops of the electronic device; and send the third window to the large-screen device, so that the large-screen device displays a third user interface, wherein the third user interface comprises the third window.

16. The electronic device of claim 13, wherein the first window further comprises a second control configured to display, in the large-screen device, an interface of a second application running in the electronic device, and wherein the one or more processors, after the sending the first window to the large-screen device, are configured to:

receive a third instruction from the large-screen device, wherein the third instruction is generated by the large-screen device in response to a third operation on the second control;

generate a fourth window according to the third instruction, wherein the fourth window comprises the interface of the second application running in the electronic device; and send the fourth window to the large-screen device, so that the large-screen device displays a fourth user interface, wherein the fourth user interface comprises the fourth window.

17. The electronic device of claim 13, wherein the first window further comprises a third control, and wherein the third control is configured to search the first window for a third application on the electronic device.

18. A large-screen device comprising:

a memory storing a computer program;

a communications module; and one or more processors coupled to the memory and the communications module, wherein the one or more processors are configured to execute the computer program to:

receive a first window from an electronic device, wherein the first window generated by the electronic device based on preset information, wherein the preset information comprises information about a first application installed on the electronic device, and wherein the information about the first application comprises at least one of a name, an icon, or a package name of the first application;

display a first user interface based on the first window, wherein the first user interface comprises the first window, and the first window comprises any one of a plurality of desktops of the electronic device and a first control configured to adjust a quantity of desktops of the electronic device comprised in the first window, wherein the first control comprises a search button configured to search for applications installed on the electronic device;

display an input box, in response to an operation on the search button, configured to receive a search keyword; and send a window generation instruction, in response to the search keyword, to the electronic device.

19. The large-screen device of claim 18, wherein the one or more processors, after displaying the first user interface based on the first window, are further configured to:

receive a first operation on the first control; and display a second user interface in response to the first operation, wherein the second user interface comprises a second window, and wherein the second window comprises any two of the plurality of desktops of the electronic device.

20. The large-screen device of claim 18, wherein the first window further comprises a third control, and wherein the third control is configured to search the first window for a second application on the electronic device.

* * * * *